(12) United States Patent
Ferstay et al.

(10) Patent No.: US 11,422,873 B2
(45) Date of Patent: Aug. 23, 2022

(54) EFFICIENT MESSAGE QUEUING SERVICE USING MULTIPLEXING

(71) Applicant: SPLUNK Inc., San Francisco, CA (US)

(72) Inventors: Daniel Ferstay, Vancouver (CA); Denis Vergnes, North Vancouver (CA)

(73) Assignee: Splunk Inc., San Francisco, CA (US)

(*) Notice: Subject to any disclaimer, the term of this patent is extended or adjusted under 35 U.S.C. 154(b) by 19 days.

(21) Appl. No.: 17/158,927

(22) Filed: Jan. 26, 2021

(65) Prior Publication Data

US 2021/0149751 A1 May 20, 2021

Related U.S. Application Data

(63) Continuation of application No. 16/592,647, filed on Oct. 3, 2019, now Pat. No. 10,908,977.

(51) Int. Cl.
| | |
|---|---|
| *G06F 9/44* | (2018.01) |
| *G06F 9/54* | (2006.01) |
| *G06F 11/30* | (2006.01) |
| *G06F 11/34* | (2006.01) |
| *G06F 9/48* | (2006.01) |

(52) U.S. Cl.
CPC ............ *G06F 9/546* (2013.01); *G06F 9/485* (2013.01); *G06F 11/3006* (2013.01); *G06F 11/3476* (2013.01)

(58) Field of Classification Search
CPC ...................................................... G06F 9/546
USPC ............................................................ 719/313
See application file for complete search history.

(56) References Cited

U.S. PATENT DOCUMENTS

| | | | | |
|---|---|---|---|---|
| 9,319,362 | B1* | 4/2016 | McAllister | .............. H04L 51/12 |
| 2006/0187942 | A1* | 8/2006 | Mizutani | .............. H04L 47/808 |
| | | | | 370/428 |
| 2009/0037518 | A1* | 2/2009 | McAllister | .......... H04L 67/2857 |
| | | | | 709/203 |
| 2009/0150489 | A1* | 6/2009 | Davis | .................... H04W 4/023 |
| | | | | 709/224 |
| 2014/0344288 | A1* | 11/2014 | Evans | ................... G06F 16/954 |
| | | | | 707/749 |

* cited by examiner

*Primary Examiner* — Timothy A Mudrick
(74) *Attorney, Agent, or Firm* — Shook, Hardy & Bacon L.L.P.

(57) ABSTRACT

Embodiments of the present invention are directed to facilitating efficient message queueing. In particular, embodiments herein describe, among other things, a redelivery monitor used to monitor when to redeliver messages, or tasks, for reprocessing based on expiration of a redelivery deadline. In this regard, markers indicating processing states for tasks being processed are read by the redelivery monitor. When the processing state indicates that processing is ongoing, the redelivery deadline is extended such that a message or task is not redelivered for processing while the message or task is being processed.

20 Claims, 34 Drawing Sheets

| Data Summary | | | | |
|---|---|---|---|---|
| Hosts (5) | Sources (8) | Sourcetypes (3) | | ✕ |
| (filter) | | | | |
| Host ⬍ | | Count ⬍ | Last Update ⬍ | |
| mailsv | ◫ ⌄ | 9,829 | 4/29/14 1:32:47.000 PM | |
| vendor_sales | ◫ ⌄ | 30,244 | 4/29/14 1:32:46.000 PM | |
| www1 | ◫ ⌄ | 24,221 | 4/29/14 1:32:44.000 PM | |
| www2 | ◫ ⌄ | 22,595 | 4/29/14 1:32:47.000 PM | |
| www3 | ◫ ⌄ | 22,975 | 4/29/14 1:32:45.000 PM | |

FIG. 6B

INCIDENT REVIEW DASHBOARD 910

Incident Review | Actions▼

Status:    Urgency: high    Owner:    Title:

Security domain:    Governance: pci    Search:

INCIDENT ATTRIBUTE FIELDS 911

24 hour window ▼
Last 15 minutes
Last 60 minutes
Last 4 hours
Last 24 hours
Last 7 days
Last 30 days
Last year
Real-time
Other
All time
Custom time...

TIME RANGE FIELD 912

✓ 225 matching events

◀ Hide   ⊖ Zoom out   ⊕ Zoom to selection   [×] Deselect    ◀   🖫 Save ▼   🞥 Create ▼

Linear scale ▼   1 bar = 1 hour 120
60

TIMELINE 913

4:00 AM Sun Aug 26 2012    6:00 AM    8:00 AM 225 events in a 24 hour window (real-time) (from 11:29:20 AM August 25 to 11:29:20 AM August 26, 2012)

Select all | Unselect all   « prev   1   2   3   4   5   6   7   8   9   10   next »    | Edit selected events | Edit all 225 matching

EVENTS LIST 914

| Select | Options | Time | Security Domain | Title | Urgency | Status | Owner | |
|---|---|---|---|---|---|---|---|---|
| ☐ | ▶ | 8/26/12 11:11:03.000 AM | Access ▼ | Insecure Or Cleartext Authentication Detected ▼ | ⊙ High ▼ | New ▼ | unassigned ▼ | View details |
| ☐ | ▶ | 8/26/12 11:10:07.000 AM | Access ▼ | Insecure Or Cleartext Authentication Detected ▼ | ⊙ High ▼ | New ▼ | unassigned ▼ | View details |
| ☐ | ▶ | 8/26/12 11:00:39.000 AM | Access ▼ | Account (blinebry) Deleted On (PROD-POS-001) ▼ | ⊙ High ▼ | New ▼ | unassigned ▼ | View details |
| ☐ | ▶ | 8/26/12 11:00:39.000 AM | Access ▼ | Account (beu) Deleted On (COREDEV-006) ▼ | ⊙ High ▼ | New ▼ | unassigned ▼ | View details |
| ☐ | ▶ | 8/26/12 11:00:39.000 AM | Access ▼ | Account (combs) Deleted On (HOST-005) ▼ | ⊙ High ▼ | New ▼ | unassigned ▼ | View details |
| ☐ | ▶ | 8/28/12 | Access ▼ | Account (wisner) Deleted On (BUSDEV-005) ▼ | ⊙ High ▼ | New ▼ | unassigned | View details |

FIG. 9B

New Pivot 1,966 events (before 9/22/13 5:19:02.000 PM)

Filters
- All time
- Highest 10 produ... — Highest 10 product name by price

Split Rows
- product name

Split Columns — 1401
- [+]

Column Values — 1402
- [+]

- price
- Count of Success... — 1403
- Sum of price

Save As... ▼ | Clear

Complete | Successful_purchases ▼

Documentation

| product name ◆ | price ◆ | Count of Successful purchases ◆ | Sum of price ▼ |
|---|---|---|---|
| Dream Crusher | 39.99 | 227 — 1404 | 9077.73 — 1405 |
| Manganiello Bros. | 39.99 | 199 | 7958.01 |
| Orvil the Wolverine | 39.99 | 169 | 6758.31 |
| World of Cheese | 24.99 | 267 | 6672.33 |
| Mediocre Kingdoms | 24.99 | 250 | 6247.50 |
| SIM Cubicle | 19.99 | 233 | 4657.67 |
| Final Sequel | 24.99 | 181 | 4523.19 |
| Benign Space Debris | 24.99 | 135 | 3373.65 |
| Curling 2014 | 19.99 | 126 | 2518.74 |
| Holy Blade of Gouda | 5.99 | 179 | 1072.21 |

New Pivot — 1500

1,776,004 of 1,776,004 events matched

Filters: All time

Split Rows: component

Split Columns: group

Column Values: Count of Event O...

| component | NULL | conf | deploy-connections | deploy-server | deploy-client | map | mpool | per_host_thruput | per_index_thruput | per_source_thruput | per_sourcetype_thruput | pipeline | queue | realtime_search_data |
|---|---|---|---|---|---|---|---|---|---|---|---|---|---|---|
| BucketMover | 4 | 0 | 0 | 0 | 0 | 0 | 0 | 0 | 0 | 0 | 0 | 0 | 0 | 0 |
| DatabaseDirectoryManager | 4 | 0 | 0 | 0 | 0 | 0 | 0 | 0 | 0 | 0 | 0 | 0 | 0 | 0 |
| DateParserVerbose | 562 | 0 | 0 | 0 | 0 | 0 | 0 | 0 | 0 | 0 | 0 | 0 | 0 | 0 |
| DiskMon | 3 | 0 | 0 | 0 | 0 | 0 | 0 | 0 | 0 | 0 | 0 | 0 | 0 | 0 |
| IndexConfig | 1 | 0 | 0 | 0 | 0 | 0 | 0 | 0 | 0 | 0 | 0 | 0 | 0 | 0 |
| LicenseUsage | 2872 | 0 | 0 | 0 | 0 | 0 | 0 | 0 | 0 | 0 | 0 | 0 | 0 | 0 |
| Metrics | 0 | 1 | 972 | 2916 | 972 | 0 | 972 | 4621 | 2843 | 9314 | 0 | 9306 | 18797 | 12636 → 1501 |
| OneShotWriter | 12226 | 0 | 0 | 0 | 0 | 0 | 0 | 0 | 0 | 0 | 0 | 0 | 0 | 972 |
| TailingProcessor | 2 | 0 | 0 | 0 | 0 | 0 | 0 | 0 | 0 | 0 | 0 | 0 | 0 | 0 |
| WatchedFile | 18 | 0 | 0 | 0 | 0 | 0 | 0 | 0 | 0 | 0 | 0 | 0 | 0 | 0 |
| cached | 5 | 0 | 0 | 0 | 0 | 0 | 0 | 0 | 0 | 0 | 0 | 0 | 0 | 0 |
| decorators | 2 | 0 | 0 | 0 | 0 | 0 | 0 | 0 | 0 | 0 | 0 | 0 | 0 | 0 |
| utils | 1 | 0 | 0 | 0 | 0 | 0 | 0 | 0 | 0 | 0 | 0 | 0 | 0 | 0 |
| view | 6 | 0 | 0 | 0 | 0 | 0 | 0 | 0 | 0 | 0 | 0 | 0 | 0 | 0 |

20 per page ∨  Format ∨

FIG. 15

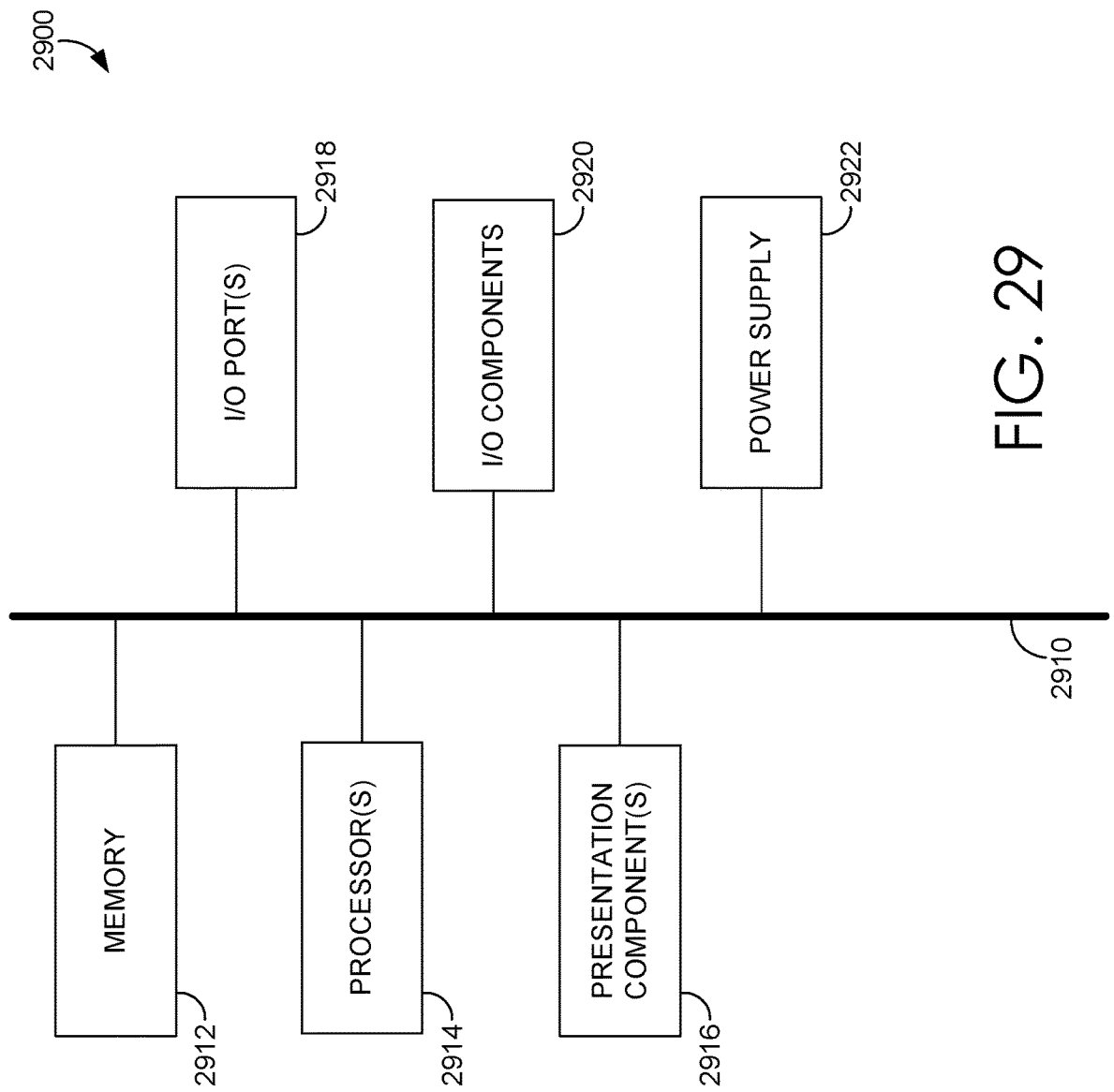

EFFICIENT MESSAGE QUEUING SERVICE USING MULTIPLEXING

CROSS-REFERENCE TO RELATED APPLICATIONS

This application is a Continuation of Ser. No. 16/592,647 filed Oct. 3, 2019 and titled "Efficient Message Queuing Service," the entire contents of which are incorporated by reference herein.

BACKGROUND

Modern data centers often include thousands of hosts that operate collectively to service requests from even larger numbers of remote clients. During operation, components of these data centers can produce significant volumes of raw, machine-generated data. Collecting such data is important for performing various types of analyses. For example, collected data, such as machine-generated data (e.g., performance data, diagnostic data, etc.), may be analyzed to diagnose performance problems, monitor user interactions, and to derive other insights. In many implementations, large-scale data collection is used to collect extensive amounts of data. Such large-scale data collection services can use queuing services to queue messages, or tasks, for processing (e.g., to collect data).

BRIEF DESCRIPTION OF THE DRAWINGS

In the drawings:

FIG. 6B illustrates a data summary dialog that enables a user to select various data sources in accordance with the disclosed embodiments;

FIG. 9B illustrates an incident review dashboard in accordance with the disclosed embodiments;

FIGS. 12-14 illustrate a series of user interface screens for an example data model-driven report generation interface in accordance with the disclosed embodiments;

FIGS. 15-17 illustrate example visualizations generated by a reporting application in accordance with the disclosed embodiments;

FIG. 29 is a block diagram of an example computing device in which embodiments of the present disclosure may be employed.

DETAILED DESCRIPTION

Figure 1:
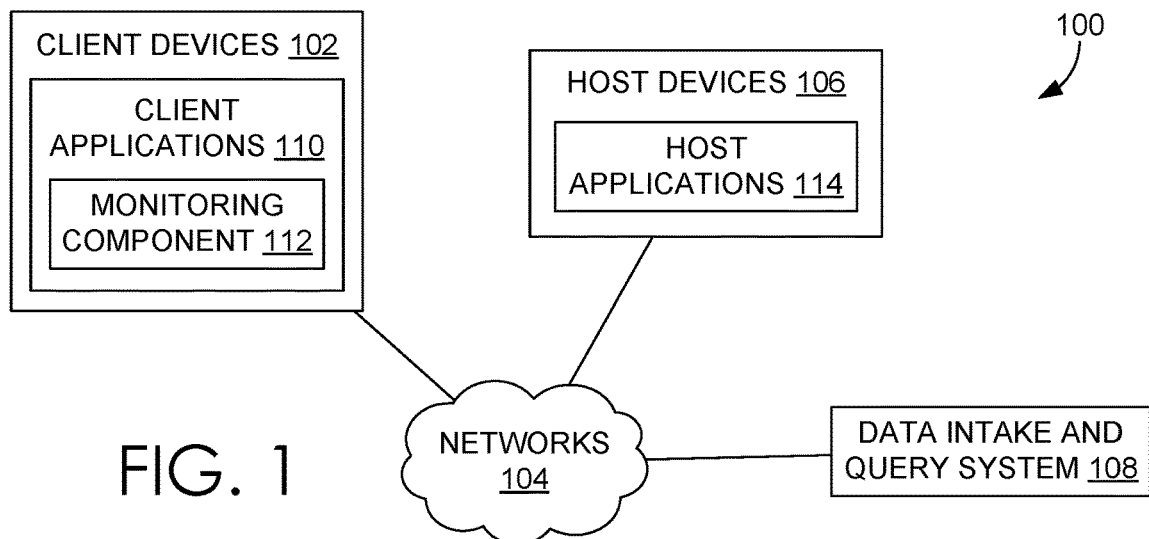
FIG. 1 illustrates a networked computer environment in which an embodiment may be implemented.

Embodiments are described herein according to the following outline:

1.0. General Overview
2.0. Operating Environment
   2.1. Host Devices
   2.2. Client Devices
   2.3. Client Device Applications
   2.4. Data Server System
   2.5. Data Ingestion
      2.5.1. Input
      2.5.2. Parsing
      2.5.3. Indexing
   2.6. Query Processing
   2.7. Field Extraction 2.8. Example Search Screen
2.9. Data Modeling
2.10. Acceleration Techniques
2.10.1. Aggregation Technique
2.10.2. Keyword Index
2.10.3. High Performance Analytics Store
2.10.4. Accelerating Report Generation
2.11. Security Features
2.12. Data Center Monitoring
2.13. Cloud-Based System Overview
2.14. Searching Externally Archived Data
2.14.1. ERP Process Features
2.15 Cloud-Based Architecture
3.0. Overview of Facilitating Scalable and Secure Data Collection
   3.1. Scalable Data-Collection System in a Data-Collection Environment
   3.2. Scalable and Secure Data Collection Methods
4.0 Overview of Facilitating Efficient Message Queuing
   4.1 Overview of an Efficient Message Queuing Service
   4.2 Efficient Message Queueing Methods
5.0 Illustrative Hardware System
   1.0 General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. Operating Environment

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
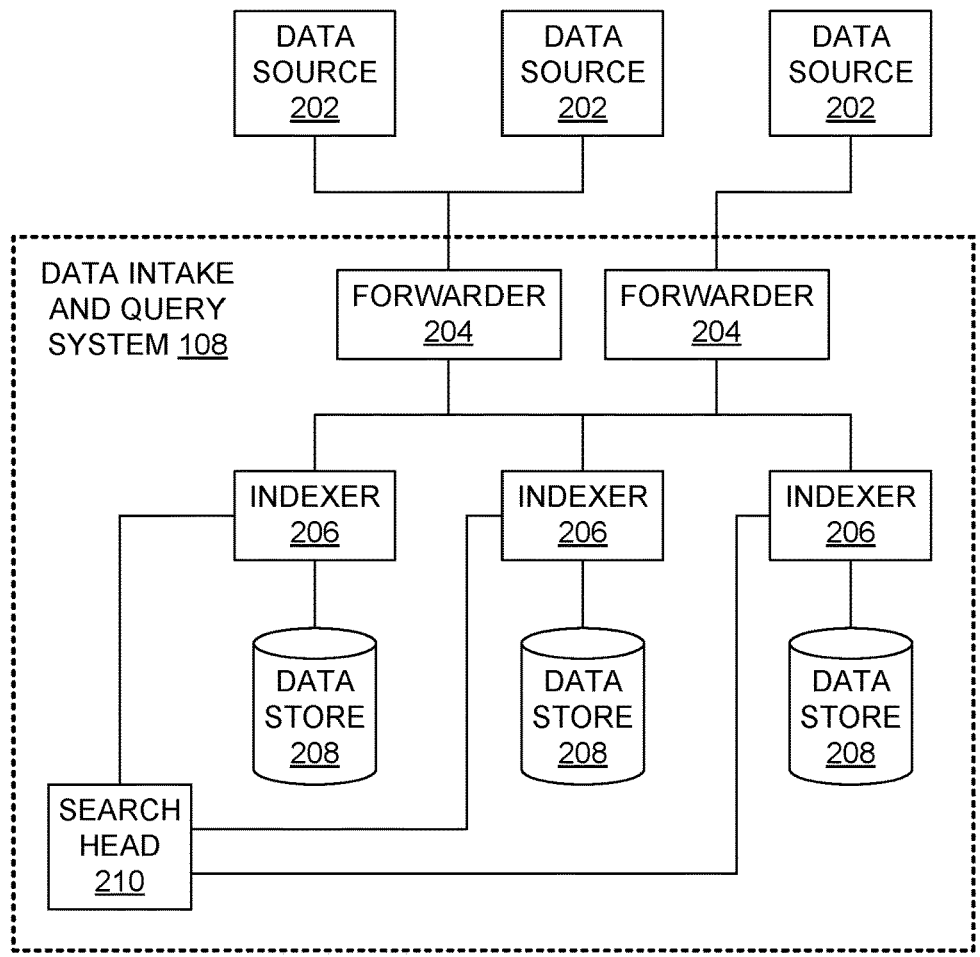
FIG. 2 illustrates a block diagram of an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
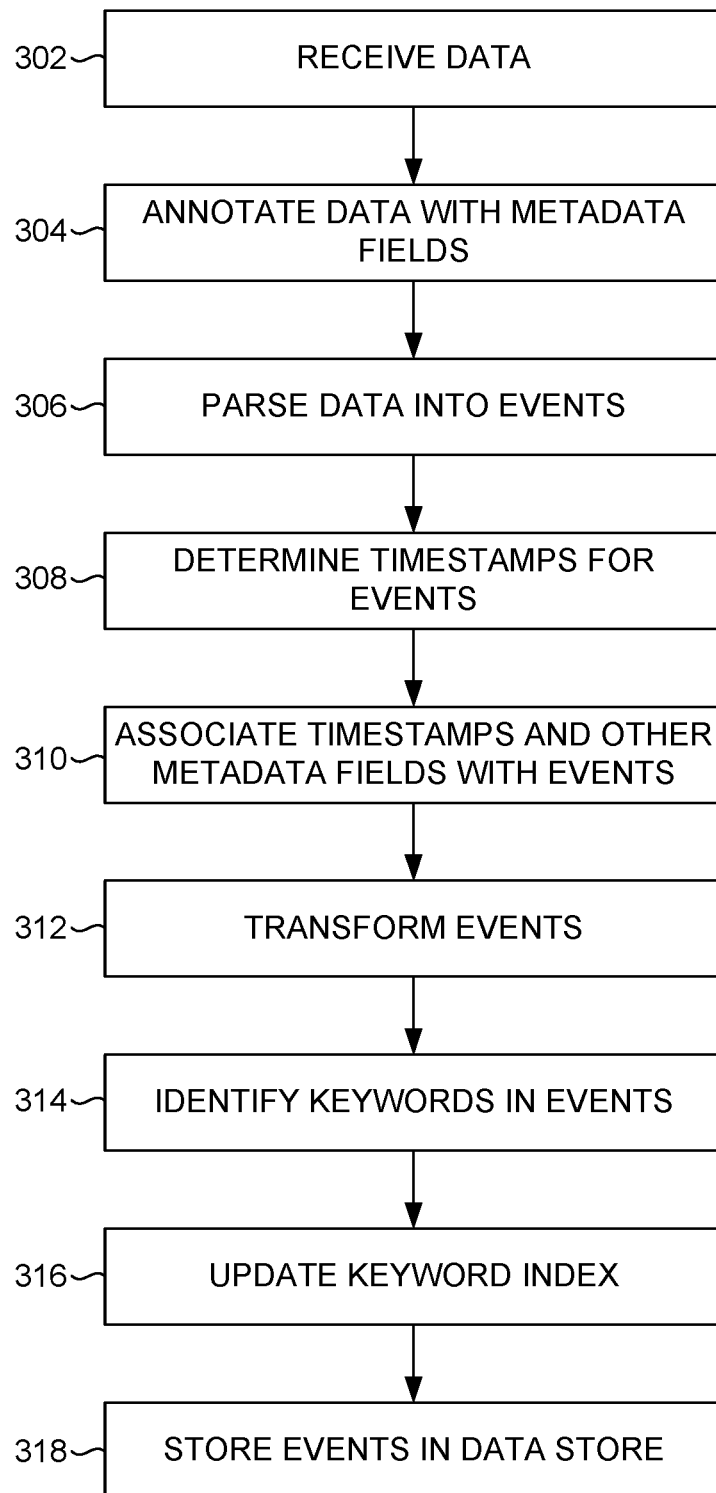
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY", filed on 30 Apr. 2014, and in U.S. patent application Ser. No. 14/266,817, entitled "MULTI-SITE CLUSTERING", also filed on 30 Apr. 2014, each of which is hereby incorporated by reference in its entirety for all purposes.

2.6. Query Processing

Figure 4:
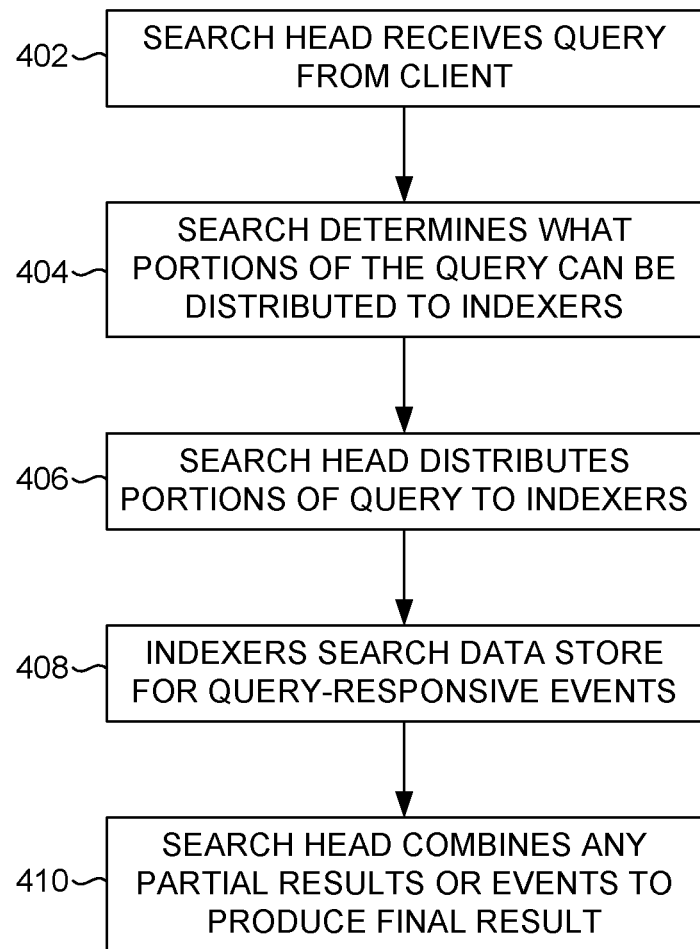
FIG. 4 is a flow diagram that illustrates how a search head and indexers perform a search query in accordance with the disclosed embodiments.

FIG. 4 is a flow diagram that illustrates an exemplary process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in FIG.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

Figure 5:
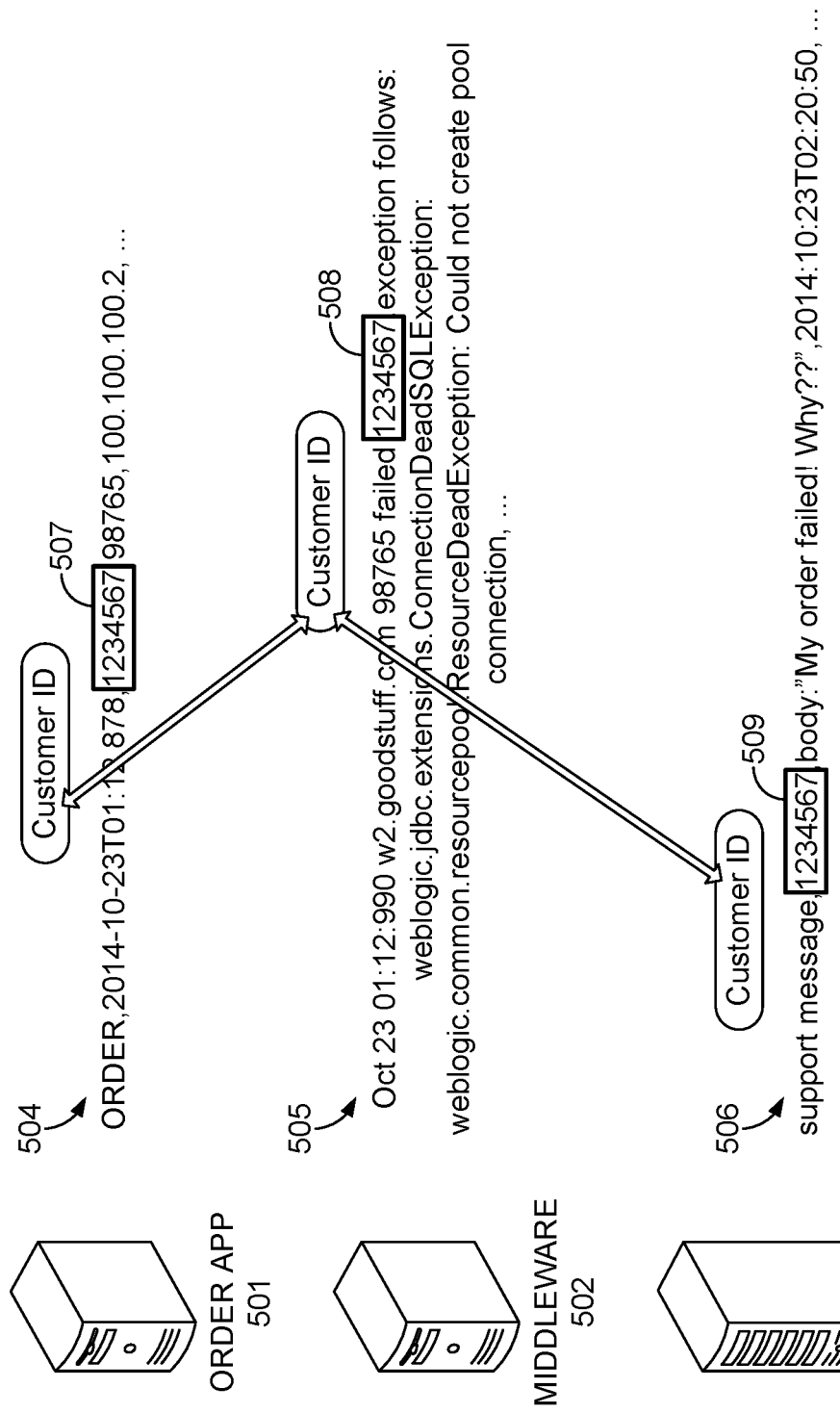
FIG. 5 illustrates a scenario where a common customer ID is found among log data received from three disparate sources in accordance with the disclosed embodiments.

FIG. 5 illustrates an example of raw machine data received from disparate data sources. In this example, a user submits an order for merchandise using a vendor's shopping application program 501 running on the user's system. In this example, the order was not delivered to the vendor's server due to a resource exception at the destination server that is detected by the middleware code 502. The user then sends a message to the customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 507, 508, and 509, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Example Search Screen

Figure 6A:
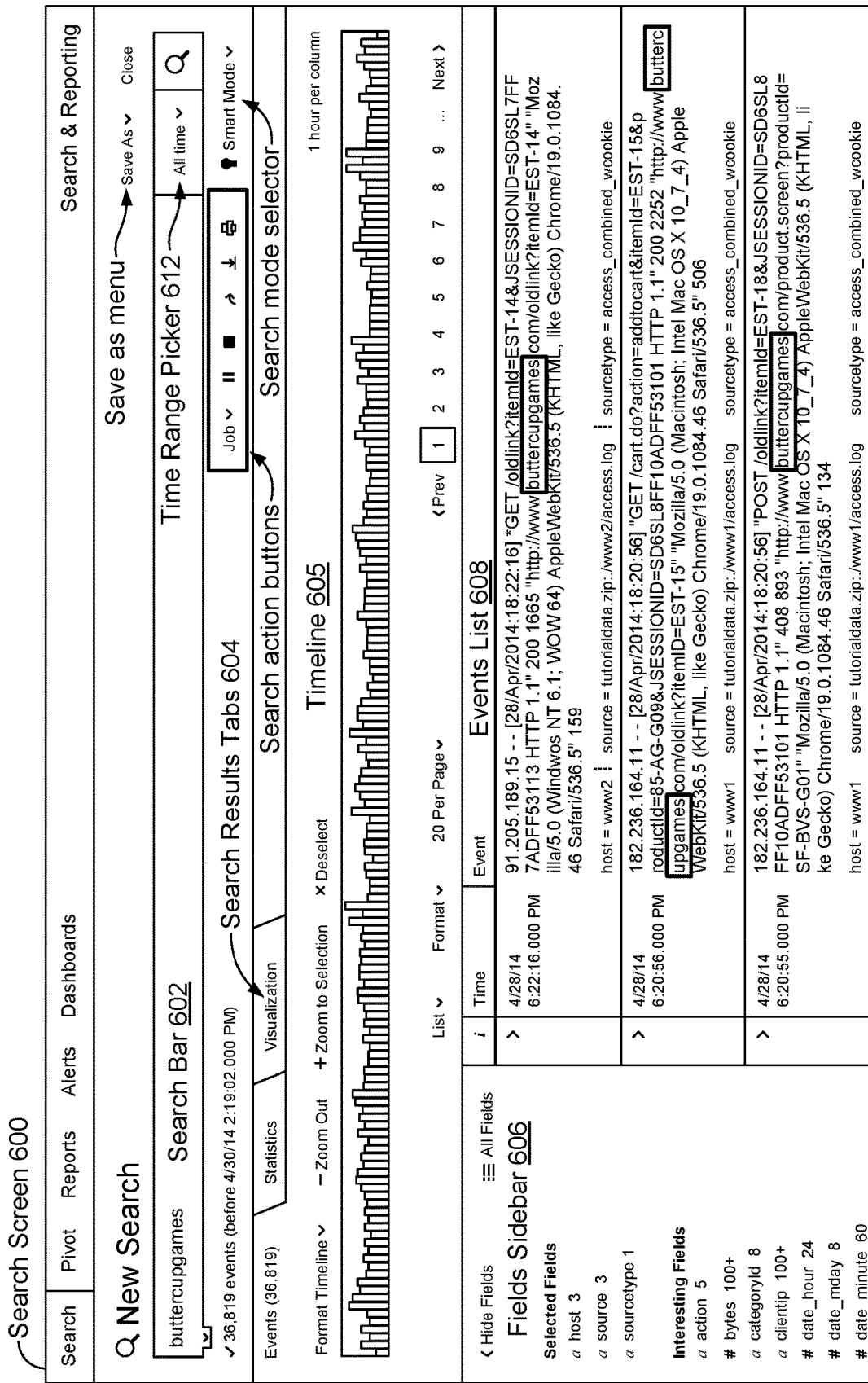
FIG. 6A illustrates a search screen in accordance with the disclosed embodiments.

FIG. 6A illustrates an example search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, such as by selecting specific hosts and log files.

After the search is executed, the search screen 600 in FIG. 6A can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

2.9. Data Models

A data model is a hierarchically structured search-time mapping of semantic knowledge about one or more datasets. It encodes the domain knowledge necessary to build a variety of specialized searches of those datasets. Those searches, in turn, can be used to generate reports.

A data model is composed of one or more "objects" (or "data model objects") that define or otherwise correspond to a specific set of data.

Objects in data models can be arranged hierarchically in parent/child relationships. Each child object represents a subset of the dataset covered by its parent object. The top-level objects in data models are collectively referred to as "root objects."

Child objects have inheritance. Data model objects are defined by characteristics that mostly break down into constraints and attributes. Child objects inherit constraints and attributes from their parent objects and have additional constraints and attributes of their own. Child objects provide a way of filtering events from parent objects. Because a child object always provides an additional constraint in addition to the constraints it has inherited from its parent object, the dataset it represents is always a subset of the dataset that its parent represents.

For example, a first data model object may define a broad set of data pertaining to e-mail activity generally, and another data model object may define specific datasets within the broad dataset, such as a subset of the e-mail data pertaining specifically to e-mails sent. Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

A child of the parent data model may be defined by a search (typically a narrower search) that produces a subset of the events that would be produced by the parent data model's search. The child's set of fields can include a subset of the set of fields of the parent data model and/or additional fields. Data model objects that reference the subsets can be arranged in a hierarchical manner, so that child subsets of events are proper subsets of their parents. A user iteratively applies a model development tool (not shown in FIG.) to prepare a query that defines a subset of events and assigns an object name to that subset. A child subset is created by further limiting a query that generated a parent subset. A late-binding schema of field extraction rules is associated with each object or subset in the data model.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. patent application Ser. No. 14/611,232, entitled "GENERATION OF A DATA MODEL APPLIED TO QUERIES", filed on 31 Jan. 2015, and U.S. patent application Ser. No. 14/815,884, entitled "GENERATION OF A DATA MODEL APPLIED TO OBJECT QUERIES", filed on 31 Jul. 2015, each of which is hereby incorporated by reference in its entirety for all purposes. See, also, Knowledge Manager Manual, Build a Data Model, Splunk Enterprise 6.1.3 pp. 150-204 (Aug. 25, 2014).

A data model can also include reports. One or more report formats can be associated with a particular data model and be made available to run against the data model. A user can use child objects to design reports with object datasets that already have extraneous data pre-filtered out. In an embodiment, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes, and in Pivot Manual, Splunk Enterprise 6.1.3 (Aug. 4, 2014). Data visualizations also can be generated in a variety of formats, by reference to the data model. Reports, data visualizations, and data model objects can be saved and associated with the data model for future use. The data model object may be used to perform searches of other data.

FIGS. 12, 13, and 7A-7D illustrate a series of user interface screens where a user may select report generation options using data models. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

Figure 12:
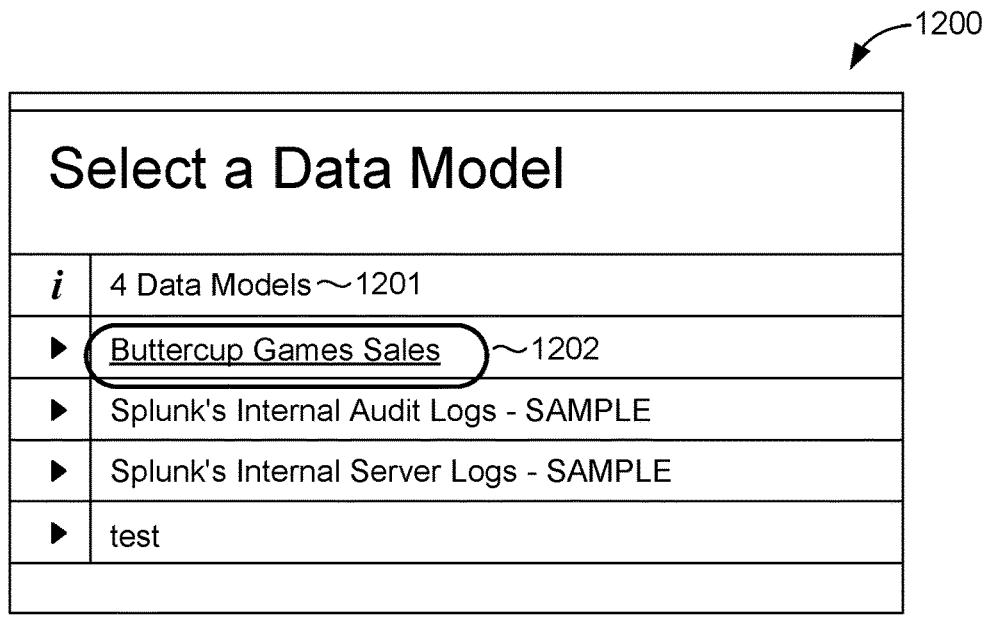

The selection of a data model object for use in driving a report generation may be facilitated by a data model object selection interface. FIG. 12 illustrates an example interactive data model selection graphical user interface 1200 of a report editor that displays a listing of available data models 1201. The user may select one of the data models 1202.

Figure 13:
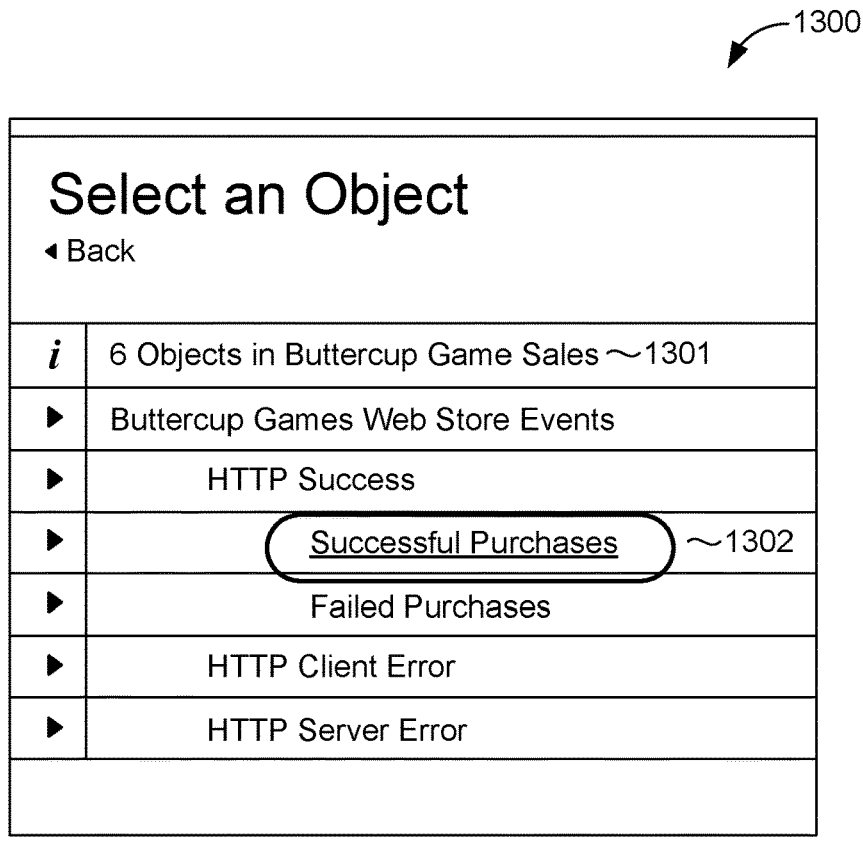

FIG. 13 illustrates an example data model object selection graphical user interface 1300 that displays available data objects 1301 for the selected data object model 1202. The user may select one of the displayed data model objects 1302 for use in driving the report generation process.

Figure 7A:
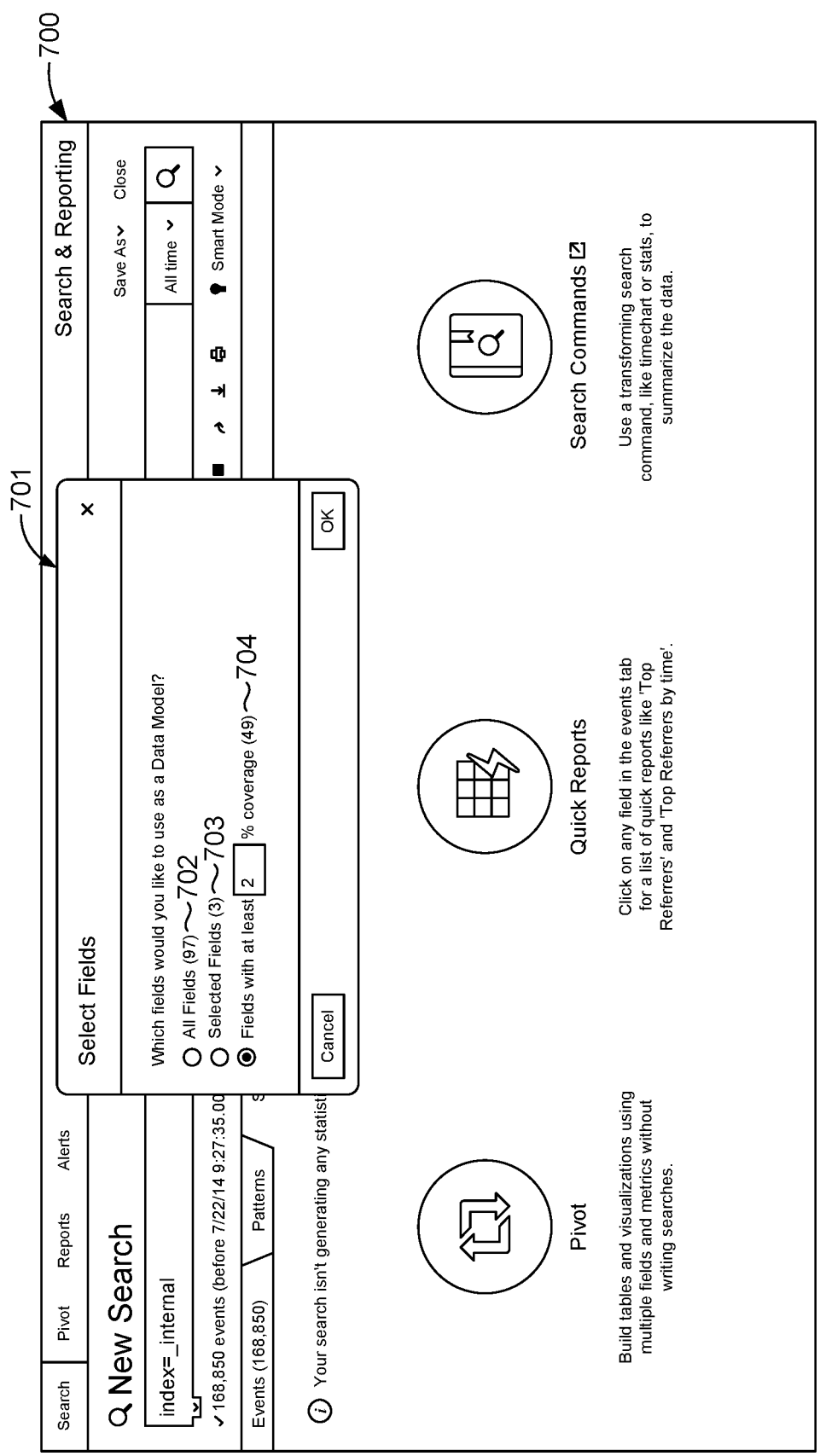
FIGS. 7A-7D illustrate a series of user interface screens for an example data model-driven report generation interface in accordance with the disclosed embodiments.

Once a data model object is selected by the user, a user interface screen 700 shown in FIG. 7A may display an interactive listing of automatic field identification options 701 based on the selected data model object. For example, a user may select one of the three illustrated options (e.g., the "All Fields" option 702, the "Selected Fields" option 703, or the "Coverage" option (e.g., fields with at least a specified % of coverage) 704). If the user selects the "All Fields" option 702, all of the fields identified from the events that were returned in response to an initial search query may be selected. That is, for example, all of the fields of the identified data model object fields may be selected. If the user selects the "Selected Fields" option 703, only the fields from the fields of the identified data model object fields that are selected by the user may be used. If the user selects the "Coverage" option 704, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 702 indicates that 97 fields will be selected if the "All Fields" option is selected. The "3" displayed next to the "Selected Fields" option 703 indicates that 3 of the 97 fields will be selected if the "Selected Fields" option is selected. The "49" displayed next to the "Coverage" option 704 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 7B:
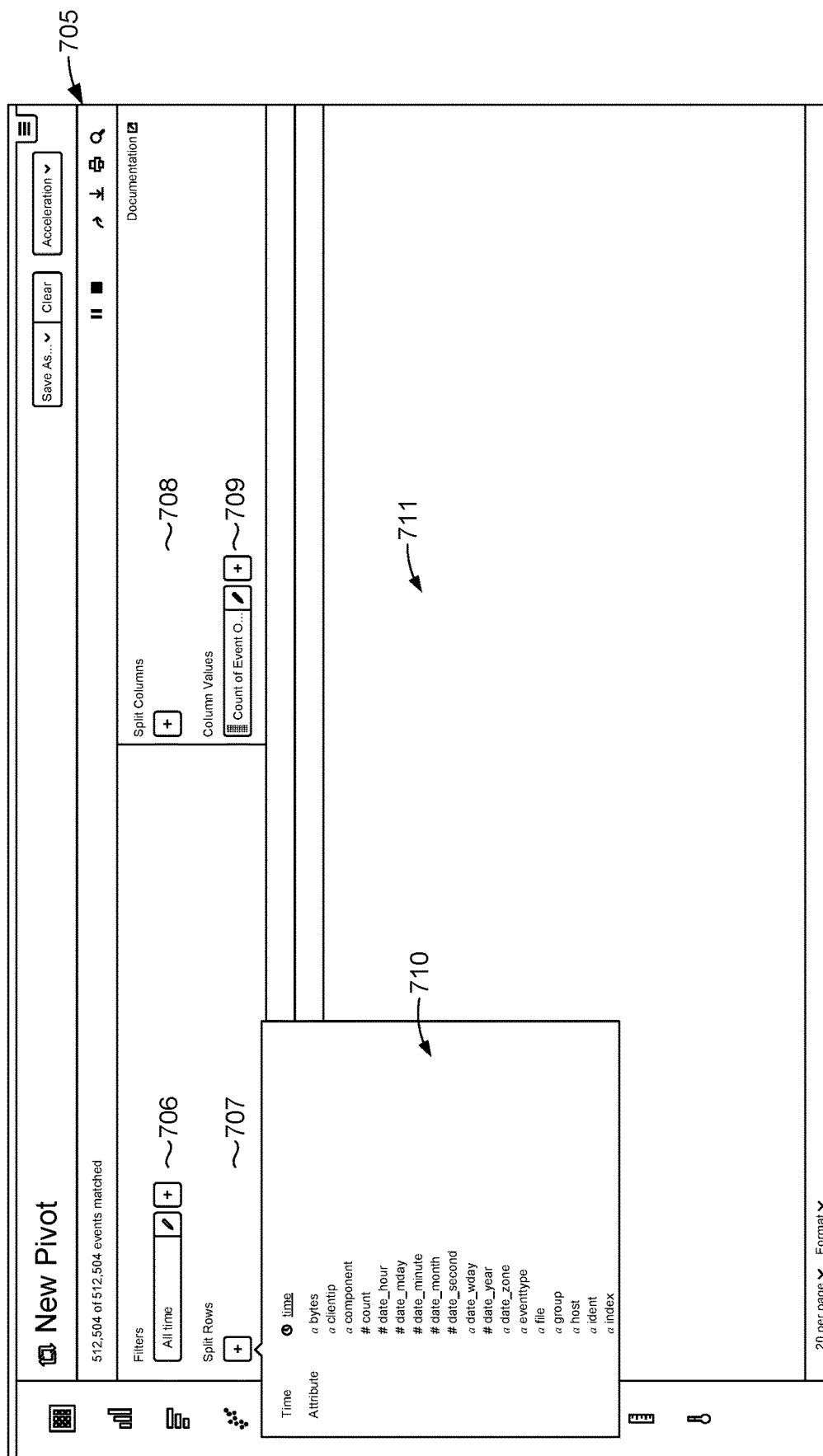
Figure 7C:
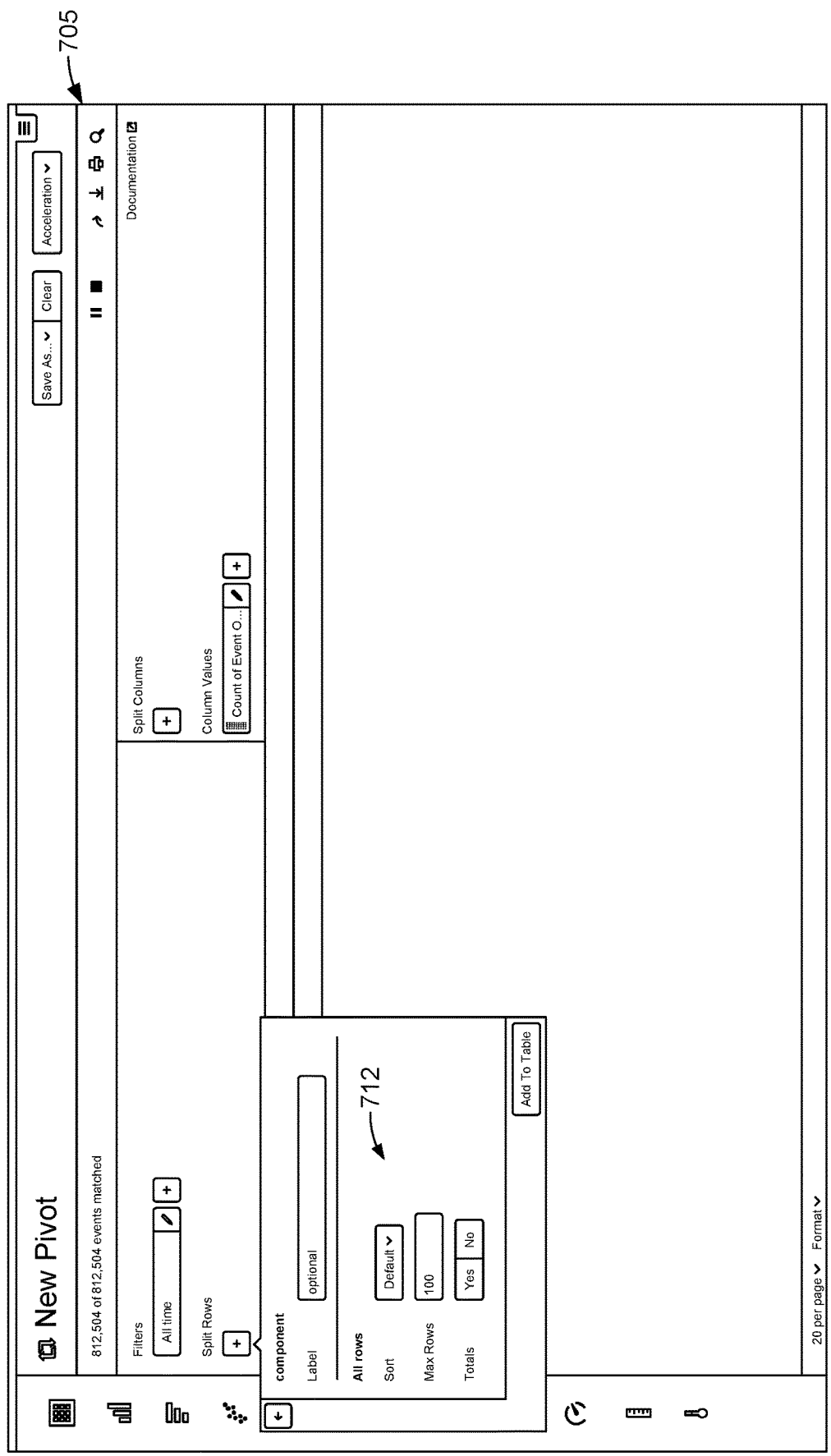

FIG. 7B illustrates an example graphical user interface screen (also called the pivot interface) 705 displaying the reporting application's "Report Editor" page. The screen may display interactive elements for defining various elements of a report. For example, the page includes a "Filters"

element 706, a "Split Rows" element 707, a "Split Columns" element 708, and a "Column Values" element 709. The page may include a list of search results 711. In this example, the Split Rows element 707 is expanded, revealing a listing of fields 710 that can be used to define additional criteria (e.g., reporting criteria). The listing of fields 710 may correspond to the selected fields (attributes). That is, the listing of fields 710 may list only the fields previously selected, either automatically and/or manually by a user. FIG. 7C illustrates a formatting dialogue 712 that may be displayed upon selecting a field from the listing of fields 710. The dialogue can be used to format the display of the results of the selection (e.g., label the column to be displayed as "component").

Figure 7D:
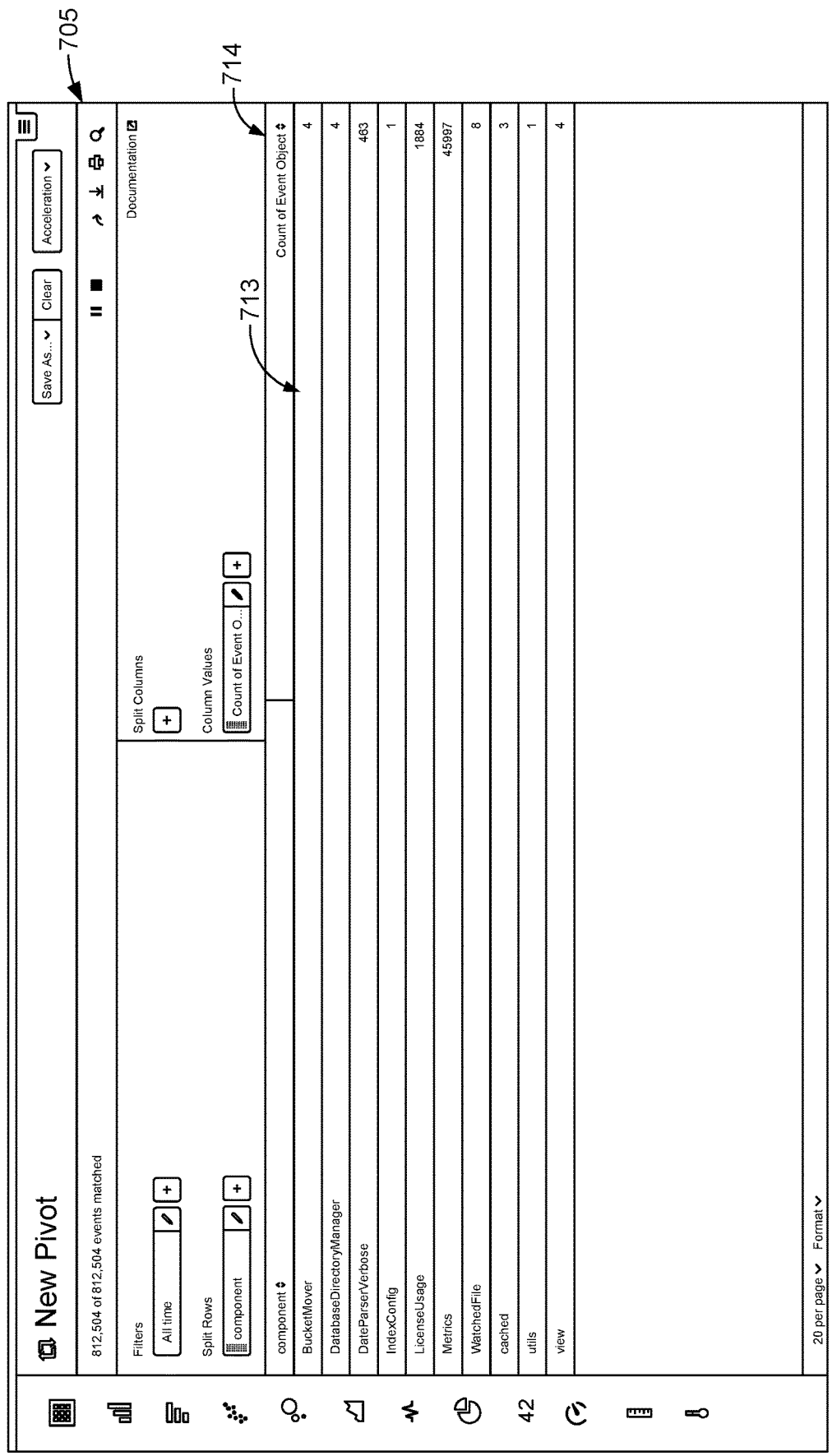

FIG. 7D illustrates an example graphical user interface screen 705 including a table of results 713 based on the selected criteria including splitting the rows by the "component" field. A column 714 having an associated count for each component listed in the table may be displayed that indicates an aggregate count of the number of times that the particular field-value pair (e.g., the value in a row) occurs in the set of events responsive to the initial search query.

FIG. 14 illustrates an example graphical user interface screen 1400 that allows the user to filter search results and to perform statistical analysis on values extracted from specific fields in the set of events. In this example, the top ten product names ranked by price are selected as a filter 1401 that causes the display of the ten most popular products sorted by price. Each row is displayed by product name and price 1402. This results in each product displayed in a column labeled "product name" along with an associated price in a column labeled "price" 1406. Statistical analysis of other fields in the events associated with the ten most popular products have been specified as column values 1403. A count of the number of successful purchases for each product is displayed in column 1404. These statistics may be produced by filtering the search results by the product name, finding all occurrences of a successful purchase in a field within the events and generating a total of the number of occurrences. A sum of the total sales is displayed in column 1405, which is a result of the multiplication of the price and the number of successful purchases for each product.

Figure 16:
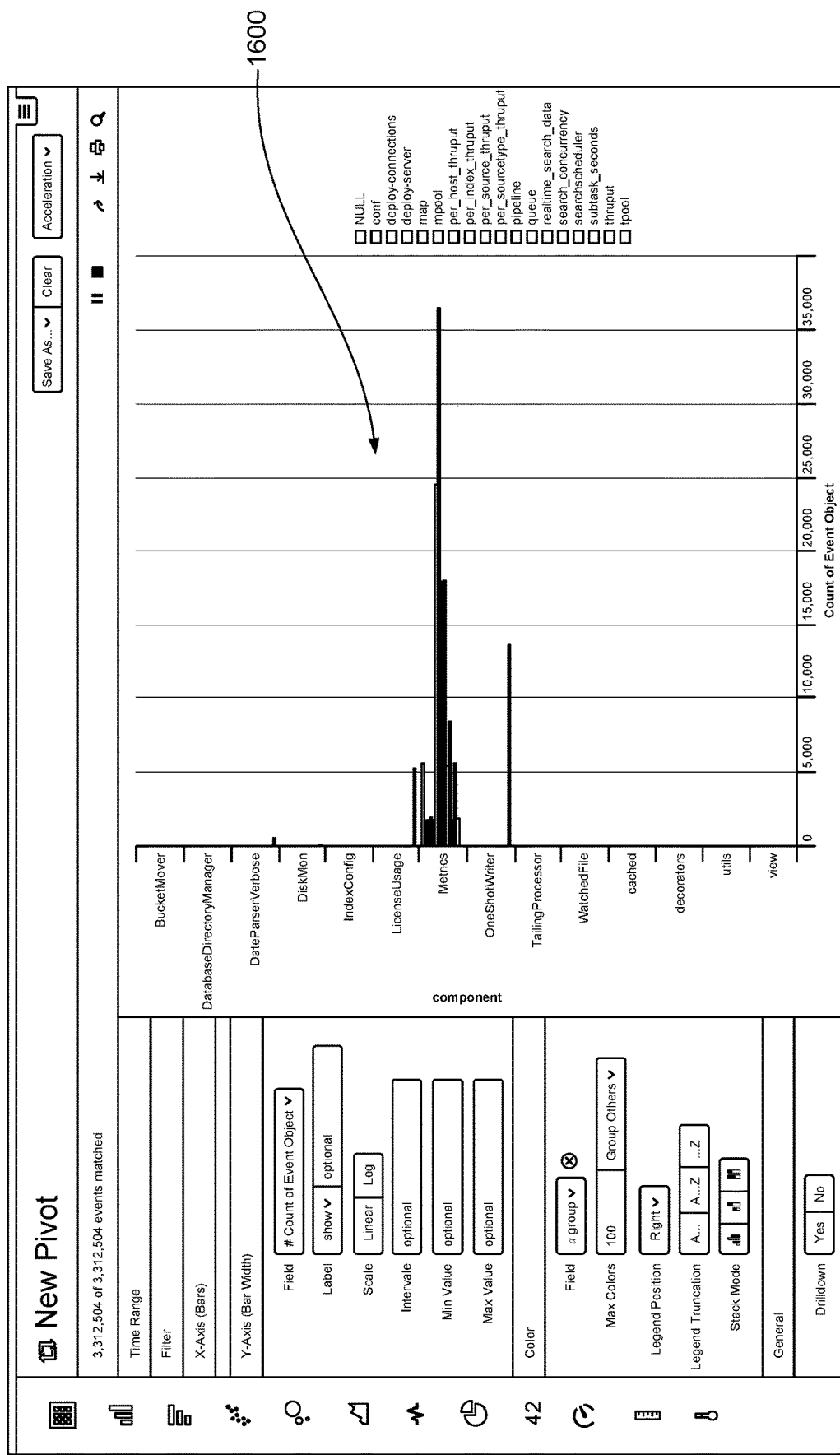
Figure 17:
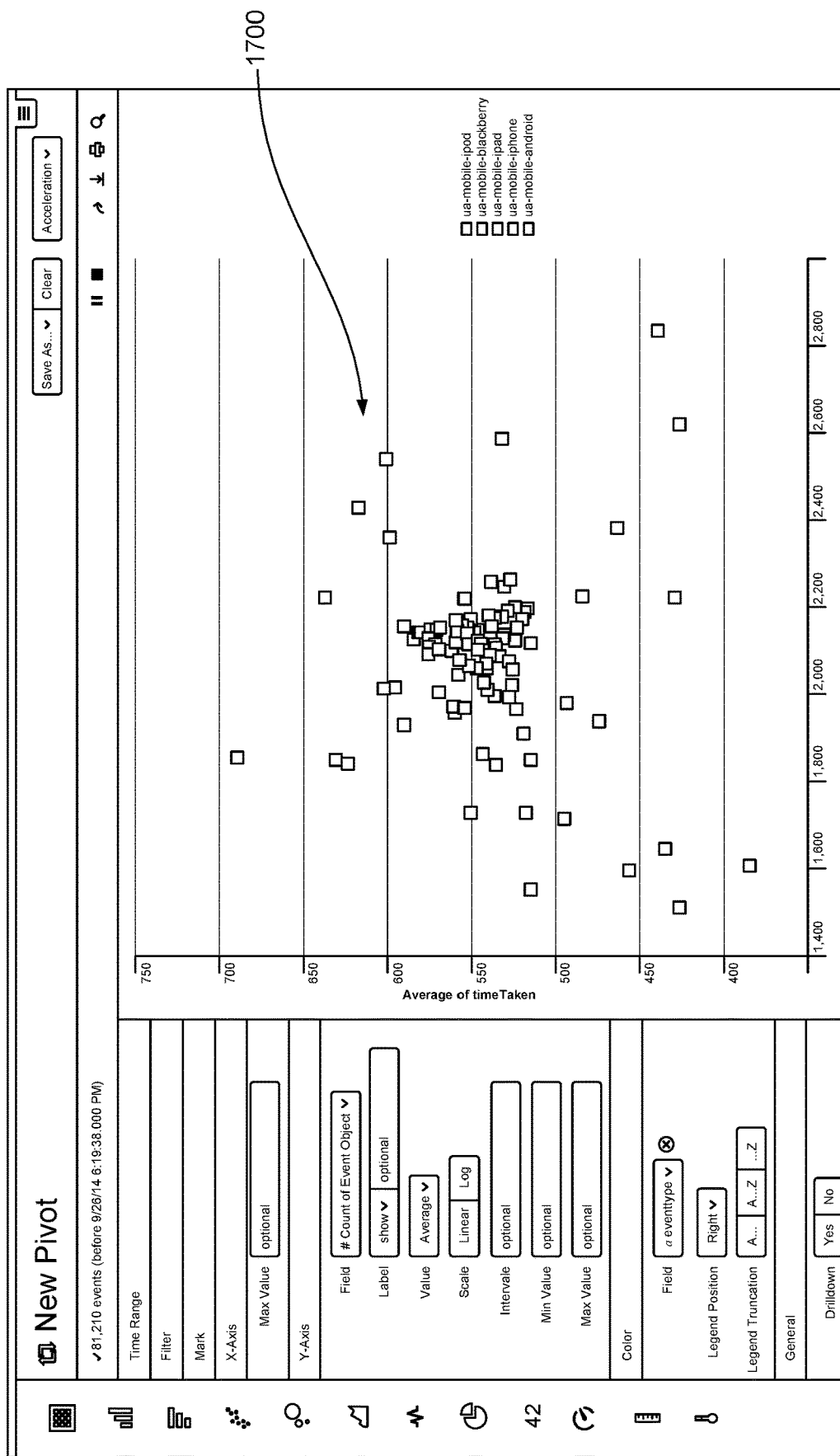

The reporting application allows the user to create graphical visualizations of the statistics generated for a report. For example, FIG. 15 illustrates an example graphical user interface 1500 that displays a set of components and associated statistics 1501. The reporting application allows the user to select a visualization of the statistics in a graph (e.g., bar chart, scatter plot, area chart, line chart, pie chart, radial gauge, marker gauge, filler gauge, etc.). FIG. 16 illustrates an example of a bar chart visualization 1600 of an aspect of the statistical data 1501. FIG. 17 illustrates a scatter plot visualization 1700 of an aspect of the statistical data 1501.

2.10. Acceleration Technique

The above-described system provides significant flexibility by enabling a user to analyze massive quantities of minimally processed data "on the fly" at search time instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, SPLUNK® ENTERPRISE system employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.10.1. Aggregation Technique

Figure 8:
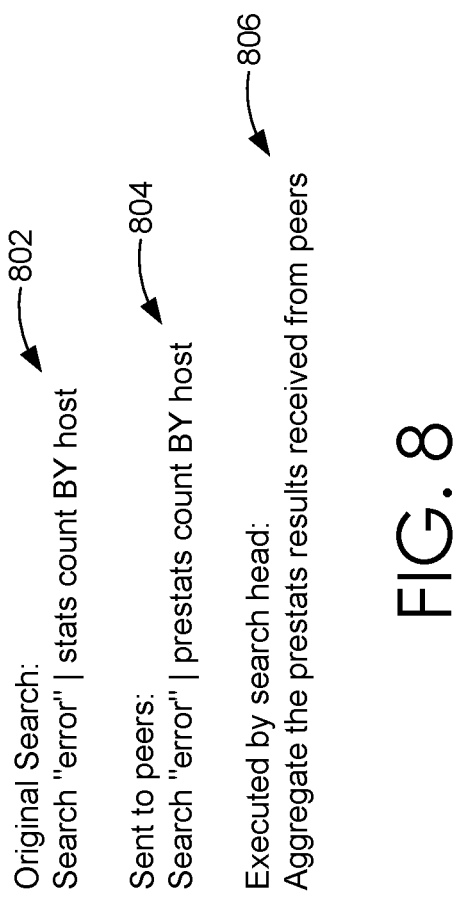
FIG. 8 illustrates an example search query received from a client and executed by search peers in accordance with the disclosed embodiments.

To facilitate faster query processing, a query can be structured such that multiple indexers perform the query in parallel, while aggregation of search results from the multiple indexers is performed locally at the search head. For example, FIG. 8 illustrates how a search query 802 received from a client at a search head 210 can split into two phases, including: (1) subtasks 804 (e.g., data retrieval or simple filtering) that may be performed in parallel by indexers 206 for execution, and (2) a search results aggregation operation 806 to be executed by the search head when the results are ultimately collected from the indexers.

During operation, upon receiving search query 802, a search head 210 determines that a portion of the operations involved with the search query may be performed locally by the search head. The search head modifies search query 802 by substituting "stats" (create aggregate statistics over results sets received from the indexers at the search head) with "prestats" (create statistics by the indexer from local results set) to produce search query 804, and then distributes search query 804 to distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 4, or may alternatively distribute a modified version (e.g., a more restricted version) of the search query to the search peers. In this example, the indexers are responsible for producing the results and sending them to the search head. After the indexers return the results to the search head, the search head aggregates the received results 806 to form a single search result set. By executing the query in this manner, the system effectively distributes the computational operations across the indexers while minimizing data transfers.

2.10.2. Keyword Index

As described above with reference to the flow charts in FIG. 3 and FIG. 4, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.10.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. patent application Ser. No. 14/170,159, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.10.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-miming the query for previous time periods, so advantageously only the newer event data needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety.

2.11. Security Features

The SPLUNK® ENTERPRISE platform provides various schemas, dashboards and visualizations that simplify developers' task to create applications with additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. SPLUNK® APP FOR ENTERPRISE SECURITY provides the security practitioner with visibility into security-relevant threats found in the enterprise infrastructure by capturing, monitoring, and reporting on data from enterprise security devices, systems, and applications. Through the use of SPLUNK® ENTERPRISE searching and reporting capabilities, SPLUNK® APP FOR ENTERPRISE SECURITY provides a top-down and bottom-up view of an organization's security posture.

The SPLUNK® APP FOR ENTERPRISE SECURITY leverages SPLUNK® ENTERPRISE search-time normalization techniques, saved searches, and correlation searches to provide visibility into security-relevant threats and activity and generate notable events for tracking. The App enables the security practitioner to investigate and explore the data to find new or unknown threats that do not follow signature-based patterns.

Conventional Security Information and Event Management (SIEM) systems that lack the infrastructure to effectively store and analyze large volumes of security-related data. Traditional SIEM systems typically use fixed schemas to extract data from pre-defined security-related fields at data ingestion time and storing the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data and enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. patent application Ser. No. 13/956,252, entitled "INVESTIGATIVE AND DYNAMIC DETECTION OF POTENTIAL SECURITY-THREAT INDICATORS FROM EVENTS IN BIG DATA", filed on 31 Jul. 2013, U.S. patent application Ser. No. 14/445,018, entitled "GRAPHIC DISPLAY OF SECURITY THREATS BASED ON INDICATIONS OF ACCESS TO NEWLY REGISTERED DOMAINS", filed on 28 Jul. 2014, U.S. patent application Ser. No. 14/445,023, entitled "SECURITY THREAT DETECTION OF NEWLY REGISTERED DOMAINS", filed on 28 Jul. 2014, U.S. patent application Ser. No. 14/815,971, entitled "SECURITY THREAT DETECTION USING DOMAIN NAME ACCESSES", filed on 1 Aug. 2015, and U.S. patent application Ser. No. 14/815,972, entitled "SECURITY THREAT DETECTION USING DOMAIN NAME REGISTRATIONS", filed on 1 Aug. 2015, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting "notable events" that are likely to indicate a security threat. These notable events can be detected in a number of ways: (1) a user can notice a correlation in the data and can manually identify a corresponding group of one or more events as "notable;" or (2) a user can define a "correlation search" specifying criteria for a notable event, and every time one or more events satisfy the criteria, the application can indicate that the one or more events are notable. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 9A:
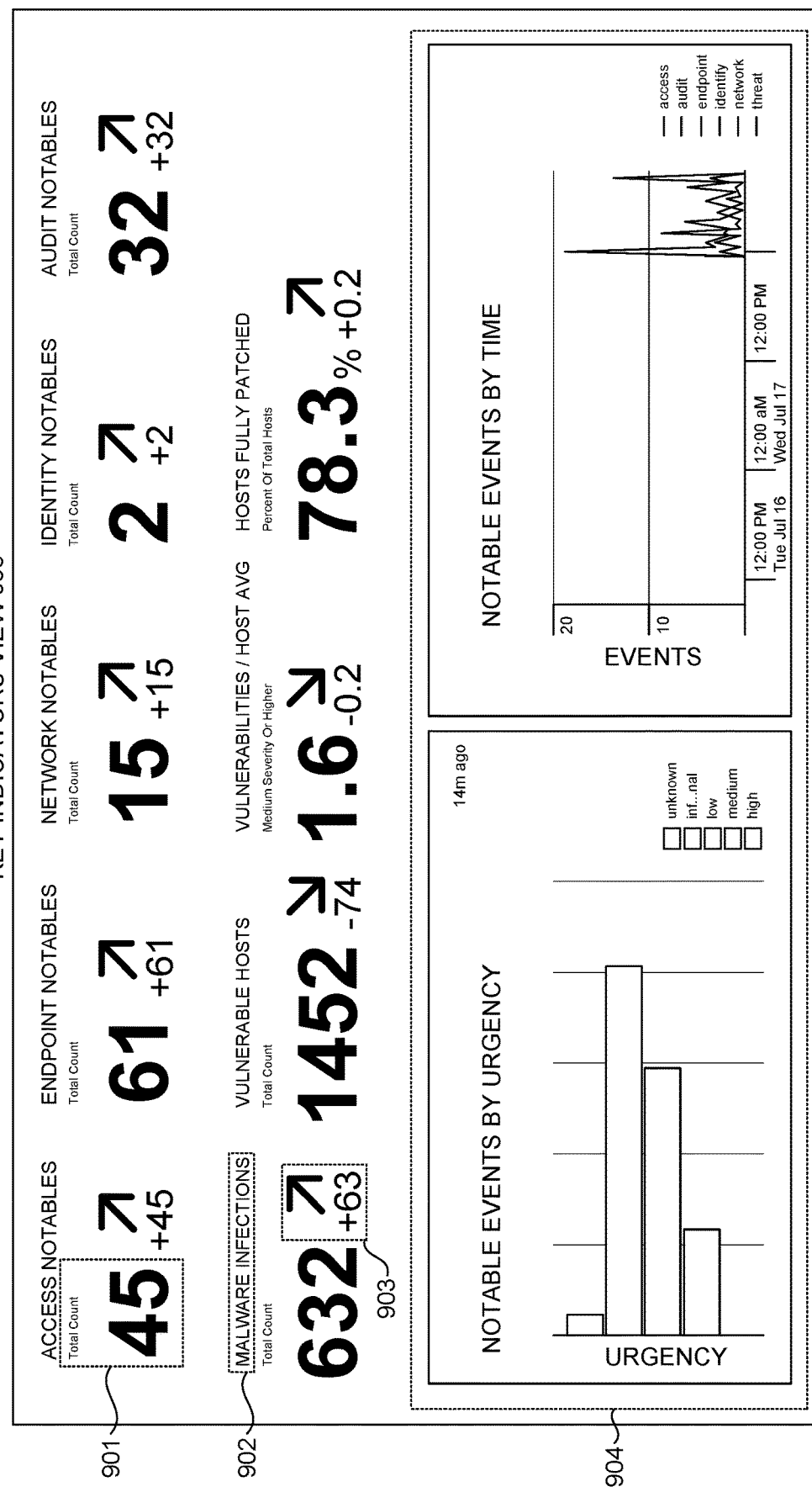
FIG. 9A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics, such as counts of different types of notable events. For example, FIG. 9A illustrates an example key indicators view 900 that comprises a dashboard, which can display a value 901, for various security-related metrics, such as malware infections 902. It can also display a change in a metric value 903, which indicates that the number of malware infections increased by 63 during the preceding interval. Key indicators view 900 additionally displays a histogram panel 904 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 9B illustrates an example incident review dashboard 910 that includes a set of incident attribute fields 911 that, for example, enables a user to specify a time range field 912 for the displayed events. It also includes a timeline 913 that graphically illustrates the number of incidents that occurred in time intervals over the selected time range. It additionally displays an events list 914 that enables a user to view a list of all of the notable events that match the criteria in the incident attributes fields 911. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.12. Data Center Monitoring

As mentioned above, the SPLUNK® ENTERPRISE platform provides various features that simplify the developer's task to create various applications. One such application is SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the SPLUNK® APP FOR VMWARE® stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the SPLUNK® APP FOR VMWARE® provides pre-specified schemas for extracting relevant values from different types of performance-related event data, and also enables a user to define such schemas.

Figure 9C:
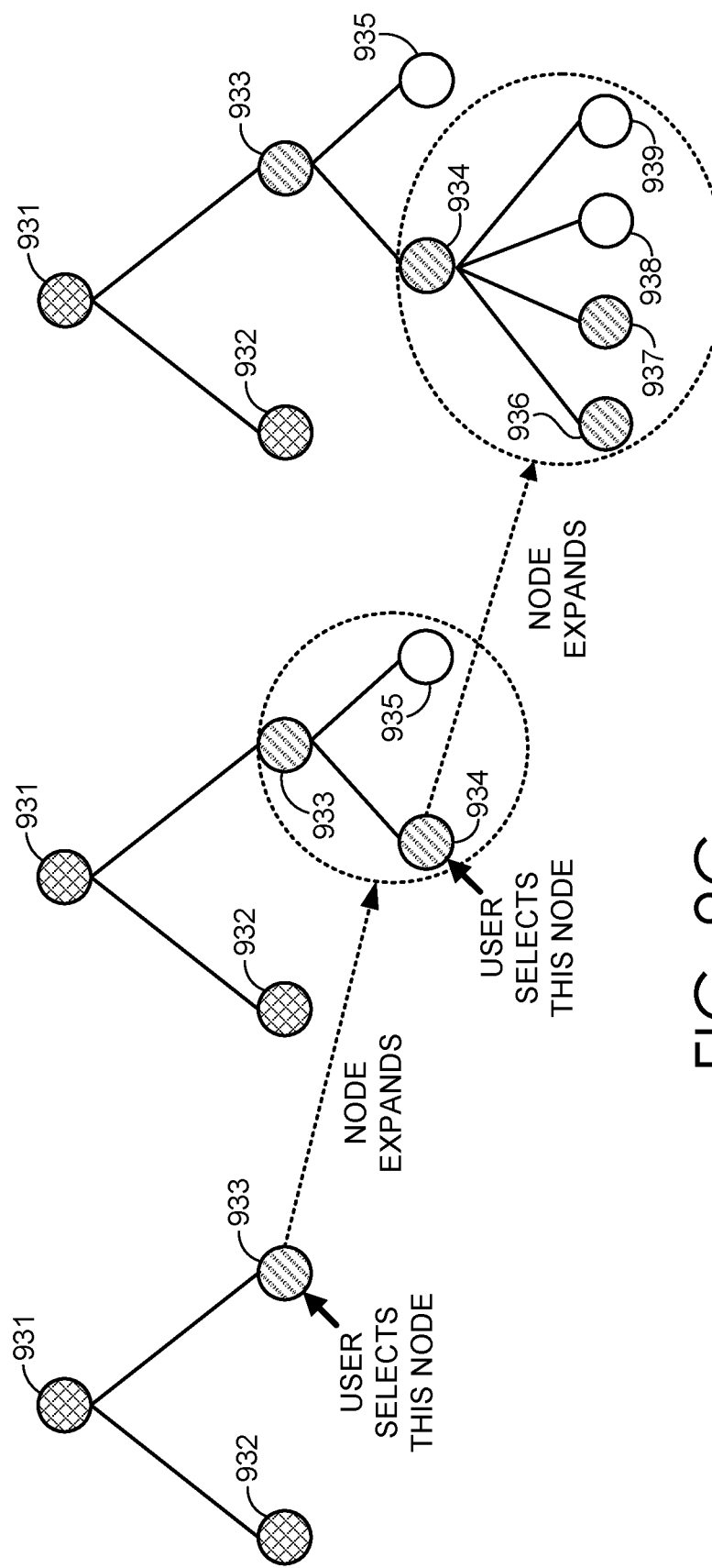
FIG. 9C illustrates a proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 9C, wherein nodes 933 and 934 are selectively expanded. Note that nodes 931-939 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/253,490, entitled "PROACTIVE MONITORING TREE WITH SEVERITY STATE SORTING", filed on 15 Apr. 2014, and U.S. patent application Ser. No. 14/812,948, also entitled "PROACTIVE MONITORING TREE WITH SEVERITY STATE SORTING", filed on 29 Jul. 2015, each of which is hereby incorporated by reference in its entirety for all purposes.

Figure 9D:
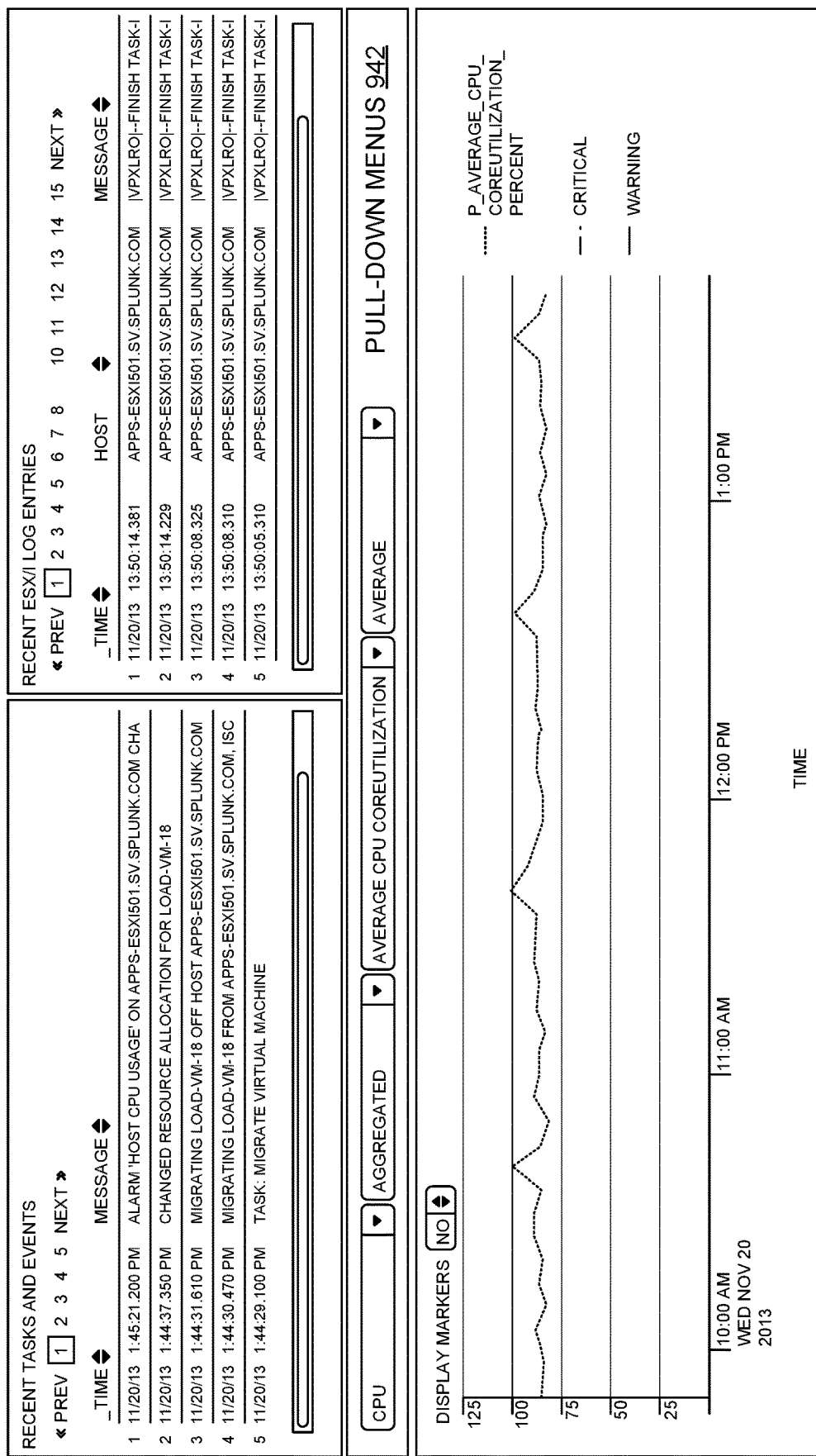
FIG. 9D illustrates a user interface screen displaying both log data and performance data in accordance with the disclosed embodiments.

The SPLUNK® APP FOR VMWARE® also provides a user interface that enables a user to select a specific time range and then view heterogeneous data comprising events, log data, and associated performance metrics for the selected time range. For example, the screen illustrated in FIG. 9D displays a listing of recent "tasks and events" and a listing of recent "log entries" for a selected time range above a performance-metric graph for "average CPU core utilization" for the selected time range. Note that a user is able to operate pull-down menus 942 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

2.13. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 10:
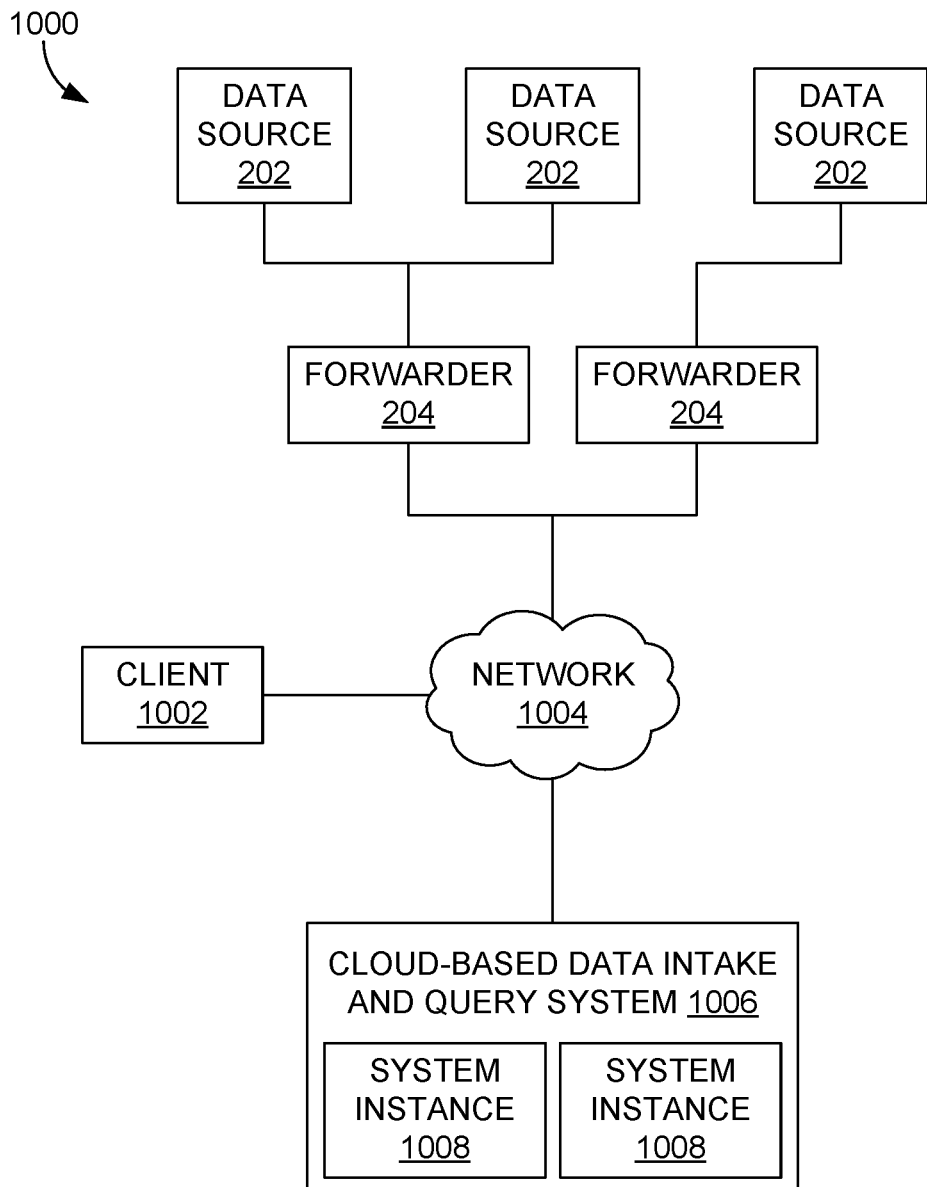
FIG. 10 illustrates a block diagram of an example cloud-based data intake and query system in which an embodiment may be implemented.

FIG. 10 illustrates a block diagram of an example cloud-based data intake and query system. Similar to the system of FIG. 2, the networked computer system 1000 includes input data sources 202 and forwarders 204. These input data sources and forwarders may be in a subscriber's private computing environment. Alternatively, they might be directly managed by the service provider as part of the cloud service. In the example system 1000, one or more forwarders 204 and client devices 1002 are coupled to a cloud-based data intake and query system 1006 via one or more networks 1004. Network 1004 broadly represents one or more LANs, WANs, cellular networks, intranetworks, internetworks, etc., using any of wired, wireless, terrestrial microwave, satellite links, etc., and may include the public Internet, and is used by client devices 1002 and forwarders 204 to access the system 1006. Similar to the system of 108, each of the forwarders 204 may be configured to receive data from an input source and to forward the data to other components of the system 1006 for further processing.

In an embodiment, a cloud-based data intake and query system 1006 may comprise a plurality of system instances 1008. In general, each system instance 1008 may include one or more computing resources managed by a provider of the cloud-based system 1006 made available to a particular subscriber. The computing resources comprising a system instance 1008 may, for example, include one or more servers or other devices configured to implement one or more forwarders, indexers, search heads, and other components of a data intake and query system, similar to system 108. As indicated above, a subscriber may use a web browser or other application of a client device 1002 to access a web portal or other interface that enables the subscriber to configure an instance 1008.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 1008) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD are centrally visible).

2.14. Searching Externally Archived Data

Figure 11:
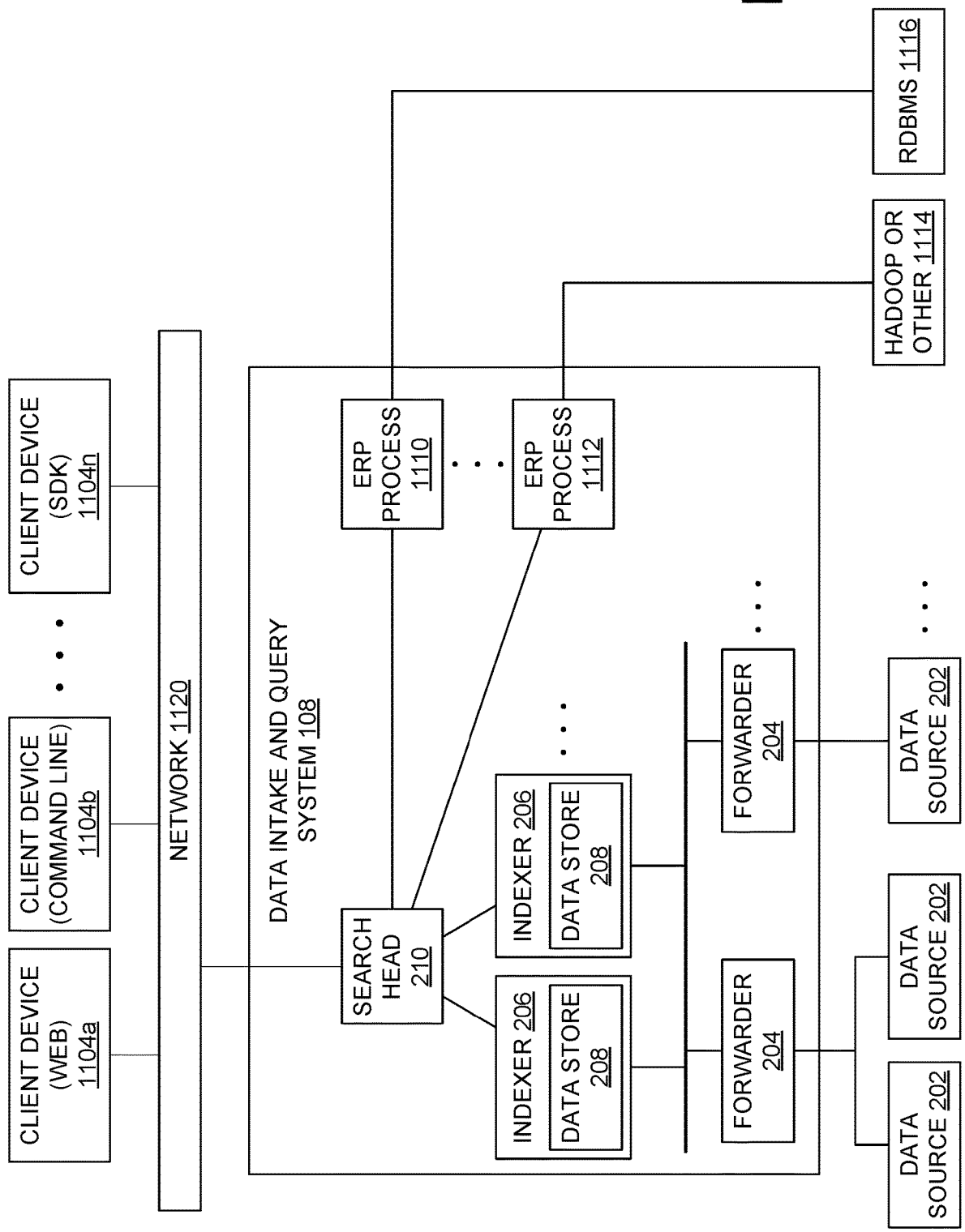
FIG. 11 illustrates a block diagram of an example data intake and query system that performs searches across external data systems in accordance with the disclosed embodiments.

FIG. 11 shows a block diagram of an example of a data intake and query system 108 that provides transparent search facilities for data systems that are external to the data intake and query system. Such facilities are available in the HUNK® system provided by Splunk Inc. of San Francisco, Calif. HUNK® represents an analytics platform that enables business and IT teams to rapidly explore, analyze, and visualize data in Hadoop and NoSQL data stores.

The search head 210 of the data intake and query system receives search requests from one or more client devices 1104 over network connections 1120. As discussed above, the data intake and query system 108 may reside in an enterprise location, in the cloud, etc. FIG. 11 illustrates that multiple client devices 1104a, 1104b, . . . , 1104n may communicate with the data intake and query system 108. The client devices 1104 may communicate with the data intake and query system using a variety of connections. For example, one client device in FIG. 11 is illustrated as communicating over an Internet (Web) protocol, another client device is illustrated as communicating via a command line interface, and another client device is illustrated as communicating via a system developer kit (SDK).

The search head 210 analyzes the received search request to identify request parameters. If a search request received from one of the client devices 1104 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 1110. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 1110, 1112. FIG. 11 shows two ERP processes 1110, 1112 that connect to respective remote (external) virtual indices, which are indicated as a Hadoop or another system 1114 (e.g., Amazon S3, Amazon EMR, other Hadoop Compatible File Systems (HCFS), etc.) and a relational database management system (RDBMS) 1116. Other virtual indices may include other file organizations and protocols, such as Structured Query Language (SQL) and the like. The ellipses between the ERP processes 1110, 1112 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 1110, 1112 receive a search request from the search head 210. The search head may optimize the received search request for execution at the respective external virtual index. Alternatively, the ERP process may receive a search request as a result of analysis performed by the search head or by a different system process. The ERP processes 1110, 1112 can communicate with the search head 210 via conventional input/output routines (e.g., standard in/standard out, etc.). In this way, the ERP process receives the search request from a client device such that the search request may be efficiently executed at the corresponding external virtual index.

The ERP processes 1110, 1112 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 1110, 1112 generate appropriate search requests in the protocol and syntax of the respective virtual indices 1114, 1116, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 1104 may communicate with the data intake and query system 108 through a network interface 1120, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

2.14.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of raw data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.14. IT Service Monitoring

As previously mentioned, the SPLUNK® ENTERPRISE platform provides various schemas, dashboards and visualizations that make it easy for developers to create applications to provide additional capabilities. One such application is SPLUNK® IT SERVICE INTELLIGENCE™, which performs monitoring and alerting operations. It also includes analytics to help an analyst diagnose the root cause of performance problems based on large volumes of data stored by the SPLUNK® ENTERPRISE system as correlated to the various services an IT organization provides (a service-centric view). This differs significantly from conventional IT monitoring systems that lack the infrastructure to effectively store and analyze large volumes of service-related event data. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, a SPLUNK® IT SERVICE INTELLIGENCE™ system stores large volumes of minimally-processed service-related data at ingestion time for later retrieval and analysis at search time, to perform regular monitoring, or to investigate a service issue. To facilitate this data retrieval process, SPLUNK® IT SERVICE INTELLI-GENCE™ enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the event data that pertains to the entity, whether produced by the entity itself or by another machine, and considering the many various ways the entity may be identified in raw machine data (such as by a URL, an IP address, or machine name). The service and entity definitions can organize event data around a service so that all of the event data pertaining to that service can be easily identified. This capability provides a foundation for the implementation of Key Performance Indicators.

One or more Key Performance Indicators (KPI's) are defined for a service within the SPLUNK® IT SERVICE INTELLIGENCE™ application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

SPLUNK® IT SERVICE INTELLIGENCE™ facilitates the production of meaningful aggregate KPI's through a system of KPI thresholds and state values. Different KPI definitions may produce values in different ranges, and so the same value may mean something very different from one KPI definition to another. To address this, SPLUNK® IT SERVICE INTELLIGENCE™ implements a translation of individual KPI values to a common domain of "state" values. For example, a KPI range of values may be 1-100, or 50-275, while values in the state domain may be 'critical,' 'warning,' 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. SPLUNK® IT SERVICE INTELLIGENCE™ can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in SPLUNK® IT SERVICE INTELLIGENCE™ can include informational fields that can serve as metadata, implied data fields, or attributed data fields for the events identified by other aspects of the entity definition. Entity definitions in SPLUNK® IT SERVICE INTELLIGENCE™ can also be created and updated by an import of tabular data (as represented in a CSV, another delimited file, or a search query result set). The import may be GUI-mediated or processed using import parameters from a GUI-based import definition process. Entity definitions in SPLUNK® IT SERVICE INTELLIGENCE™ can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, SPLUNK® IT SERVICE INTELLIGENCE™ can recognize so-called "notable events" that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a systems available from ServiceNow, Inc., of Santa Clara, Calif.

SPLUNK® IT SERVICE INTELLIGENCE™ provides various visualizations built on its service-centric organization of event data and the KPI values generated and collected. Visualizations can be particularly useful for monitoring or investigating service performance. SPLUNK® IT SERVICE INTELLIGENCE™ provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

SPLUNK® IT SERVICE INTELLIGENCE™ provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

SPLUNK® IT SERVICE INTELLIGENCE™ provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

SPLUNK® IT SERVICE INTELLIGENCE™ provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

SPLUNK® IT SERVICE INTELLIGENCE™ provides pre-specified schemas for extracting relevant values from the different types of service-related event data. It also enables a user to define such schemas.

2.15 Cloud-Based Architecture

As shown in the previous figures, various embodiments may refer to a data intake and query system 108 that includes one or more of a search head 210, an indexer 206, and a forwarder 204. In other implementations, data intake and query system 108 may have a different architecture, but may carry out indexing and searching in a way that is indistinguishable or functionally equivalent from the perspective of the end user. For example, data intake and query system 108 may be re-architected to run in a stateless, containerized environment. In some of these embodiments, data intake and query system 108 may be run in a computing cloud provided by a third party, or provided by the operator of the data intake and query system 108. This type of cloud-based data intake and query system may have several benefits, including, but not limited to, lossless data ingestion, more robust disaster recovery, and faster or more efficient processing, searching, and indexing. A cloud-based data intake and query system as described in this section may provide separately scalable storage resources and compute resources, or separately scalable search and index resources. Additionally, the cloud-based data intake and query system may allow for applications to be developed on top of the data intake and query system, to extend or enhance functionality, through a gateway layer or one or more Application Programming Interfaces (APIs), which may provide customizable access control or targeted exposure to the workings of data intake and query system 108.

In some embodiments, a cloud-based data intake and query system may include an intake system. Such an intake system can include, but is not limited to an intake buffer, such as Apache Kafka® or Amazon Kinesis®, or an extensible compute layer, such as Apache Spark™ or Apache Flink®. In some embodiments, the search function and the index function may be separated or containerized, so that search functions and index functions may run or scale independently. In some embodiments, data that is indexed may be stored in buckets, which may be stored in a persistent storage once certain bucket requirements have been met, and retrieved as needed for searching. In some embodiments, the search functions and index functions run in stateless containers, which may be coordinated by an orchestration platform. These containerized search and index functions may retrieve data needed to carry out searching and indexing from the buckets or various other services that may also run in containers, or within other components of the orchestration platform. In this manner, loss of a single container, or even multiple containers, does not result in data loss, because the data can be quickly recovered from the various services or components or the buckets in which the data is persisted.

In some embodiments, the cloud-based data intake and query system may implement tenant-based and user-based access control. In some embodiments, the cloud-based data intake and query system may implement an abstraction layer, through a gateway portal, an API, or some combination thereof, to control or limit access to the functionality of the cloud-based data intake and query system.

3.0 Overview of Facilitating Scalable and Secure Data Collection

Collecting data is important for performing various types of analyses. For example, collected data, such as machine-generated data (e.g., performance data, diagnostic data, etc.), may be analyzed to diagnose performance problems, monitor user interactions, and to derive other insights. In many implementations, large-scale data collection is used to collect extensive amounts of data. Oftentimes, however, it is difficult to collect extensive amounts of data, particularly when collecting data from multiple sources. In particular, collecting extensive amounts of data from multiple sources can be inefficient and/or insecure.

By way of example, a data-processing system may collect data from multiple data sources, including data sources operated via different entities and/or platforms. To collect data from a data source, a connector associated with the data source can communicate with the data source to obtain or collect data. Oftentimes, a connector is responsible for collecting data from a particular data source. As such, to collect data from multiple data sources, multiple connectors are used to communicate with the corresponding data source. As each data source may be differently configured, generating connectors to communicate with an extensive amount of data sources (e.g., databases) can be difficult and time consuming. In some cases, to enable connectors to collect data from various data sources, it may be desirable for various entities to generate connectors to collect data from particular data sources. For example, an entity (e.g., a third-party to a data collection system, such as a developer associated with a particular data source) may effectively and efficiently generate or create code for a connector to communicate with a particular data source to collect data.

In existing implementations that perform large-scale data collection in a containerized orchestration platform, data-collection execution (e.g., run time) functionality generally operates via a single pod or container. In this regard, connector functionality is performed in a same pod or container in which other functionality is performed. For instance, communication with other resources of a data-collection system (e.g., a task queue, such as task queue 1970 of FIG. 19 (SQS task queue), a pipeline stream (Kinesis), a data processing system, etc.) can be executed within a same pod or container as connector functionality. As such, permissions or authorization provided to perform connector functionality might result in undesired access to such resources. Access to restricted resources may be particularly undesired in cases in which third-party entities create connector code.

Further, as data-collection execution (e.g., run time) functionality generally operates via a single container or pod in prior implementations, data collection operates in a single-threaded manner. Using a single pod or container to perform data collection in a single-threaded manner limits scalability of data collection, thereby limiting the efficiency of performing data collection, particularly in a large-scale manner.

Accordingly, embodiments of the present disclosure are directed to facilitating scalable and secure data collection. In particular, embodiments described herein enable scalability of data collection in a secure manner by, among other things, abstracting a connector(s) to a pod(s) and/or container(s) that executes separate from other data-collecting functionality. This abstraction or separation of connector functionality from other data-collecting functionality prevents access to restricted resources in connection with a data-collection system that may otherwise be provided via permissions or authorizations provided to perform connector functionality. Such access prevention is particularly valuable when the connector functionality is generated or created by a third-party to the data collection system (e.g., third-party developers creating code to enable access to data of a third-party data source). For example, a malicious third-party developer can generate code designed to attempt exfiltration of data from the data-collection system, or otherwise hinder the performance of the data-collection system. Similarly, a benign third-party developer could generate code that, while not intentionally malicious, introduces security vulnerabilities, or interacts with the data-collection system in a manner that causes performance of the data-collection system to suffer. Additionally, this reduces drag on the third-party (or first-party) developers who are building the connectors, in that they may not be required to build their connector or other application with large-scale scalability in mind. In this way, embodiments described herein provide enhanced security via a data-collection system enabling scalability in generating connector functionality (e.g., via third parties), thereby enhancing the scalability of the data-collection system. Further, such embodiments allow existing connectors, which may have been built without concern for data collection on a large scale, to be used in their current form, without requiring rewriting.

In addition to enhancing scalability by enabling utilization of third-party created connector functionality, the abstraction of connector functionality from other data-collecting functionality enables scalability in run-time execution of data collection. In particular, and as discussed more fully below, utilized resources can be monitored such that additional pods and/or connectors may be deployed, as needed, to scale execution of data collection.

In some implementations, to enhance efficiency of data collection, the data-collection system may use a discover process that discovers data to collect and a collect process that collects data. Implementing various components using separate processes enables both processes to execute in parallel or concurrently, at least partially, to facilitate efficiency of data collection. For example, as a first set of data to collect is discovered via the discover process, an indication of the first set of data can be provided to the collect process to begin collecting the first set of data. The discover process may continue executing to discover or identify other sets of data to collect and, as discovered, provide an indication of such identified data sets to the collect process for collecting the data.

3.1 Overview of a Scalable Data-Exchange System in a Data-Exchange Environment

Figure 18:
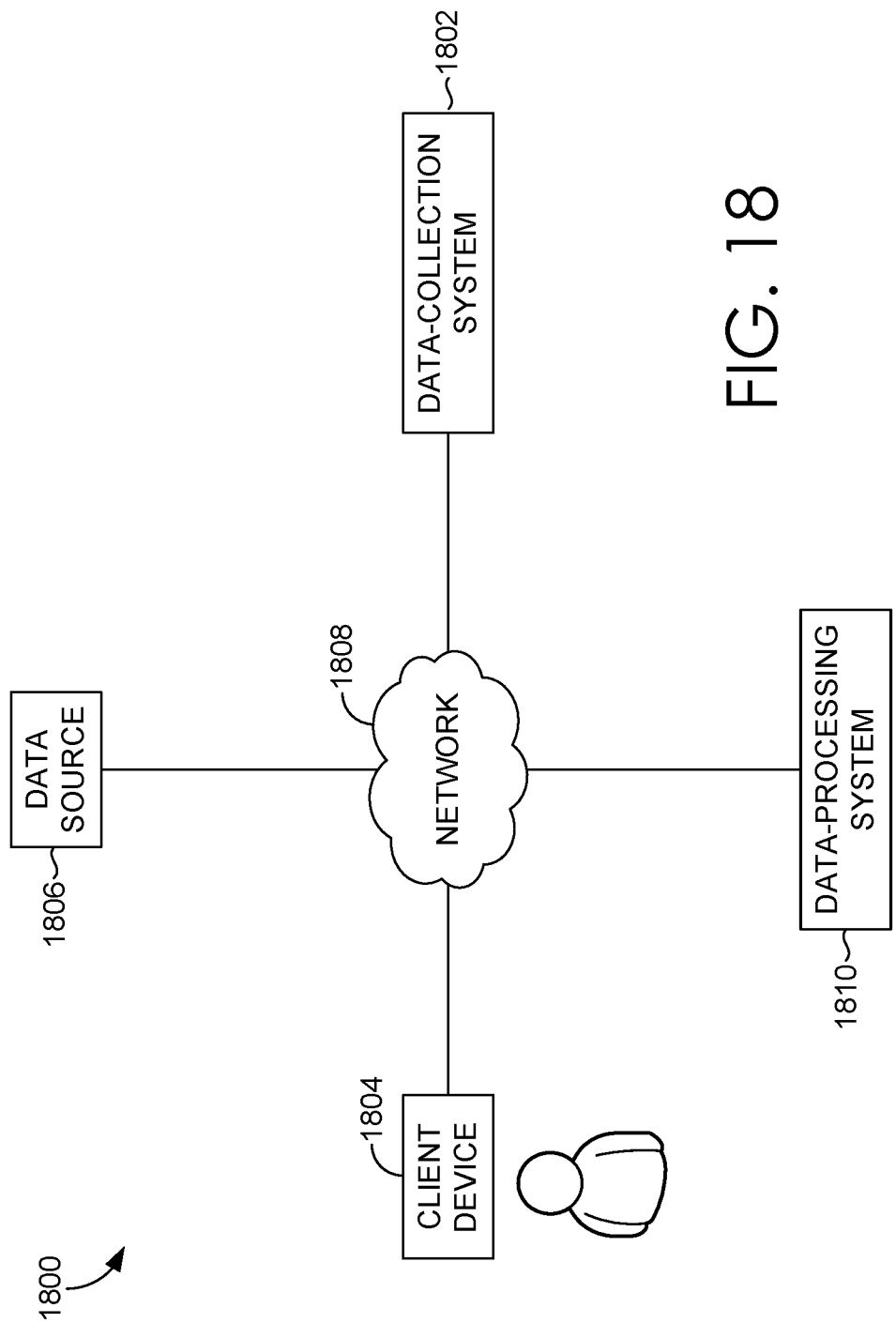
FIG. 18 depicts an example data-exchange environment in accordance with various embodiments of the present disclosure.

FIG. 18 illustrates an example data-exchange environment 1800 in accordance with various embodiments of the present disclosure. Generally, the data-exchange environment 1800 refers to an environment that provides for, or enables, the management, storage, retrieval, collection (input), and/or exportation (output) of data. As shown in FIG. 18, the data-exchange environment includes a data-exchange system 1802 used to facilitate enhancement of data exchange such that data can be exchanged in a scalable and secure manner. Many embodiments described herein discuss the data-exchange system operating to facilitate data collection. In this regard, the data-exchange system is used to collect data in a scalable and secure manner. As can be appreciated, however, the data-exchange system can additionally or alternatively be used to perform other data exchange, such as exporting or outputting data. Further, use of the term "exchange" herein can refer to collecting data, exporting data, and/or both collecting and exporting data.

In some embodiments, the environment 1800 can include a data-exchange system 1802 communicatively coupled to one or more client devices 1804 and one or more data sources 1806 via a communications network 1808. The network 1808 may include an element or system that facilitates communication between the entities of the environment 1800. The network 1808 may include an electronic communications network, such as the Internet, a local area network (LAN), a wide area network (WAN), a wireless local area network (WLAN), a cellular communications network, and/or the like. In some embodiments, the network 1808 can include a wired or a wireless network. In some embodiments, the network 1808 can include a single network or a combination of networks.

The data source(s) 1806 may be a source of data available for collecting via the data-exchange system 1802. A data source 1806 can be or include one or more external data sources, such as web servers, application servers, databases, firewalls, routers, operating systems, and software applications that execute on computer systems, mobile devices, sensors, and/or the like. Data source 1806 may be located remote from the data-exchange system 1802. For example, a data source 1806 may be defined on an agent computer operating remote from the data-exchange system 1802, such as on-site at a customer's location, that communicates data to data-exchange system 1802 via a communications network (e.g., network 1808). As can be appreciated, data may be collected from or exported to a variety of data sources, including data sources managed by different entities. For instance, a first data source may be managed by a first entity and a second data source managed by a second entity. Further, data sources may be operated via different platforms.

Data can be a stream or set of data fed to a component of the data-exchange system 1802, such as a connector, as described in more detail below. In some embodiments, the data may be heterogeneous machine-generated data from various data sources 1806, such as servers, databases, applications, networks, and/or the like. Data may include, for example raw data, such as server log files, activity log files, configuration files, messages, network packet data, performance measurements, sensor measurements, and/or the like. For example, data may include log data generated by a server during the normal course of operation (e.g. server log data).

As can be appreciated, data might be structured data or unstructured data. Structured data has a predefined format, wherein specific data items with specific data formats reside at predefined locations in the data. For example, data contained in relational databases and spreadsheets may be structured data sets. In contrast, unstructured data does not have a predefined format. This means that unstructured data can comprise various data items having different data types that can reside at different locations.

The data-exchange system 1802 is generally configured to collect or export data from or to the data source(s) 1806. In accordance with collecting data from a data source, the data-exchange system 1802 can provide such collected data to a data-processing system 1810. A data-processing system 1810 can provide for, or enable, the management, storage, retrieval, processing, and/or analysis of data. Although illustrated as providing collected data to a data-processing system 1810, the data can be collected and provided to any number of systems, servers, components, message bus, etc. and is not intended to be limited herein. For instance, data may be provided to a pipeline stream that queues data for a data-processing system 1810, such as a data intake and query system (e.g., data intake and query system 108 of FIG. 1).

One exemplary data-processing system 1810 may generate events used for data analysis. In one implementation, a data-processing system 1810 may include forwarders, indexers, and data stores. For example, a forwarder may obtain data and provide the data to an indexer for indexing. An indexer of the data-processing system may obtain the data and apportion the data into events. Generally, an indexer may be an entity of the data-processing system that indexes data, transforms data into events, and places the results into a data store or index. An indexer 1812 may perform other functions, such as data input and search management.

During indexing, and at a high-level, the indexer can facilitate taking data from its origin in sources, such as log files and network feeds, to its transformation into searchable events that encapsulate valuable knowledge. The indexer may acquire a raw data stream (e.g., data), for example via the data-exchange system 1802, break it into blocks (e.g., 64K blocks of data), and/or annotate each block with metadata keys. After the data has been input, the data can be parsed. This can include, for example, identifying event boundaries, identifying event timestamps (or creating them if they don't exist), applying custom metadata to incoming events, and/or the like. Accordingly, the raw data may be data broken into individual events. As discussed, an event generally refers to a portion, or a segment of the data, that is associated with a time (e.g., via a timestamp). And, the resulting events may be indexed (e.g., stored in a raw data file associated with an index file). In some embodiments, indexing the data may include additional processing, such as compression, replication, and/or the like.

As can be appreciated, a data store(s) (e.g., a single data store or multiple data stores, such as distributed data stores) of the data-processing system 1810 may store the data (e.g., events) in any manner. In some implementations, the data may include one or more indexes including one or more buckets, and the buckets may include an index file and/or raw data file (e.g., including parsed, timestamped events). In some embodiments, each data store is managed by a given indexer that stores data to the data store and/or performs searches of the data stored on the data store.

As described, events within the data store may be represented by a data structure that is associated with a certain point in time and includes a portion of raw machine data (e.g., a portion of machine-generated data that has not been manipulated). An event may include, for example, a line of data that includes a time reference (e.g., a timestamp), and one or more other values. In the context of server log data, for example, an event may correspond to a log entry for a client request and include the following values: (a) a time value (e.g., including a value for the date and time of the request, such as a timestamp), and (b) a series of other values including, for example, a page value (e.g., including a value representing the page requested), an IP (Internet Protocol) value (e.g., including a value for representing the client IP address associated with the request), and an HTTP (Hypertext Transfer protocol) code value (e.g., including a value representative of an HTTP status code), and/or the like. That is, each event may be associated with one or more values. Some events may be associated with default values, such as a host value, a source value, a source type value and/or a time value. A default value may be common to some or all events of a set of source data.

In some embodiments, an event can be associated with one or more characteristics that are not represented by the data initially contained in the raw data, such as characteristics of the host, the source, and/or the source type associated with the event. In the context of server log data, for example, if an event corresponds to a log entry received from Server A, the host and the source of the event may be identified as Server A, and the source type may be determined to be "server." In some embodiments, values representative of the characteristics may be added to (or otherwise associated with) the event. In the context of server log data, for example, if an event is received from Server A, a host value (e.g., including a value representative of Server A), a source value (e.g., including a value representative of Server A), and a source type value (e.g., including a value representative of a "server") may be appended to (or otherwise associated with) the corresponding event.

In some embodiments, events can correspond to data that is generated on a regular basis and/or in response to the occurrence of a given activity. In the context of server log data, for example, a server that logs activity every second may generate a log entry every second, and the log entries may be stored as corresponding events of the data. Similarly, a server that logs data upon the occurrence of an error may generate a log entry each time an error occurs, and the log entries may be stored as corresponding events of the data.

As described herein, the data-exchange system 1802, or portion thereof, can be initiated by a user of the client device 1804. The client device 1804 may be used or otherwise accessed by a user, such as a system administrator or a customer. A client device 1804 may include any variety of electronic devices. In some embodiments, a client device 1804 can include a device capable of communicating information via the network 1808. A client device 1804 may include one or more computer devices, such as a desktop computer, a server, a laptop computer, a tablet computer, a wearable computer device, a personal digital assistant (PDA), a smart phone, and/or the like. In some embodiments, a client device 1804 may be a client of the data-exchange system 1802 and/or data-processing system 1810. In some embodiments, a client device 1804 can include various input/output (I/O) interfaces, such as a display (e.g., for displaying a graphical user interface (GUI), an audible output user interface (e.g., a speaker), an audible input user interface (e.g., a microphone), an image acquisition interface (e.g., a camera), a keyboard, a pointer/selection device (e.g., a mouse, a trackball, a touchpad, a touchscreen, a gesture capture or detecting device, or a stylus), and/or the like. In some embodiments, a client device 1804 can include general computing components and/or embedded systems optimized with specific components for performing specific tasks. In some embodiments, a client device 1804 can include programs/applications that can be used to generate a request for content, to provide content, to render content, and/or to send and/or receive requests to and/or from other devices via the network 1808. For example, a client device 1804 may include an Internet browser application that facilitates communication with the data-exchange system 1802 via the network 1808. In some embodiments, a program, or application, of a client device 1804 can include program modules having program instructions that are executable by a computer system to perform some or all of the functionality described herein with regard to at least client device 1804. In some embodiments, a client device 1804 can include one or more computer systems similar to that of the computer system 2300 described below with regard to at least FIG. 23.

Data exchange can be initiated or triggered at the client device 1804 via a graphical user interface (GUI). In some embodiments, the data-exchange system 1802 (or other system, such as the data-processing system 1810) can provide for the display of a GUI. Such a GUI can be displayed on a client device 1804, and can present information relating to initiating data exchange, performing data exchange, and/or viewing results or alerts associated with data exchange.

Data exchange be initiated in any number of ways. In one implementation, data exchange can be initiated at a client device (e.g., by a user). As one example, a user may select an icon or other indicator to specifically initiate data exchange. For example, assume a user desires to perform data collection or data analysis. In such a case, a user may select to collect data, for example, from one or more data sources. As can be appreciated, and as more fully discussed below, a user may input any type of information to facilitate initiation of data exchange.

The data-exchange system 1802 is generally configured to facilitate data exchange. In particular, the data-exchange system 1802 performs data exchange in a scalable and secure manner. As described herein, data exchange can be performed to collect data (or export data), such as extensive amounts of data, from (or to) various sources. As described, data exchange performed via the data-exchange system 1802 can be initiated or triggered in response to a query, user selection, and/or automatically. As one example, a user may input or select (e.g., via client device 1804) a query to initiate data exchange. A query may be in any form and is not intended to be limited herein to a particular format and/or content. A query may be provided, for example, to initiate data exchange (e.g., data collection) in accordance with a specified manner. The query can trigger the data-exchange system 1802 to initiate data exchange. As another example, data exchange may be automatically initiated.

As described herein, data exchange can be performed in a container-managed environment in a manner that enables scalable and secure data exchange, such as data collection. A container-managed environment, or containerized-orchestration platform, generally refers to an environment, platform, or tool used to deploy, manage, and/or network container-based applications, systems, or workloads. In this way, a container-managed environment can maximize use of hardware resources, such as memory, storage I/O, and network bandwidth. One example of a container-management system or environment is Kubernetes. Kubernetes, as well as other container managers, can provide high-level abstractions for managing groups of containers.

At a high level, a container-managed environment (e.g., Kubernetes) can operate in association with a set of nodes or machines, such as physical machines and/or virtual machines. In operation, a container-managed environment may use jobs, or objects (e.g., job objects), to create an extraction around a pod. A job, or object, can create and manage a pod(s) executing a process or task. For example, a job or other object may create a pod to execute a process or task as well as track the completion of the process or task. In embodiments, a job may be part of a separate deployment or separate logical or physical construct or namespace within the same deployment.

A pod generally refers to a separately deployable unit of compute resources. In some contexts, the pod may be managed by an orchestration platform. In some contexts, a pod represents a single instance of an application running in an orchestration platform. In some contexts, a pod may contain a single container. In other contexts, a pod may contain multiple containers. A pod, executing on a node, may be created and managed by a corresponding job. A pod can represent an instance of a task, process, or application. In this regard, a pod can perform (e.g., via a container(s)), the operation or execution of a task, process, application, or workload. Pods can be created and/or terminated on nodes as needed to conform to a desired state (e.g., specified by a user). Generally, a pod may include a logical collection of one or more containers that can operate together. A container may refer to an application that includes all of its own dependencies, so that it can run separately and reliably in various computing environments. In this regard, a container refers to a self-contained separate deployable unit of compute resources. Containers of a pod may share common networking and storage resources from a host node, as well as specifications that determine how the containers run. To this end, containers may be scheduled together on the same host, share the same network namespace, and/or mount the same external storage (Volumes). Containers can include the components (e.g., files, environment variables, dependencies, and libraries) used to run desired software.

In operation, the data-exchange system 1802 may include a discover process and a collect process. The discover process is generally configured to discover a set of data to exchange (e.g., collect). The exchange process is generally configured to exchange (e.g., collect) the identified data. Advantageously, performing the discover process and the exchange process separately enables parallel execution of processes thereby improving data exchange efficiency. Upon exchange (e.g., collecting) data from the data source(s) 1806 via the exchange process, the data can be provided to the data-processing system 1810. Although illustrated as providing data to the data-processing system 1810, as can be appreciated, the data can be provided to other components or systems, such as a message bus or a pipeline stream (e.g., that provides the data via a queue to a data-processing system, or portion thereof).

Figure 19:
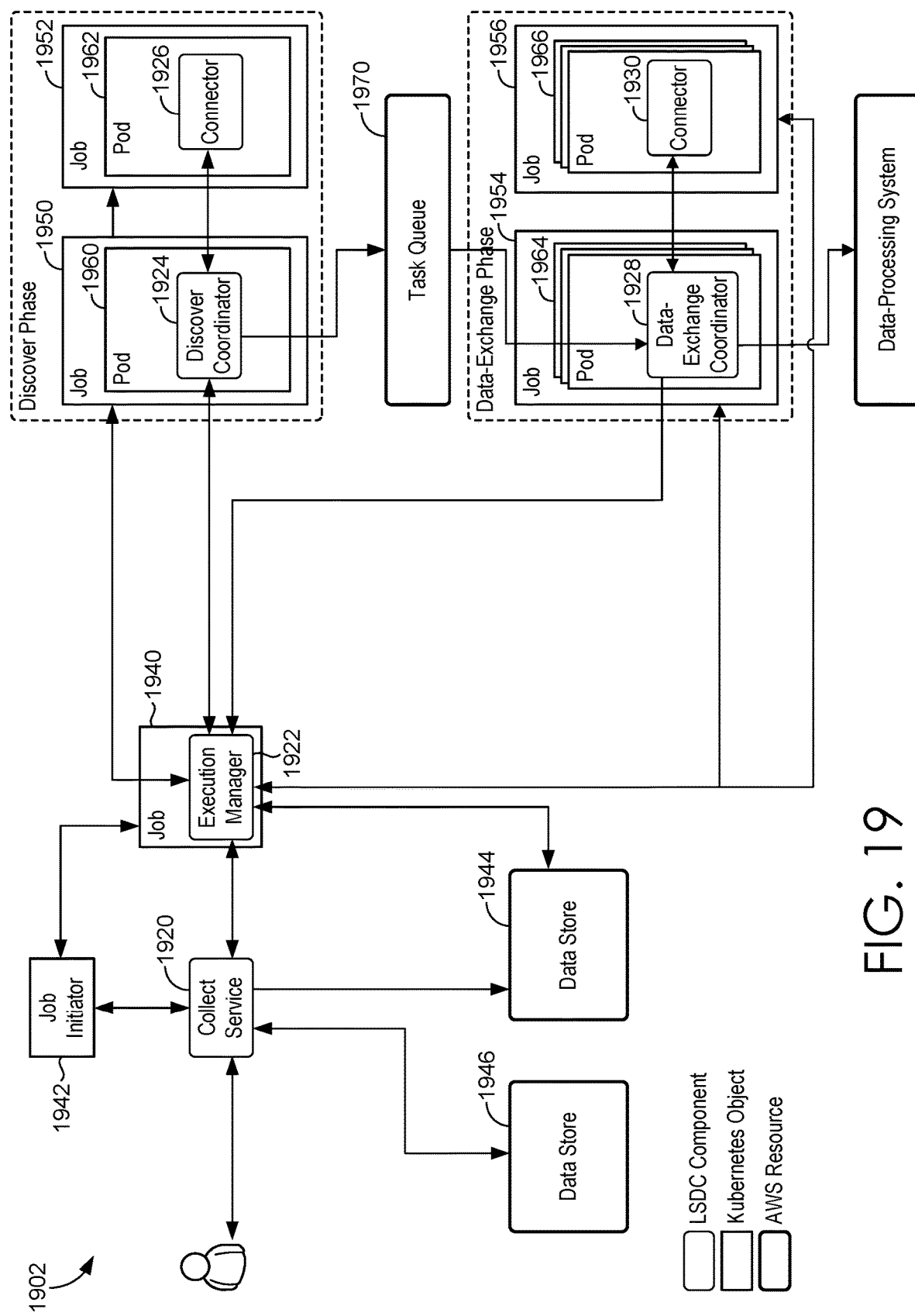
FIG. 19 provides an illustrative data-exchange system, in accordance with embodiments of the present disclosure.

Turning to FIG. 19, to perform data exchange (e.g., data collection), the data-exchange system 1902 may include a data exchange service 1920, a supervisor 1922, a discover coordinator 1924, a connector 1926, a data exchange coordinator 1928, and a connector 1930. According to embodiments, the data-exchange system 1902 can include any number of other components not illustrated. In some embodiments, one or more of the illustrated components 1920, 1922, 1924, 1926, 1928, and 1930 can be integrated into a single component or can be divided into a number of different components. Components 1920-1930 can be implemented on any number of machines and can be integrated, as desired, with any number of other functionalities or services. By way of example only, any number of components of a data-exchange system 1902 may operate in a cloud-based service.

As previously described, the data-exchange system 1902 can execute in a container-managed environment (e.g., a Kubernetes environment). In this regard, various components 1920-1930 can execute in connection with aspects of a container-managed environment such as jobs and/or pods.

The data exchange service 1920 (e.g., a collect service) is generally configured to initiate and manage deployment of the execution manager 1922. To initiate deployment of the execution manager 1922, the data exchange service 1920 may initiate or trigger a managing job based on a data exchange request. A data exchange request generally refers to a request to exchange data (e.g., collect or export data) or an aspect associated therewith. One example of a data exchange request is a data collection request, which generally refers to a request to collect data or an aspect associated therewith (e.g., initiate a job). The data exchange service 1920 may obtain a data exchange request (e.g., data collection request) in any number of ways. As one example, a data exchange request may be received from a user device, such as client device 1804 of FIG. 1. In particular, a user may select or input data that is used to generate a data exchange request. In some embodiments, a restful API may be used to input such data for a data exchange request. Upon obtaining data (e.g., via a user selection or input), the data exchange request can be generated and communicated to the collect service 1920.

A data collection request may include any number of data used to execute data collection. In some implementations, a data collection request may include one or more data collection parameters. Data collection parameters may be any type of attribute related to data collection. By way of example, and not limitation, data collection parameters may include an indication of data to collect (e.g., a data or data set identifier indicating data a connector is to collect from a data source). Data to collect may be indicated in any number of ways. In some cases, data to collect may be specified via a bucket identifier identifying a bucket from which to read data. In other cases, data to collect may be specified via a data path indicating a location at which data is stored. As another example, data collection parameters may include an indication of a connector (connector identifier) to utilize for collecting data. As previously described, a connector may correspond with a specific data source. As such, the connector corresponding with a specific data source from which data is desired to be collect may be identified via a data collection parameter. Another data collection parameter may include, an indication of a manner in which to scale data collection (e.g., maximum number of pods, maximum amount of compute resource per pod (e.g., 10 CPUs) or other aspects associating with scalability. Another data collection parameter may include an indication of a data collection schedule, for example, a schedule related to the discover process and/or collect process. Another data collection parameter may include credentials, for example, to access data via a data source.

In operation, upon obtaining a data exchange request (e.g., a data collection request), the data exchange service 1920 may initiate a managing job 1940 (also may be referred to as a data collection job). In this regard, the data exchange service 1920 may use data exchange parameters included in a data exchange request (e.g., received from a client device) to initiate and/or create managing job 1940. The managing job 1940 may be a job on which an execution manager 1922 can be deployed.

In some cases, the data exchange service 1920 can directly create the managing job 1940. In other cases, the data exchange service 1920 can initiate creation of the managing job 1940 via a job initiator 1942 (e.g., a cron job, such as a Kubernetes CronJob in instances in which the Kubernetes orchestration platform is used). In such a case, the data exchange service 1920 can create a job initiator 1942, such as a CronJob, in response to the data exchange request. For instance, the data exchange service 1920 may use input, such as data exchange parameters, from the user to create a job initiator 1942 (e.g., via an API call).

A job initiator 1942, such as a CronJob, may refer to a time-based job scheduler. When the job initiator 1942 is triggered (e.g., via the data exchange service 1920), the job initiator 1942 can create the managing job 1940A. For instance, the job initiator 1942 can create a cron expression that represents a set of times, or schedules a time, to create managing job 1940.

Upon creating the managing job 1940 (e.g., via the data exchange service 1920 and/or the job initiator 1942), an execution manager 1922 can be deployed via the job manager 1940. The execution manager 1922 may deployed in any of a number of ways, such as via the data exchange service, the job initiator 1942, or another component. As one example, a call between the data exchange service 1920 and managing job 1940 may be used to deploy the execution manager 1922. As another example, the job initiator 1942 may deploy the execution manager 1922. As yet another example, the job initiator 1942 may deploy another component (e.g., a job trigger), which may then deploy the execution manager 1922.

In addition to initiating deployment of the execution manager 1922, the data exchange service 1920 may manage deployment of the execution manager 1922. Deployment of the execution manager 1922 may be managed by monitoring data exchange configurations (e.g., data collection configuration) and data exchange execution (e.g., data collection execution). Data exchange configurations generally refer to configurations associated with the execution manager 1922, that is, configurations applied to and/or used by the execution manager 1922. Data exchange configurations can include information related to, for example, job identifier (e.g., managing job identifier), job schedule (e.g., schedule for executing a job), scaling (e.g., number of coordinators and/or connectors), connector specific configurations (e.g., configuration required by a connector to exchange (e.g., collect) data, such as credentials including username, password, API key, or the like the connector uses to connect the data source), or the like. As can be appreciated, such data exchange configurations, or portions thereof, can be, or identified by the data exchange service 1920 from, data exchange parameters included in a data exchange request provided via a client device. Data exchange configurations can be stored in a data store, such as data store 1944. In some implementations, data store 1944 may be a data store that is at least partially used to store sensitive data such as passwords, tokens, and certificates, such as Docker Secrets, SecretHub, Vault, or another secret manager.

In monitoring data exchange execution, the data exchange service may monitor execution data, such as collection execution data. Execution data generally refers to any data related to data exchange execution. Collection execution data may refer to any data related to executing data collection. As such, the data exchange service 1920 may obtain execution data via the execution manager 1922. For example, as execution of data collection is performed, the execution manager 1922 may provide the data exchange service 1920 with collection execution data (e.g., indications of executing jobs, state of execution, etc.). The data exchange service 1920 may then create or update execution records in a data store, such as data store 1946. Execution records may include various types of information related to execution, such as indications of executing jobs, the state of the execution, or the like. One example of a data store 1946 may be a database that supports key-value and/or document data structures, such as DynamoDB. MongoDB, and Apache Cassandra. Although data store 1944 and 1946 are illustrated as two separate data stores, as can be appreciated, the data stores may be combined into a single data store or may be separated into any number of data stores.

The execution manager 1922 is generally configured to manage execution of data exchange, such as data collection. As previously described, the execution manager 1922 may be deployed on the managing job 1940. The execution manager 1922 generally manages discover coordinator 1924, connector 1926, data exchange coordinator 1928, and connector 1930. As the data-exchange system can operate via a discover process and a data exchange phase, the execution manager 1922 may mange both processes to perform data collection.

To manage data exchange, the execution manager 1922 can manage various jobs (e.g., create and/or terminate) to execute data exchange (e.g., data collection). In this regard, the execution manager 1922 can initiate jobs 1950 and 1952 of the discover process as well as jobs 1954 and 1956 of the data exchange process. Each of the jobs 1950-1956 can create and manage a corresponding pod(s) for executing a process or task. In this regard, job 1950 may create pod 1960, job 1952 may create pod 1962, job 1954 may create pod 1964, and job 1956 may create pod 1966 to execute various processes or tasks as well as track the completion of the particular process or task. In embodiments, the execution manager 1922 may initiate jobs 1950-1956 in accordance with, or based on, various data exchange parameters (e.g., data collection parameters). For example, jobs 1950-1956 may be created in accordance with a schedule, e.g., as specified by a user. Such data exchange parameters may be obtained by the execution manager 1922 via the data exchange service 1920, the job initiator 1942, the data store 1944, or other component. For example, in accordance with executing a managing job, or data collection job, the execution manager 1922 may retrieve data collection parameters or configurations (e.g., by calling a private API on collect service 1920).

As described, a pod (e.g., pods 1960-1966) is created and managed by the corresponding job. A pod can represent an instance of a task, process, or application. In this regard, a pod can perform (e.g., via a container(s)), the operation or execution of a task, process, application, or workload. Pods can be created and/or terminated as needed to conform to desired parameters (e.g., specified by a user). Generally, a pod is or includes a logical collection of one or more containers that can operate together.

In accordance with initiating or creating the jobs and corresponding pods, the discover coordinator 1924, connector 1926, data exchange coordinator 1928, and connector 1930 can be deployed in association with the corresponding job/pod. In embodiments, the execution manager 1922 initiates and/or facilitates deployment of the discover coordinator, data exchange coordinator, and collectors on the corresponding jobs/pods. In some cases, the execution manager 1922 may identify a particular connector to deploy to communicate with the appropriate data source. For example, the data collection parameters described above may identify a particular connector. In some implementations, execution manager 1922 may determine a particular connector to deploy from data stored in data store 1944. In this regard, the execution manager 1922 may detect the data source containing the data to collect and identify and/or deploy the connector used to collect data from that particular data source. Although generally described as the execution manager 1922 that initiates deployment of the coordinators and collectors, as can be appreciated, other components may initiate such deployments.

The execution manager 1922 may provide data exchange parameters or configurations (or portions thereof) to the discover coordinator 1924, the data exchange coordinator 1928, connector 1926 and/or connector 1930. In some cases, the execution manager 1922 may provide parameters and/or configurations to the discover coordinator 1924 and the data exchange coordinator 1928, which may then provide such data to the corresponding connector 1926 and connector 1930. Such data exchange parameters or configurations can then be used by the coordinator(s) and/or connector(s) as appropriate to execute data exchange, such as data collection.

Upon the discover coordinator 1924, the connector 1926, the data exchange coordinator 1928, and the connector 1930 being deployed, the execution manager 1922 may manage various aspects related to execution of data exchange (e.g., data collection) via such components. As one example, the execution manager 1922 may monitor resources utilized and identify instances in which to scale or initiate additional components, such as additional data exchange coordinators 1928, connectors 1930, or the like. The execution manager 1922 may monitor resources in any number of ways. For instance, in some cases, a connector may provide resource data (e.g., CPU usage, memory, etc.) to a coordinator (e.g., data exchange coordinator, such as a collect coordinator), which may communicate the resource data to the execution manager 1922.

In embodiments, the execution manager 1922 may manage scaling of components, such as data exchange coordinator 1928 and connector 1930, in accordance with, or based on, various data exchange parameters and/or configurations. For example, utilized resources may be compared with scaling data collection parameters to determine when to scale a component. Data exchange parameters and/or configurations, such as parameters related to scaling, may be obtained by the execution manager 1922 via the data exchange service 1920, the job initiator 1942, the data store 1944, or other component.

Upon determining or identifying to scale a component, such as data exchange coordinator or connector, the execution manager 1922 may initiate such component scaling. For instance, in some cases, the execution manager 1922 may trigger the corresponding job to initiate or create another pod. Upon creation of the pod, the appropriate component can be deployed via the pod. By way of example only, assume an additional connector is desired to collect data via the collection process. In such a case, upon making such a determination, the execution manager 1922 may trigger the job 1956 (e.g., directly or via the data exchange coordinator) to create a new pod and, thereafter, may deploy a new connector on the new pod.

In accordance with data exchange execution (e.g., via the discover coordinator 1924, the connector 1926, the data exchange coordinator 1928, and/or the connector 1930), information may be provided back to the execution manager 1922 for recording (e.g., via a data store) and/or further managing the data exchange execution. For instance, data execution (e.g., collection) execution status, resource utilization, and the like may be communicated to the execution manager 1922 (e.g., via the discover coordinator or the data exchange coordinator). The execution manager 1922 can then utilize the information to further manage data exchange execution. Additionally or alternatively, the execution manager 1922 may facilitate storage of such data. For instance, execution manager 1922 may provide data collection execution status to the data exchange service 1920 for storage in a data store.

As described, in accordance with the execution manager 1922 initiating execution of data exchange (e.g., collection), the discover coordinator 1924, connector 1926, data exchange coordinator 1928, and connector 1930 can operate to perform data exchange (e.g., data collection). In implementation, the discover coordinator 1924 and the connector 1926 may execute as a discover process, and the data exchange coordinator 1928 and the connector 1930 may execute as a data exchange process (e.g., a collect process) such that the functionality may be performed in parallel. In the discover process, the discover coordinator 1924 and connector 1926 can operate to discover or identify data to exchange (e.g., collect). In the data exchange process, the data exchange coordinator 1928 and the connector 1930 can operate to exchange data (e.g., collect data).

Turning initially to the discover process, the discover coordinator 1924 is generally configured to manage data discovery. To do so, the discover coordinator 1924 may communicate with the execution manager 1922 and the connector 1926. In particular, the discover coordinator 1924 may initiate data discovery via the connector 1926. To this end, the discover coordinator 1924 may trigger a function (e.g., RPC function) of the connector to initiate data discovery. In embodiments in which multiple connectors are initialized, the discover coordinator 1924 may determine or select which connector to communicate with. Alternatively, the discover coordinator 1924 may communicate with each initialized connector. To initiate data discovery, the discover coordinator 1924 may provide an indication of the desired data such that the connector 1926 (and/or additional connectors) can discover the data. In some cases, the discover coordinator 1924 may provide a data source identifier, a bucket identifier, or the like.

The connector 1926 generally discovers or identifies tasks, e.g., collect tasks, associated with the data to exchange (e.g., collect), which will be used in the data exchange phase by the data exchange coordinator 1928 and the connector 1930. In this regard, the connector 1926, upon initiation (e.g., via a call from the discover coordinator 1924), can communicate with the corresponding data source to identify the particular data to collect from or export to the data source. In embodiments, the connector 1926 does not review data content (e.g., content of a file) but recognizes the file and identifies a task associated therewith. By way of example only, assume a bucket identifier is provided to the connector 1926. In such a case, the connector 1926 can communicate with the appropriate data source (e.g., via an API) to identify the files in the bucket. Upon identifying the files, the connector 1926 can generate a list of tasks (e.g., collect tasks) corresponding to the files. For instance, in some cases, the connector 1926 may generate a collect task for each file. In other cases, the connector 1926 may generate a collect task for a set of files (e.g., 10,000 files, or a subfolder of files in a conventional file system with a directory tree). As can be appreciated, tasks are not limited to files and may be generated in association with other sets of data (e.g., buckets of data). A task or exchange task may indicate any task that can be performed by the connector 1930 in the data exchange phase. In this regard, a collect task may indicate data collection to be performed via the collect process. In embodiments, the task may include an indication to read a particular set of data, such as the set of files, and to ingest events within the data (e.g., the set of files). The connector 1926 may then provide the set of tasks to the discover coordinator 1924. As previously described, in addition to the connector 1926 providing tasks to the discover coordinator 1924, the connector may provide other data, such as execution status, etc.

In response to the discover coordinator 1924 receiving data from the connector, the discover coordinator 1924 may communicate the data to the data exchange phase, the execution manager 1922, or the like. In this way, the set of tasks may be provided to the data exchange process. In embodiments, the tasks may be provided to the data exchange process via a task queue, such as task queue 1970. In embodiments, task queue 1970 may be any sort of message queue or commit log service that allows the tasks to be passed from one component to another, in this case from the discover coordinator 1924 to the data exchange coordinator 1928. As such, upon receiving a task, the discover coordinator 1924 can provide the task or set of tasks to the task queue 1970. As the discover coordinator 1924 obtains execution data (e.g., collection execution data) or execution status from the connector, the discover coordinator may provide such data to the execution manager 1922. Further, in some embodiments, the discover coordinator 1924 may terminate execution of the connector 1926, for example, upon the connector 1926 completing identification of the collect tasks.

Advantageously, as previously described, abstracting the connector from other data-exchange functionality (e.g., data-collecting functionality) enables efficient and secure data exchange. For example, this abstraction or separation of connector functionality from other data-exchange functionality prevents access to restricted resources in connection with a data-exchange system that may otherwise be provided via permissions or authorizations provided to perform connector functionality. Such access prevention is particularly valuable when the connector functionality is generated or created by a third-party to the data exchange system (e.g., third-party developers creating code to enable access to data of a third-party data source). Further, as the discover coordinator 1924 and the connector 1926 execute via different jobs/pods, the components can use different resources thereby improving efficiency of the connector.

Turning to the data exchange process, the data exchange process (e.g., collect process) is generally configured to exchange data through execution of the exchange tasks previously described above. In particular, the data exchange coordinator 1928 (e.g., collect coordinator) generally manages data exchange (e.g., data collection), while the connector 1930 generally performs the data exchange (e.g., data collection). To manage data exchange, the data exchange coordinator 1928 may communicate with the execution manager 1922 and the connector 1930. In particular, the data exchange coordinator 1928 may initiate data exchange via the connector 1926. To this end, the data exchange coordinator 1928 may trigger a function (e.g., RPC function) of the connector to initiate data exchange (e.g., data collection). In embodiments in which multiple connectors are initialized, the data exchange coordinator 1928 may determine or select which connector to communicate with. Alternatively, the data exchange coordinator 1928 may communicate with each initialized connector.

To initiate data exchange, the data exchange coordinator 1928 may provide a task or set of tasks to the connector 1930 such that the connector 1930 (and/or additional connectors) can exchange (e.g., collect) the data in accordance with the task. As described above, the task may be generated via connector 1926 in the discover process. The collect coordinator 1928 may obtain the task (e.g., via a push or pull) from a task queue 1970. As such, the data exchange coordinator 1928 may obtain a task or set of tasks from a task queue and assign the task or set of tasks to a connector, such as connector 1930.

In assigning a task or set of tasks, the data exchange coordinator 1928 may account for resources utilized by the connector, among other things. In this way, the data exchange coordinator 1928 may manage data exchange (e.g., data collection) in a more efficient manner. For example, assume a first connector is utilizing more resources than a second connector. In such a case, a new set of tasks may be analyzed and assigned to the second connector. In other embodiments, another component may account for resources utilized by the connector. For example, a component (e.g., component corresponding or executing within the same pod as the connector) may monitor resource utilization of the connector. When resource utilization exceeds a threshold, the component may hide or otherwise prevent the data exchange coordinator 1928 from assigning a task(s) to the particular connector and/or prevent a particular connector from accepting additional tasks.

Additionally or alternatively, resource utilization may be used to manage resource scaling associated with the connector. That is, based on resource utilization, resources dedicated to a pod and/or connector may be increased or decreased. For example, a component (e.g., a data exchange coordinator 1928 or component corresponding or executing within the same pod as the connector) may monitor resource utilization of the connector. When resource utilization exceeds a threshold, the amount of resources for use by the connector and/or corresponding pod may be increased (e.g., via the data exchange coordinator 1928).

Resource utilization may also be used to manage scaling of connectors such that additional connectors are instantiated to perform data exchange. In this regard, data exchange coordinator 1928 (e.g., in conjunction with execution manager 1922) may instantiate one or more of another job 1956, another pod 1966, and/or another connector 1930, in order to scalably complete the tasks retrieved by the collect coordinator 1928 from the task queue 1970. The decision of whether to execute another job 1956, to assign another pod 1966 to job 1956, or to assign another connector 1930 (optionally inside of another container) to pod 1966, is dependent upon the system design choice, and, in some implementations, may be at least partially specified by the execution manager 1922 according to the data exchange parameters described previously.

Upon connector 1930 obtaining a task or set of tasks, connector 1930 generally exchanges (e.g., collects) the appropriate data in accordance with the task. In this regard, the connector 1930, upon being triggered (e.g., via a call from the data exchange coordinator 1928), can communicate with the corresponding data source to collect the particular data from the data source. By way of example only, assume a first task is provided to the connector 1930. In such a case, the connector 1930 can communicate with the appropriate data source (e.g., via an API) to collect the appropriate data. For instance, the connector 1930 may read an identified set of data (e.g., a set of files) and obtain or ingest events within the data (e.g., the set of files). The connector 1930 may then provide the collected data to the data exchange coordinator 1928. As previously described, in addition to the connector 1930 providing collected data to the data exchange coordinator 1928, the connector 1930 may provide other data, such as execution status, etc.

In response to the data exchange coordinator 1928 receiving data from the connector 1930, the data exchange coordinator 1930 may communicate the data to a data-processing system (e.g., an index), a pipeline stream, or other component, interface, or bus. In this way, collected data (e.g., a set of events) may be provided to a data-processing system for indexing, storage, and/or analysis. As the data exchange coordinator 1928 obtains execution data or execution status from the connector, the data exchange coordinator may provide such data to the execution manager 1922. Further, in some embodiments, the data exchange coordinator 1928 may terminate execution of the connector 1930, for example, upon the connector 1930 completing identification of the collect tasks.

Advantageously, as previously described, abstracting the connector 1930 from other data-exchanging functionality enables efficient and secure data exchange, such as data collection. For example, this abstraction or separation of connector functionality from other data-collecting functionality prevents access to restricted resources in connection with a data-exchange system that may otherwise be provided via permissions or authorizations provided to perform connector functionality. Such access prevention is particularly valuable when the connector functionality is generated or created by a third-party to the data exchange system (e.g., third-party developers creating code to enable access to data of a third-party data source). Further, as the data exchange coordinator 1928 and the connector 1930 execute via different jobs/pods, the components can use different resources thereby improving efficiency of the connector.

As can be appreciated, any number of data exchange coordinators and/or connectors can operate in the data exchange process (e.g., via corresponding pods). For example, in some implementations, a single data exchange coordinator may execute in connection with one or more connectors. In other implementations, a data exchange coordinator may be initiated to execute in connection with a particular connector (e.g., a 1-to-1 relationship such that a different data exchange coordinator executes for each connector).

In accordance with embodiments described herein, components of the data exchange process may be scaled to increase efficiency of data collection. For example, in some embodiments, connectors and/or corresponding pods may be scaled to increase efficiency in performing data collection or exportation. For instance, a component (e.g., a data exchange coordinator, an execution manager, a component corresponding or executing within the same pod as the connector, another Kubernetes component, or the like), may monitor resource utilization of the connector. Any resource utilization may be monitored, such as memory, CPU, or other metric. When resource utilization exceeds a threshold, another connector may be initiated via another pod. A similar process may be used to scale down connectors based on resource metrics. In implementation, any number of components may initiate the new connector and/or corresponding job. For instance, a data exchange coordinator, an execution manager, or combination of such components may initiate a new pod and/or deploy a new connector in association with the new pod. As another example, connector scaling may be provided via another component, such as a component(s) that performs horizontal pod auto-scaling (e.g., via Kubernetes).

Although resource and/or component scaling is generally discussed in relation to connectors of the data exchange process, as can be appreciated, such scaling may be applicable to other aspects of the data-exchange system. For example, in some cases, scaling may occur in connection with the data exchange coordinator of the data exchange process. As another example, scaling may occur in connection with the discover coordinator 1924 and/or the connector 1926 of the discover process.

In some cases, in accordance with performing data exchange (e.g., data collection), information or an alert may be provided via a graphical user interface to alert or notify a user of the status of data exchange (e.g., data collection initiation, data collection progress, data collection termination, data collection error, or the like).

3.2 Scalable and Secure Data-Exchange Methods

Figure 20:
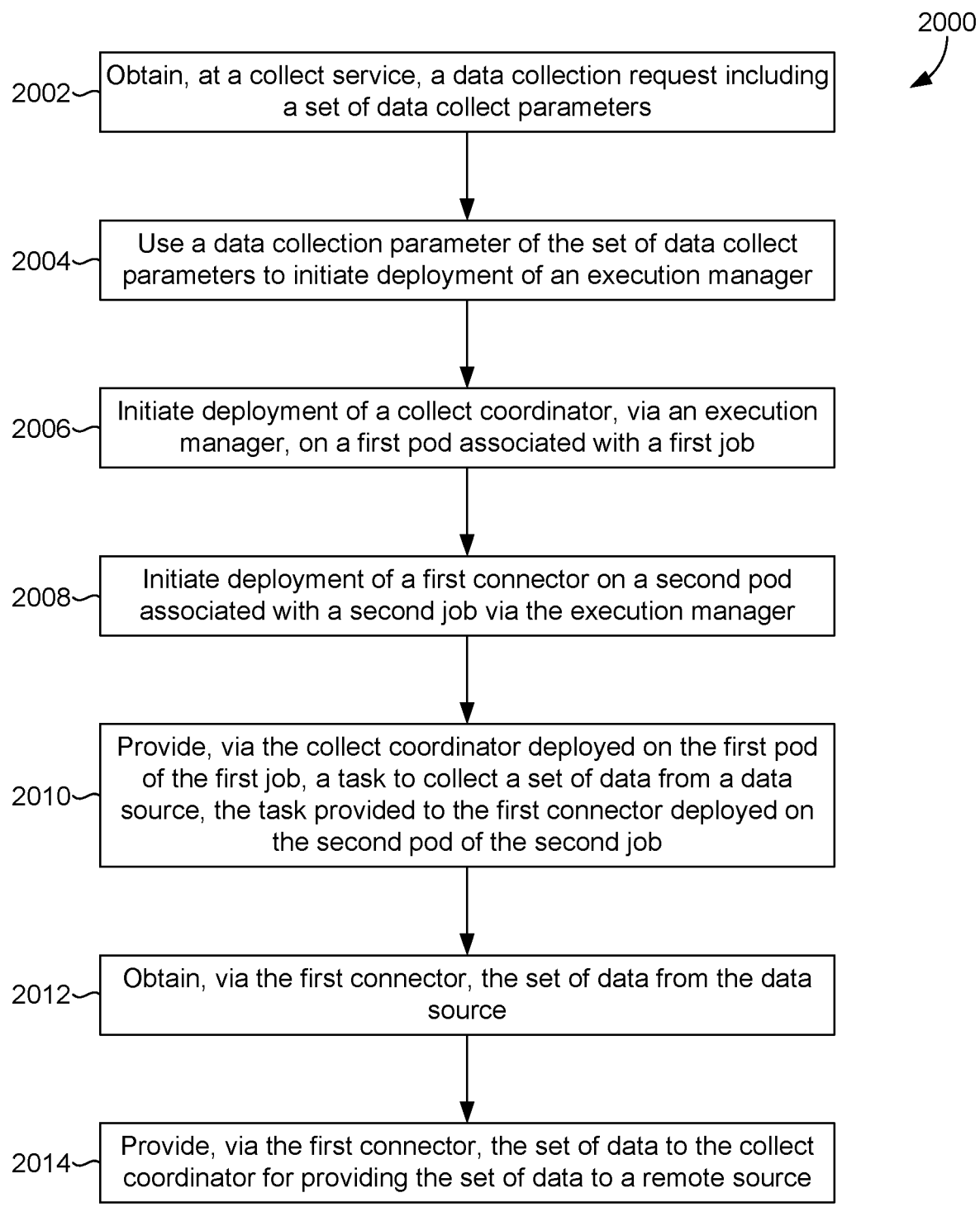
FIG. 20 illustrates a method for enabling efficient data collection in a secure manner, in accordance with embodiments of the present invention.
Figure 21:
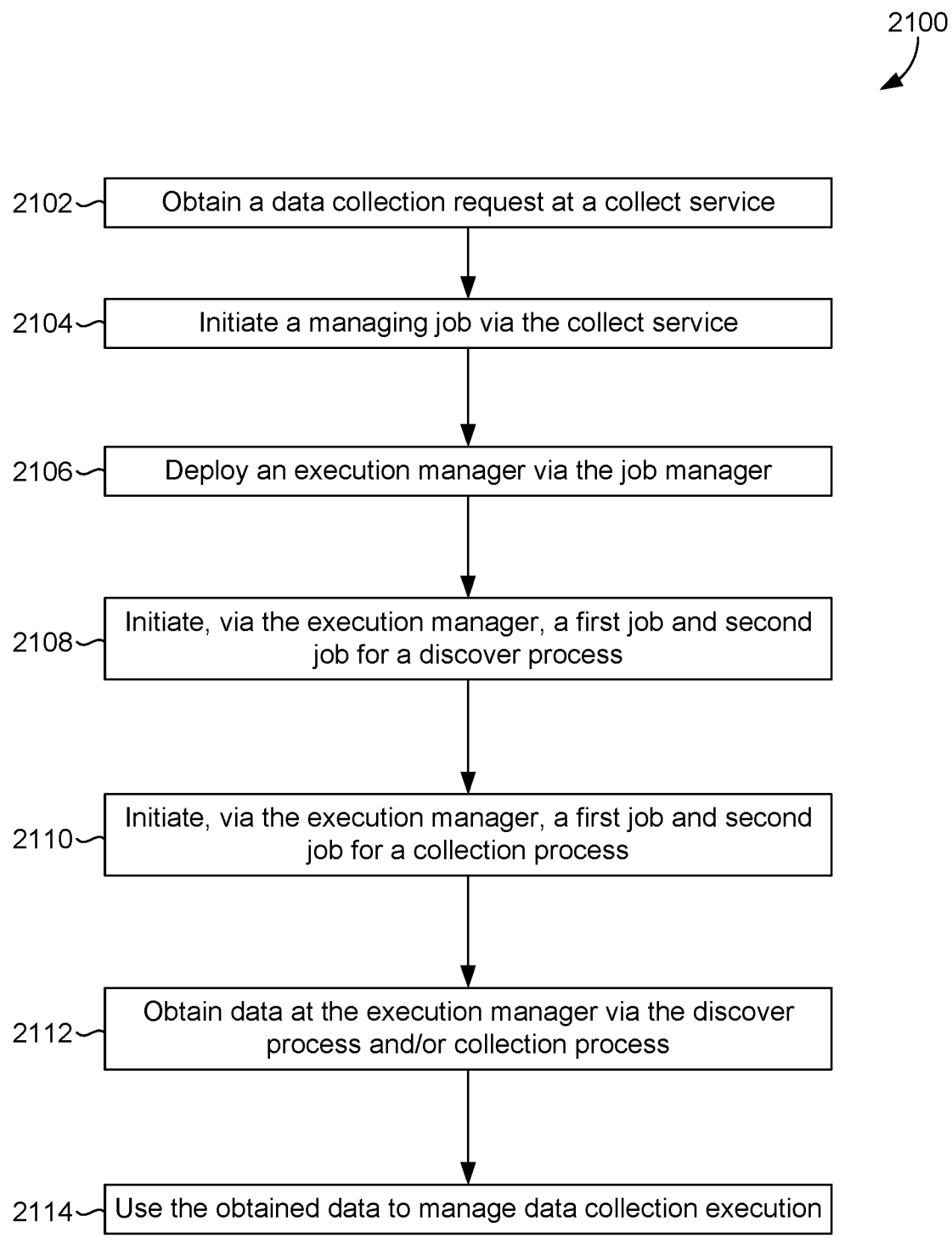
FIG. 21 illustrates another method for enabling efficient data collection in a secure manner, according to embodiments of the present invention.
Figure 22:
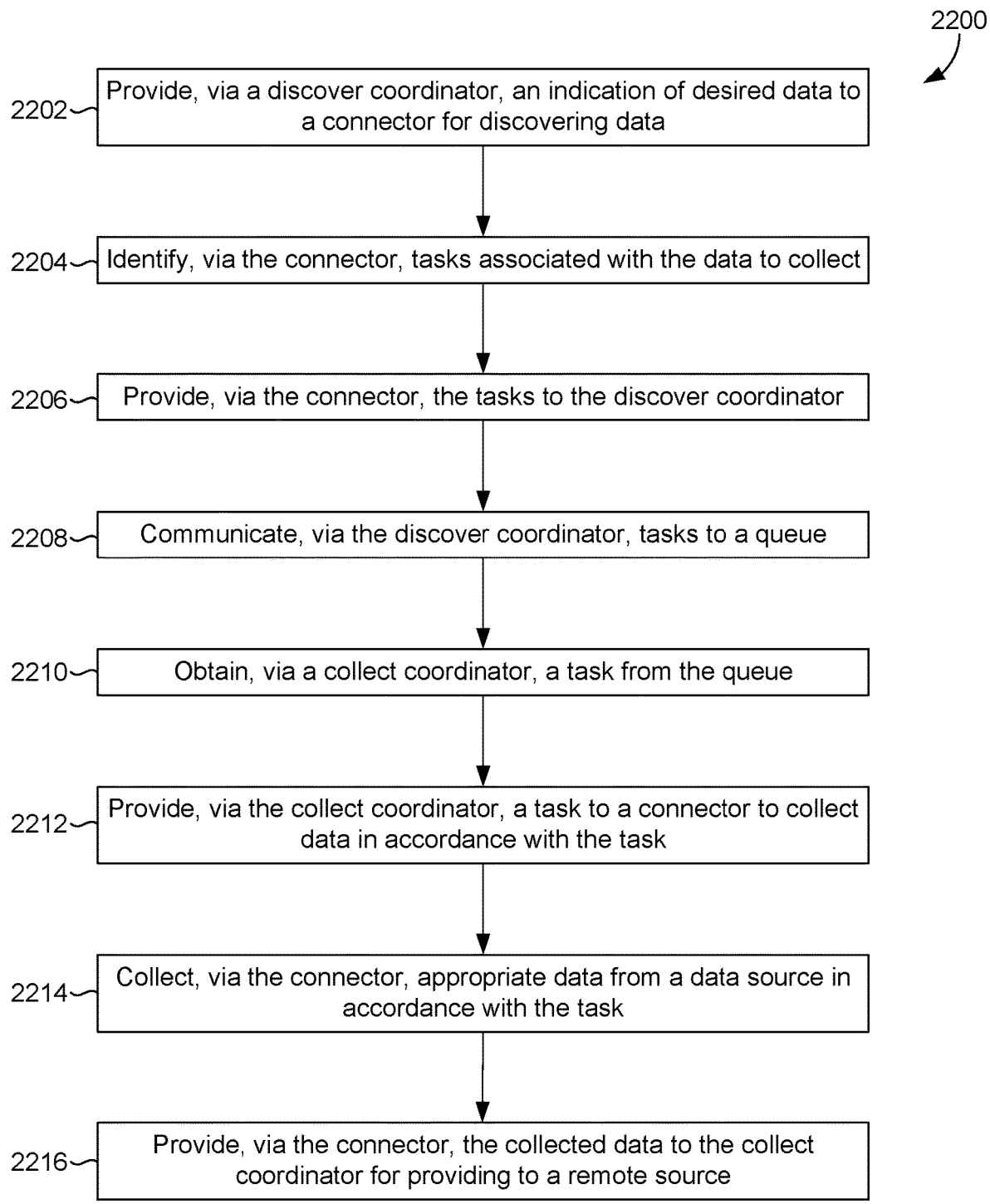
FIG. 22 illustrates another method for enabling efficient data collection in a secure manner, in embodiments of the present invention.

FIGS. 20-22 illustrates method of facilitating efficient data exchange in a secure manner, in accordance with embodiments of the present invention. As can be appreciated, additional or alternative steps or blocks may also be included in different embodiments. Methods 2000, 2100, and 2200 may be performed, for example, at a data-exchange system, such as data-exchange system 1902 of FIG. 19. FIGS. 20-22 are generally described in relation to efficient data collection in a secure manner. One skilled in the art can appreciate that similar methods can be employed to facilitate other efficient data exchange in a secure manner, such as exporting data in a secure manner.

Turning initially to FIG. 20, FIG. 20 provides a method for enabling efficient data collection in a secure manner. At block 2002, at a collect service, a data collection request including a set of data collect parameters is obtained. At block 2004, a data collection parameter of the set of data collect parameters is used to initiate deployment of an execution manager. An execution manager generally manages execution of data collection. In embodiments, an execution manager can execute on a managing job of a container-managed platform. At block 2006, deployment of a collect coordinator is initiated, via an execution manager, on a first pod associated with a first job. The collect coordinator is generally configured to manage the first connector. At block 2008, deployment of a first connector on a second pod associated with a second job is initiated via the execution manager. The first connector is generally configured to collect data from a data source. In embodiments, the first job and second job are separate from one another within a container-managed platform. At block 2010, a task to collect a set of data from a data source is provided, via the collect coordinator deployed on the first pod of the first job, to the first connector deployed on the second pod of the second job. At block 2012, the set of data from the data source is obtained via the first connector. The first connector then provides the set of data to the collect coordinator, as illustrated at block 2014, for providing the set of data to a remote source, such as a communication bus or a data-processing system.

With reference now to FIG. 21, FIG. 21 provides another method for enabling efficient data collection in a secure manner. At block 2102, a data collection request is obtained at a collect service. Such a data collection request can include one or more data collection parameters. At block 2104, the collect service initiates a managing job (e.g., using a data collection parameter(s)). In some cases, the collect service can directly create the managing job. In other cases, the collect service can initiate creation of the managing job via a job initiator (e.g., a cron job, such as, CronJob). Upon creating the managing job, at block 2106, an execution manager is deployed via the job manager. As described, an execution manager generally manages execution of data collection. At block 2108, the execution manager initiates a first job and second job for a discover process. The discover process is generally configured to discover which data to collect. At block 2110, the execution manager initiates a first job and second job for a collection process. The collection process is generally configured to collect the identified data. At block 2112, the execution manager obtains data (e.g., resource utilization, execution status, etc.) via the discover process and/or collection process. In this regard, upon initiating the jobs for the discover process and the collection process, such processes can provide information (e.g., execution status) back to the execution manager to facilitate management of data collection execution. At block 2114, the execution manager uses the obtained data to manage data collection execution.

Turning to FIG. 22, FIG. 22 provides another method for enabling efficient data collection in a secure manner. At block 2202, a discover coordinator provides an indication of desired data to a connector for discovering data. For example, a discover coordinator may provide a data source identifier, a bucket identifier, or the like, to a connector. At block 2204, the connector discovers or identifies tasks associated with the data to collect. In embodiments, a task may include an indication to read a particular set of data, such as a set of files, and to ingest events within the data. At block 2206, the connector provides the tasks to the discover coordinator. At block 2208, the discover coordinator communicates tasks to a queue. At block 2210, a collect coordinator obtains a task via the queue. The collect coordinator provides a task to a connector to collect data in accordance with the task, as indicated in block 2212. At block 2214, the connector collects appropriate data, via a data source, in accordance with the task. The collected data is provided to the collect coordinator for providing to a remote source, as illustrated at 2216.

4.0 Overview of Facilitating Efficient Message Queuing

Large-scale data collection (LSDC) services (e.g., a LSDC service described herein), or other data-exchange service, can operate in a cloud environment and/or an on-premises environment. For example, some users may prefer a cloud service environment in which the user is not directly responsible for providing and managing the computing devices upon which various components of a large-scale data collection service may operate, while other users may prefer an on-premises solution such that the large-scale data collection service is operated on the user's own computing infrastructure (e.g., to provide a greater level of control over the configuration of certain aspects of the service). Irrespective of whether a data-exchange service, such as a large-scale data collection service, is deployed in a cloud environment and/or on-premises environment, it may be desirable to have the data-exchange services operate in a similar manner to one another, for example, from a user's perspective. To this end, it may be desirable that an on-premises LSDC service operates in a way that is not substantially different or limited in functionality compared to a LSDC service operating in a cloud environment, and vice versa.

In a data-exchange environment, an external or third-party service(s) may be used to implement data-exchange (e.g., large-scale data collection) functionality. In this regard, a data-exchange service operating in a cloud environment may use cloud-specific external services to perform various functionalities. By way of example only, in cases that AWS® is utilized to implement a LSDC cloud environment, AWS® services, such as Simple Storage Service (S3), Simple Queue Service (SQS), Kinesis, DynamoDB, and Secrets Manager, may be used. Such services may be used to implement various functionalities, including checkpoint persistence, ingest task distribution, forwarding ingested events, job scheduling persistence and execution status, and storage of sensitive job parameters, respectively. In an on-premises environment, however, cloud-specific services (e.g., AWS®-specific service) may be unavailable. As such, for a LSDC service deployed in an on-premises environment to operate in a similar manner as a LSDC service deployed in a cloud environment, an on-premises replacement service(s) can be used to effectuate a similar operation as performed via a cloud-specific service in a cloud LSDC environment. One example of an on-premises replacement service that may be used in an LSDC on-premises environment is a message or task queuing service. In particular, a message or task queue service that operates in a similar manner (e.g., from a user's perspective) as that utilized in a LSDC cloud environment (e.g., SQS) may be desired.

One type of on-premises replacement service that may be utilized as a message or task queueing service in an on-premises LSDC environment may be a processing service that performs data processing in a streaming manner. In this way, streaming data processing may be used to perform services for queuing messages or tasks. One example of a streaming platform that may be used to implement streaming data processing is Apache Kafka®. Generally, streaming data processing involves batch processing. In this regard, in a streaming system, messages are processed in a batch such that additional messages cannot be processed until the initial, or previous, batch of messages are acknowledged or committed. To this end, in stream processing, a sequence of messages are generally acknowledged up to a particular offset (e.g., in a topic) and messages cannot be acknowledged individually. In utilizing streaming data processing to process messages, such batch processing of sequences of messages instead of individual messages is oftentimes inefficient, particularly when messages correspond with different processing times. For example, assume two messages take one minute to process and another message takes twenty minutes to process. Further assume that a streaming data processing system reads three messages as a batch before moving to the next batch of three messages. In such a case, it can be inefficient to wait for all three messages, including the message that takes twenty minutes to process, to be acknowledged or committed before reading the next batch of three messages. In addition, message processor failure and recovery may result in redundant message processing. For example, assume a second message and a third message are processed successfully, while a first message continues to be processed. Further assume a restart is necessitated resulting in a message processor resuming from the last committed offset. In such a case, the message processor will read the first, second, and third messages thereby duplicating reading of the first and second messages.

As such, embodiments described herein provide a message queuing service that acknowledges processing of individual messages. Accordingly, instead of acknowledging sequences of messages, embodiments described herein acknowledge, or commit offsets, for individual messages. By acknowledging individual messages, the message queueing service can more efficiently proceed with reading a next message. In accordance with some embodiments described herein, such a message queuing service enabling acknowledgment of individual messages can be implemented in connection with, or on top of, a stream processing platform, such as Apache Kafka®.

In some cases, upon consuming a message from the stream, initiating message processing, and reading a subsequent message from the stream, processing of the initial message may not be completed. For instance, while a message is being processed, a processing component may fail to function thereby preventing completion of the message processing. In such cases, the message is essentially gone as the message queueing service has committed a message offset and proceeded to read a next message, but the message was not fully processed. Advantageously, the message queueing service described herein performs message redelivery such that messages can be redelivered to a queue for processing in instances that the message was not fully processed.

To facilitate message redelivery, a sequence of markers associated with a task or message can be used to identify instances in which to redeliver the message for processing. The sequence of markers indicate processing states, such as when a process associated with a message is started (start state), when a process associated with a message continues or is still alive (in-process or keep-alive state), and when a process has been completed (end state). In monitoring the markers associated with a message or task, a determination can be made as to when to redeliver a message for processing. In particular, when a redelivery deadline has expired without processing being completed for a message, the message can be redelivered for processing. In some cases, each message may include a unique and/or configurable redelivery deadline, which can be indicated via start and keep-alive markers. As the message processing times vary, monitoring the processing state (e.g., keep-alive state) can facilitate refreshing or updating a redelivery deadline. In this regard, a message associated with a longer processing time and thereby having a lengthy keep-alive state will not be redelivered until an appropriately refreshed redelivery deadline has expired. In other words, the redelivery deadline can be extended to accommodate for the longer processing time, thereby preventing an unnecessary redelivery of the message.

In implementation, to facilitate message redelivery, a queue topic may be used to hold messages or tasks to process and a markers topic may be used to hold markers indicating processing states associated with messages or tasks. As messages from the queue topic are consumed, a processing state associated with the messages can be monitored. Markers can be generated and/or written to the markers topic to indicate such processing state (e.g., start state, keep-alive state, and/or end state). The markers in the markers topic can then be monitored by a redelivery monitor to identify when to redeliver messages for reprocessing. Generally, upon expiration of a redelivery deadline (or refreshed redelivery deadline) and when an end state for a task has not been achieved, message redelivery may occur. In addition to the efficiencies provided by maintaining and utilizing keep-alive states to refresh redelivery deadlines, the redelivery monitor described herein can utilize queue multiplexing, message preservation, time to live (TTL), and/or back-pressure to increase efficiency of various aspects of message queueing, including message redelivery.

Although embodiments described herein are generally described in relation to a data-exchange service, such as a LSDC service, embodiments are not intended to be limited herein and can be used in various implementations in which an efficient queueing service is desired, particularly in connection with a streaming data processing service (e.g., Apache Kafka®). In this regard, the message queueing service described herein is a general purpose queuing service that can be used in various implementations, one of which is a data-exchange service (e.g., LSDC service).

4.1 Overview of an Efficient Message Queuing Service

As described, embodiments herein are directed to providing an efficient message queuing service. In particular, efficient message queuing services are provided to facilitate acknowledging individual messages in connection with, or on top of, a streaming data processing system (e.g., Apache Kafka®). By acknowledging individual messages, a set of messages can be processed more efficiently and result in a less expensive recovery from processing failure as redundant message processing is reduced or avoided. In some cases, however, some messages may need to be redelivered for processing as an individual message may be consumed from a data stream (e.g., queue stream) but the processing of the message may not have been completed. As such, a redelivery monitor may be used to efficiently redeliver messages when needed. To increase efficiency of message queuing in accordance with embodiments discussed herein, various aspects, as more fully described below, can be used including queue multiplexing, redelivery deadline refreshing, message preserving, time-to-live for message redelivery, back-pressure, and/or the like.

Figure 23:
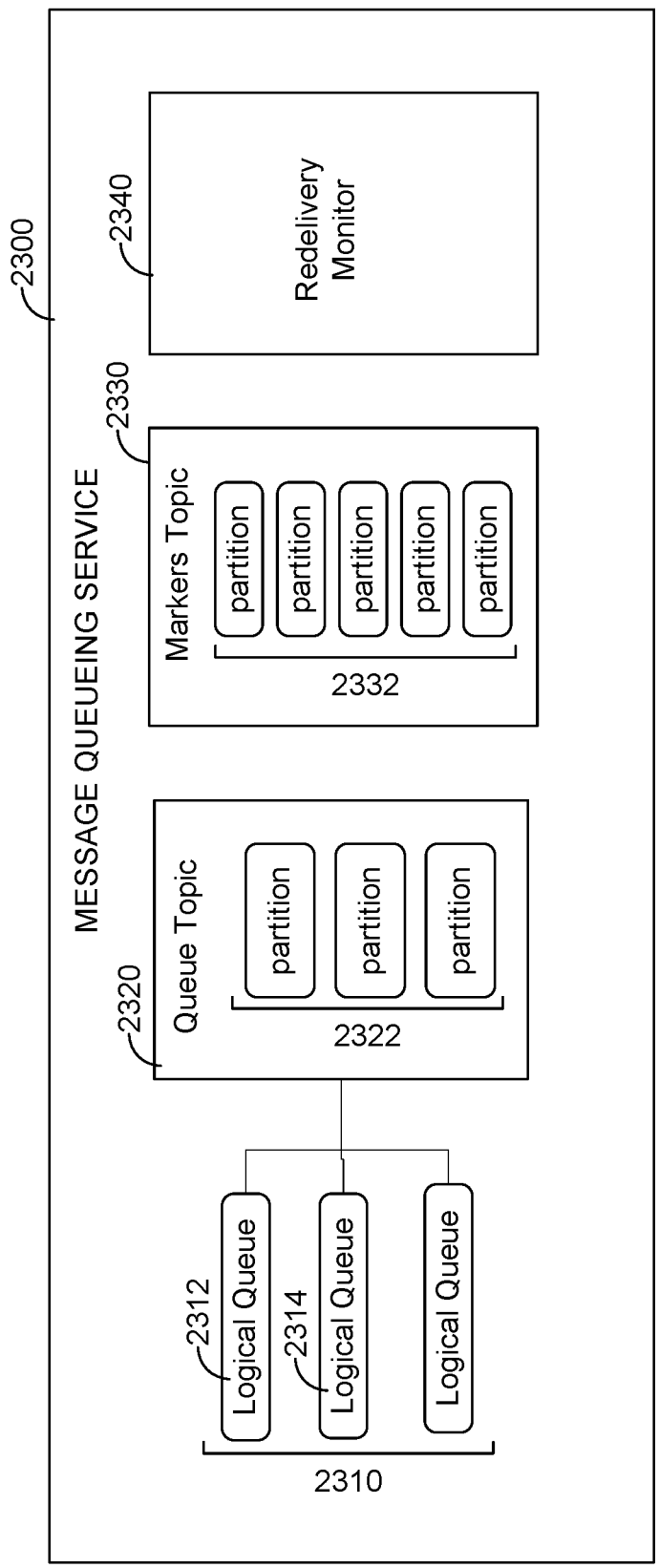
FIG. 23 depicts an example of a message queueing service, in accordance with embodiments of the present invention.

Turning to FIG. 23, FIG. 23 illustrates a message queuing service 2300 for efficiently and effectively performing message queueing services. A message can include any type of information. Generally, a message may be a byte array that can store any object in any format. In some embodiments described herein, a message is, or includes, a task, such as a task or exchange task described in association with a data-exchange system of FIG. 19, a marker indicating a processing state, and/or the like. To distinguish between messages stored in a queue topic and messages stored in a markers topic, messages for processing from a queue topic are generally referred to herein as messages or tasks and messages corresponding with a markers topic are generally referred to herein as markers.

The message queueing service 2300 includes a set of logical queues 2310, a queue topic 2320, a markers topic 2330, and a redelivery monitor 2340. Message queueing service 2300 of FIG. 23 is intended to provide an example of a general message queuing service that may be used in any number of implementations or systems. As one example, message queueing service 2300 may be implemented in a data-exchange system, such as data-exchange system 1902 of FIG. 19. In particular, the message queueing service 2300 may be implemented as the task queue 1970 of FIG. 19 to facilitate providing large-scale data collection services or other data-exchange services.

The queue topic 2320 refers to a topic that contains messages to be processed, such as tasks. The markers topic 2330 refers to a topic that contains markers indicating processing states associated with messages (e.g., tasks). A topic generally refers to a category to which messages are stored and published. The queue topic 2320 and the markers topic 2330 may have a set of partitions 2322 and 2332, respectively. A topic can be divided into any number of partitions. A partition generally contains messages or markers, or a queue of messages or markers. In embodiments, the sequence of messages or markers in a partition is unchangeable, with each message or marker in a partition assigned and identified by a unique offset. Multiple partitions in a topic can enable consumers to read from the topic in parallel.

The set of logical queues 2310 refers to one or more logical queues that may obtain messages, or tasks, from a producer(s). A producer generally refers to a process that publishes data (push messages) to a topic. For example, with reference to FIG. 19, a discover coordinator 1924 may be a producer that provides tasks to the task queue 1970. In some implementations, each logical queue may correspond with a job, process, subprocess, or request, such as a data collection request described in association with the data-exchange service of FIG. 19. In this regard, each task generated in association with a particular data collection request (e.g., via a discover coordinator) can be obtained at a particular logical queue. For example, a set of tasks generated in association with a first data collection request can be provided to, or obtained by, logical queue 2312, and a set of tasks generated in association with a second data collection request can be provided to, or obtained by, logical queue 2314. Each of the tasks may include an identifier to identify or indicate the particular data collection request associated with the task. As described, any number of producers, such as discover coordinators, may be used to produce tasks or messages communicated to the message queueing service 2300. For example, in some cases, a particular producer (e.g., discover coordinator) may generate or produce messages (e.g., tasks) associated with a particular data collection request. In other cases, a particular producer (e.g., discover coordinator) may generate or produce messages associated with a set of different data collection requests. Although data collection requests are generally described in various embodiments, logical queues can correspond with other requests, processes, subprocesses, jobs, or the like.

In accordance with embodiments described herein, the logical queues 2310, or corresponding messages, are multiplexed to the queue topic 2320. In this regard, a set of logical queues is multiplexed to one queue topic, such as queue topic 2320, instead of each logical queue corresponding to an individual queue topic. As previously described, any number of logical queues may exist and, as such, any number of logical queues can be multiplexed to queue topic 2320. Accordingly, all messages (e.g., tasks) for all data collection requests are collected in the queue topic 2320 via multiple logical queues.

By multiplexing multiple logical queues to a single queue topic, multiple queue topics do not need to be created and/or deleted. Creating and/or deleting topics can be inefficient and result in processing latencies and system instability. For example, assume queue topics are created to correspond with messages associated with particular data collection requests. For instance, a first queue topic obtains messages associated with a first data collection request, and a second queue topic obtains messages associated with a second data collection request. In such a case, upon each data collection request creation, a queue topic would be created. In instances that queue topics are dynamically created and/or deleted, a processing latency can be imposed in order to generate the queue topic as background processes to create and/or terminate topics competes with data processing traffic.

In embodiments, the messages of the logical queues can be written or distributed to any partition of the queue topic 2320. In particular, messages can be spread across partitions, irrespective of a particular corresponding data collection request or logical queue. In other words, a message is not dedicated to a particular partition, for example, based on its association with a logical queue or data collection request), but instead, can be provided to a partition at random. In this way, logical queues and/or data collection requests do not have a one-to-one correspondence with partitions. Although messages can be written to any partition (e.g., randomly), uniform distribution may be employed to balance the number of messages associated with each partition. As such, a random, uniform distribution may be applied to distribute messages across partitions.

As the messages are spread across partitions 2322 of the queue topic 2320, multiple consumers can consume the messages from the various partitions. A consumer generally refers to a process that reads messages from a topic, and in particular, topic partitions. For example, with reference to FIG. 19, a data-exchange coordinator 1928 may be, or include, a consumer that consumes tasks from the task queue 1970. Consumers can read messages starting from a specific offset. As described, any number of consumers, such as data-exchange coordinators, may be used to consume tasks or messages in the queue topic 2320. In some embodiments described herein, a consumer can read messages (e.g., tasks) from all partitions and filter to process messages associated with a data collection request(s) of interest. In some cases, a particular consumer (e.g., data-exchange coordinator) may consume messages associated with a particular data collection request. In such cases, the consumer can read messages across partitions and filter the messages to the data collection request of interest. For example, a particular consumer recognizes what data collection request it is a member of and, if a message is identified for that data collection request (e.g., via a data collection identifier), the consumer can initiate processing of the message. Otherwise, messages corresponding with other data collection requests can be filtered out such that the consumer does not initiate processing of those messages.

Figure 24A:
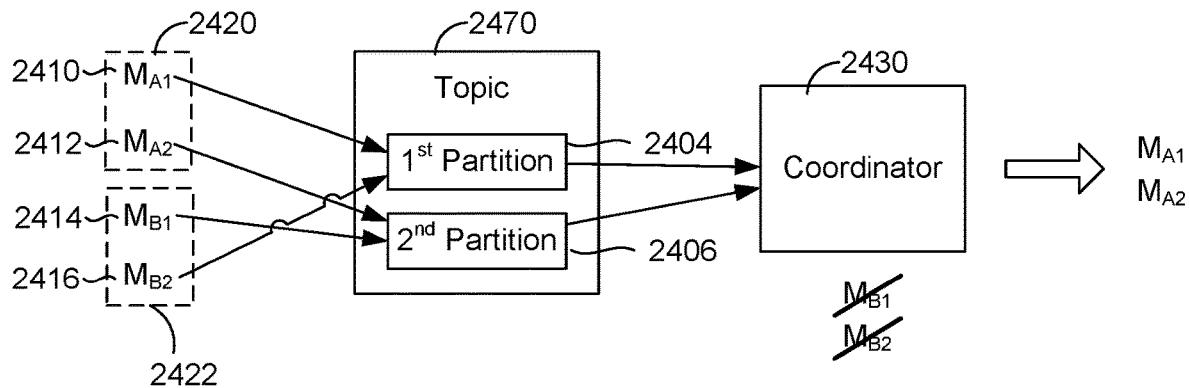
FIG. 24A illustrates an example implementation of multiplexing multiple logical queues to a single topic, in accordance with embodiments of the present invention.

By way of example only, FIG. 24A illustrates an example implementation of multiplexing multiple logical queues, or messages associated with multiple data collection requests, to a single topic. As described, multiplexing multiple logical queues to a single topic can provide various efficiencies. As shown in FIG. 24A, a single topic 2402, such as a queue topic, is provided. The topic 2402 includes two partitions, a first partition 2404 and a second partition 2406. In this example, each message (e.g., task) generated in association data collection request A and data collection request B is provided to topic 2402. Message$_{A1}$ 2410 and message$_{A2}$ 2412 associated with data collection request A may exist within a first logical queue 2420, and message$_{B1}$ 2414 and message$_{B2}$ 2416 associated with data collection request B may exist within a second logical queue 2422.

As illustrated, message$_{A1}$ 2410 is provided to the first partition 2404, message 2412 is provided to the second partition 2406, message$_{B1}$ 2414 is provided to the second partition 2406, and message$_{B2}$ 2416 is provided to the first partition 2404. As shown and described herein, the messages can be assigned to any of the partitions (e.g., via random uniform distribution). A consumer, such as coordinator 2430, can then consume the messages in both the first partition 2404 and the second partition 2406. In cases that the coordinator 2430 is configured to consume messages associated with a particular data collection request, the coordinator 2430 can filter the messages to process messages associated therewith. For example, assume coordinator 2430 is configured to consume messages associated with data collection request A. In such a case, the coordinator 2430 can read each of message$_{A1}$ 2410, message$_{A2}$ 2412, message$_{B1}$ 2414, and message$_{B2}$ 2416 from the first partition 2404 and the second partition 2406, and filter the messages such that message$_{A1}$ 2410 and message$_{A2}$ 2412 are processed while message$_{B1}$ 2414 and message$_{B2}$ 2416 are filtered or dropped.

Figure 24B:
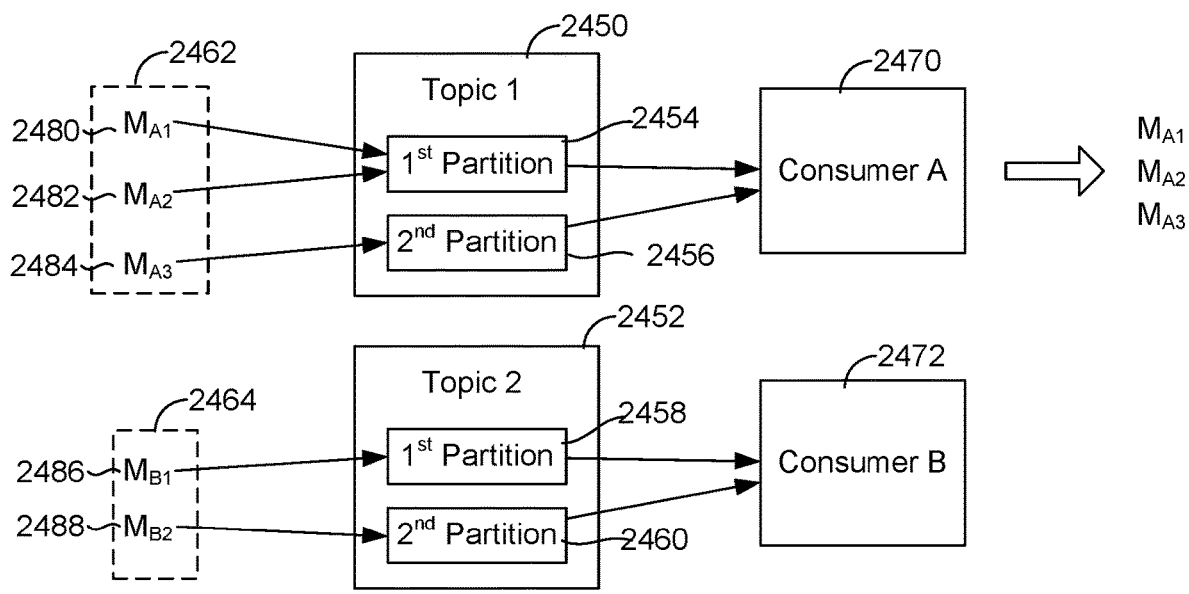
FIG. 24B illustrates providing messages associated with multiple logical queues to multiple topics.

In contrast, and with reference to FIG. 24B, FIG. 24B illustrates an example implementation of providing messages associated with multiple logical queues and/or data collection requests to multiple topics that correspond with the particular data collection request. Assume a first topic 2450 is created in association with a first data collection request A, and a second topic 2452 is created in association with a second data collection request B. As shown in FIG. 24B, the first topic 2450 includes two partitions, a first partition 2454 and a second partition 2456. The second topic 2452 also includes two partitions, a first partition 2458 and a second partition 2460. Message$_{A1}$ 2480, message$_{A2}$ 2482, and message$_{A3}$ 2484 associated with data collection request A may exist within a first logical queue 2462, and message$_{B1}$ 2486 and message$_{B2}$ 2488 associated with data collection request B may exist within a second logical queue 2464.

In this example, each message (e.g., task) generated in association with data collection request A is provided to the first topic 2450, and each message (e.g., task) generated in association with data collection request B is provided to the second topic 2452. As illustrated, message$_{A1}$ 2480 and message$_{A2}$ 2482 are provided to the first partition 2454 of the first topic 2450, and message$_{A3}$ 2484 is provided to the second partition 2456 of the first topic 2450. Consumer A 2470 consumes the messages in the first partition 2454 and the second partition 2456 of the first topic 2450. Further, message$_{B1}$ 2486 is provided to the first partition 2458, and message$_{B2}$ 2488 is provided to second partition 2460. Consumer B 2472 consumes the messages in the first partition 2458 and the second partition 2460. In this case, the messages associated with a particular data collection request are provided to a particular topic and consumed by a particular consumer. As such, in cases that multiple data collection requests exist, multiple topics are also needed.

Returning to FIG. 23, in accordance with reading a message (e.g., a consumer reading a task associated with a particular data collection request(s)) from the queue topic 2320, the message can be processed and monitored such that the state of the message processing can be written to the markers topic. For example, a consumer, such as a data-exchange coordinator, can initiate processing of the message, monitor the message processing, and write markers (e.g., as a producer) indicating the processing state to the markers topic 2330. As can be appreciated, a coordinator, such as a data-exchange coordinator, may be, or include, a consumer of messages associated with the queue topic 2320 and a producer of markers associated with the markers topic.

By way of example only, in operation, a coordinator (e.g., data-exchange coordinator 1928 of FIG. 19) can initially read a message from a partition of the queue topic 2320. The coordinator can then write a start marker to the markers topic 2330 and commit a messaging offset. An offset may be a numerical offset, or unique identifier, associated with a message within a partition. The offset can denote the position of a consumer in association with a partition. For example, a consumer associated with position or offset 5 has consumed records with offsets 0 through 4 and will next receive record with offset 5. A committed offset indicates that all messages up to the particular offset have been read by the consumer or initially processed.

The coordinator can also initiate processing of the message (or task execution), for example, via a connector. In some implementations, the coordinator may utilize back-pressure to facilitate efficiency of the message queueing service. Back-pressure refers to a limit on a number of messages that are consumed. As such, back-pressure can be incorporated into functionality of consumers, such as a coordinator. Utilizing back pressure can limit the number of messages being processed and associated marker production.

As the processing occurs, the coordinator can write keep-alive markers to the markers topic 2330. Such keep-alive markers may be written on a periodic basis during message processing, or in accordance with an occurrence of an event during processing. For instance, a coordinator may initiate a connection with a connector and, thereafter, provide a task to the connector for execution. The connector then executes the task and keeps the connection open between the coordinator and the connector. In the LSDC environment, the connector can execute the task, collect data, batch data into events, and provide events to a coordinator via an open connection. While the coordinator is receiving events or data, the coordinator recognizes that the connector is still executing the task. In such a case, a keep-alive message can be generated (e.g., periodically) and provided to the markers topic while it is receiving data. In some cases, a background thread can be used to send keep-alive markers on a periodic basis asynchronous to receiving events or data. Upon detecting the completion of message processing, the coordinator can write an end marker to the markers topic 2330 to denote message processing is complete.

Various markers indicating processing state can be written to the set of partitions 2332 of the markers topic 2330. In some embodiments, markers associated with a particular data collection request are all written to a particular partition. In this way, each partition corresponds to a particular data collection request(s) such that markers associated with a particular data collection request(s) are not spread across partitions of a markers topic. Providing all markers associated with a particular data collection request to a same partition can facilitate maintaining an order of the markers. To write markers associated with a particular data collection request to a particular partition, the coordinator may hash on the corresponding identifier to identify the particular partition to which a marker is to be written.

Further, the markers can be written in order of occurrence, such that a start marker precedes a keep-alive marker, which precedes an end marker. Writing markers in order can prevent unnecessary redelivery of messages. For instance, if an end marker is read before a start marker, message processing will no longer be tracked as in-process. As such, upon reading a start marker, a subsequent end marker for the message would not be detected, and the message would be redelivered for processing.

In some implementations, similar to the queue topic, a set of logical queues, or set of markers associated with multiple data collection requests, can be multiplexed to the single markers topic 2330. As such, the markers topic 2330 can contain markers indicating processing state for all messages being processed. In some cases, a logical queue associated with a data collection request is multiplexed across a pair of topics (e.g., queue topic and markers topic). In this way, messages for a particular data collection request (logical queue) in the queue topic are pending processing, and markers for the same data collection request (logical queue) in the markers topic track messages that are currently being processed.

The number of partitions associated with the queue topic 2320 may be different from the number of partitions in the markers topic 2330. The number of partitions for a topic may depend on, for example, the amount of throughput desired in connection with the topic. For example, more partitions may be desired in cases that a large number of queues are being multiplexed on a topic and concurrent consumption of messages or markers is desired. For instance, assume a markers topic has five partitions. Further assume a large throughput is desired such that more than five redelivery monitors are used to consume all the data. In such a case, more partitions may be desired in connection with the markers topic.

The redelivery monitor 2340 is generally configured to manage redelivery of messages or tasks. As described, the redelivery monitor 2340 facilitates management of redelivering messages in the event a crash occurs (e.g., coordinator or connector crashes) while a message or task is being processed. In this case, a message offset in association with the queue topic would have already been committed for the message such that the message would essentially be lost or dropped in the event of a failure to complete the message processing. Although only a single redelivery monitor 2340 is depicted, any number of redelivery monitors may be used within a message queueing service. For example, a redelivery monitor may correspond with a particular number of partitions (e.g., 1, 2, 3, etc.), such that a redelivery monitor monitors markers for the correlated partitions.

Generally, the redelivery monitor 2340 consumes markers from the markers topic. As discussed, each message or task may correspond with a sequence of markers in a partition of the markers topic 2330. The redelivery monitor 2340 can read the start marker associated with a task. The start marker can indicate the start or beginning of processing in association with a message or task. At a high level, when a particular amount of time or a particular time, referred to herein as a redelivery deadline, has occurred or expired and an end marker has not been read by the redelivery monitor 2340, the redelivery marker 2340 can initiate redelivery of the message to the queue topic for processing (e.g., by a coordinator). Because the end marker was not received prior to expiration of the redelivery deadline, it can be assumed that an error occurred (e.g., a processor crashed) preventing completion of the task processing. A redelivery deadline may refer to an amount or duration of time, or a particular time, at which a message is to be redelivered when an end marker is not received prior to the expiration or occurrence of the redelivery deadline. As one example, a redelivery deadline may be a timestamp associated with a marker plus a configurable expiry time (e.g., one hour). Such an expiry time or interval can be configurable on a per-message basis.

In embodiments described herein, a keep-alive marker is written to the markers topic 2330 to indicate the processing of a message or task is underway or maintained. As previously described, a keep-alive marker can be generated and written to the markers topic by a coordinator (e.g., periodically) when the task is still processing (e.g., via a connector). Advantageously, the keep-alive marker can be used to refresh, extend, or update the redelivery deadline. To do so, upon a redelivery monitor reading a keep-alive marker, the redelivery deadline can be extended by a refresh time. A refresh time may refer to an amount of time (time duration) or a particular time to which to extend a redelivery deadline. In this regard, a refresh time may be added a redelivery deadline, or otherwise used, to extend or delay the redelivery of a message. In some cases, a refresh time (e.g., one hour) may be added to an initial redelivery deadline. For example, assume an initial redelivery deadline is 24 hours (e.g., following a marker, such as a start marker, timestamp). Further assume a keep-alive marker is obtained. In such a case, the redelivery deadline may be extended to 25 hours from the time of obtaining the start marker. As such, if an end marker is not obtained within 25 hours from obtaining the start marker, the message can be redelivered. In other cases, a refresh time (e.g., one hour) may be added to a current redelivery deadline. For example, assume an initial redelivery deadline is 24 hours and two hours have passed since the redelivery deadline, leaving 22 hours until the redelivery deadline expires. Further assume a keep-alive marker is obtained. In this case, the redelivery deadline may be extended to 23 hours from the current time. As such, if an end marker is not obtained within 23 hours from the current time, the message can be redelivered. As yet another example, a redelivery deadline associated with a particular time may be reset to account for a refresh time. For instance, assume a redelivery deadline is set to expire at 1:30 pm. Further assume that a keep-alive marker is obtained. In this example, the redelivery deadline may be reset or extended to 2:30 pm, as a refreshed redelivery deadline, to account for time during which the message continues to be processed.

As can be appreciated, a refresh time used to generate a refreshed redelivery deadline may be a same amount or varying amount. For example, each keep-alive marker may be associated with a same refresh time. In such a case, each instance a keep-alive marker is obtained, the redelivery deadline is extended by the same refresh time (e.g., one hour). In another example, a marker(s) associated with a task may be analyzed to determine a refresh time to use to extend a redelivery deadline. For instance, assume a first keep-alive marker is provided two hours after a start marker. In such a case, the refresh time may be two hours. Now assume a second keep-alive marker is provided three hours after the first keep-alive marker (or five hours after the start marker). In this case, an additional refresh time of three hours (or a total refresh time of five hours) may be used to extend the redelivery time.

As described, in some cases, messages are redelivered after a given amount of time passes since a start marker is sent or consumed. In such cases, timestamps can be used to identify when to redeliver messages. In one implementation, to facilitate identification of when to perform message redelivery, the message redelivery process is impervious to clock skew between distributed system components. To do so, the redelivery monitor 2340 can use the timestamp of the last consumed marker as current when determining whether a redelivery deadline, or refreshed redelivery deadline, has expired. For example, assume a redelivery monitor reads start marker S1 with a timestamp of 00:00:00 and a redelivery deadline of 00:01:00. Further assume the redelivery monitor reads start marker S2 with a timestamp of 00:00:30 and subsequently reads start marker S3 with a timestamp of 00:01:00. In this case, the redelivery monitor can identify the current time to be the timestamp of start marker S3, that is 00:01:00, and accordingly perform redelivery of the message associated with start marker S1.

In the absence of a new marker, the redelivery monitor 2340 can use a local monotonic clock to calculate a logical marker timestamp or "current time" that can be used to determine whether a redelivery deadline has expired. A logical "current time" can be determined using a local, monotonic clock to calculate the difference between when the last marker was received and "now." The redelivery monitor can add this duration to the timestamp of the last consumed message and use the resulting time to calculate whether redelivery deadlines for a message has expired. In an example of a logical timestamp triggering redelivery, assume a redelivery monitor reads start marker S1 with a timestamp of 00:00:00 and redelivery deadline of 00:01:00. The redelivery monitor remembers the value of its local monotonic clock at the time S1 was read (e.g., 1000 milliseconds). In the absence of new markers available for consumption, the redelivery monitor (e.g., periodically) calculates the difference between its local monotonic clock and the time when S1 was read. When the difference between the local monotonic clock and the time when marker S1 was read becomes 10 seconds, the message associated with S1 is redelivered.

To refresh, update, or extend the redelivery deadline, the redelivery monitor may use data structures (e.g., stored in memory). One example data structure may include a priority queue of markers based on redelivery deadlines (also referred to as a redelivery priority queue). A redelivery priority queue may contain markers that are ordered by redelivery deadline. Each marker may be associated with a specific message and contain the original message content along with the redelivery deadline. The redelivery monitor can read the top or beginning of the priority queue and determine if a deadline associated with the marker at the beginning of the queue expired. A redelivery monitor may read the beginning of the redelivery priority queue in accordance with any schedule, such as periodically (e.g., upon expiration of each second). If the redelivery deadline associated with a marker at the beginning of the queue has been exceeded or expired, the corresponding message content can be redelivered. When a keep-alive marker is received, the redelivery monitor can identify a corresponding marker in the redelivery deadline queue and move the marker in the priority queue based on a refreshed redelivery deadline thereby extending the redelivery deadline. In this way, if a particular marker is near the beginning of the redelivery priority queue because the redelivery deadline is near expiration, the reception of a keep-alive marker effectively moves the corresponding marker down in the redelivery priority queue such that it is further from expiration. In some implementations, as described above, the keep-alive marker modifies or extends the expiration deadline via a refresh time, which results in modification of the corresponding marker in the redelivery priority queue as the redelivery priority queue can be ordered by expiration deadlines.

Another example data structure may include a priority queue of markers ordered by their corresponding offsets in the markers topic, also referred to herein as an offset priority queue. An offset priority queue can be used to identify the state of a redelivery priority queue in instances in which the redelivery priority queue needs rebuilt (e.g., due to a crash and subsequent restart of a redelivery monitor) to include messages that have not yet been redelivered or completed. Tracking the smallest offset can facilitate such rebuilding of a redelivery priority queue.

In operation, when a start marker associated with a task is read, the redelivery monitor 2340 can write the start marker to both the redelivery priority queue and the offset priority queue, ordered by redelivery deadline and offset, respectively. When an end marker associated with the task is read, the corresponding start marker can be removed from both queues.

As described, when a redelivery deadline, or refreshed redelivery deadline has expired and no end marker has been detected, the redelivery monitor 2340 can determine to initiate redelivery of a message to the queue topic 2320. Advantageously, in accordance with embodiments described herein, message or task data can be included in the markers (e.g., via metadata) written to the markers topic and consumed by the redelivery monitor such that the message or task data can be efficiently provided to the queue topic. That is, instead of a redelivery monitor querying or seeking to locate message data in the queue topic, reading the data, and then redelivering a message with the message data to the queue topic, the redelivery monitor can redeliver the message data to the queue topic without having to seek or obtain such needed information from the queue topic. In operation, message data flows from the queue topic to the redelivery monitor such that an additional seek back to the queue topic is not required to obtain the message data for redelivery to the queue topic, thereby improving efficiency of message redelivery. Further, including message data in association with the markers can prevent data loss within the queue topic from being problematic.

As can be appreciated, in embodiments, the message data, or payload, is redelivered to the queue topic 2320 and, thereafter, may be included in a new message in the queue topic. As such, the new message with the redelivered message data may be written to a same or different partition than the original message (e.g., as messages may be distributed via random uniform distribution) and may have a different offset. Further, metadata of the new message may be different from the original message, for example, in the case of a TTL that is decremented and attached to the message when it is delivered to the queue topic.

The redelivery monitor 2340 may also use time-to-live (TTL) to facilitate efficiency of message redelivery. Time-to-live indicates a maximum number of a times a message can be redelivered by the redelivery monitor. Using a time-to-live to control redelivery reduces the opportunities for repetitive message redelivery. For example, assume a processor reads a message and thereafter crashes. Using implementations described herein, the redelivery monitor 2340 will redeliver the message. Assume then a processor (same or different processor) reads a message and crashes, the redelivery monitor 2340 will redeliver the message a second time. Without using a TTL to limit message redelivery, this process could continue indefinitely.

In one implementation, TTL can be managed via a counter that counts number of a times a message is redelivered. By way of example only, assume a TTL is defined as "3," that is the maximum number of times a message can be redelivered is "3." In such a case, a TTL counter can start at "2." When a message is to be redelivered, the redelivery monitor 2340 can recognize that the counter is at "2," redeliver the message, and initiate reduction of the TTL counter to "1." In cases that the TTL counter is positive, the redelivery monitor 2340 can redeliver a message and the counter can be decremented. In cases that the TTL counter is reduced to zero, the redelivery monitor 2340 will not redeliver the message. As can be appreciated, other implementations may be used to limit the number of a times a message is redelivered.

Figure 25:
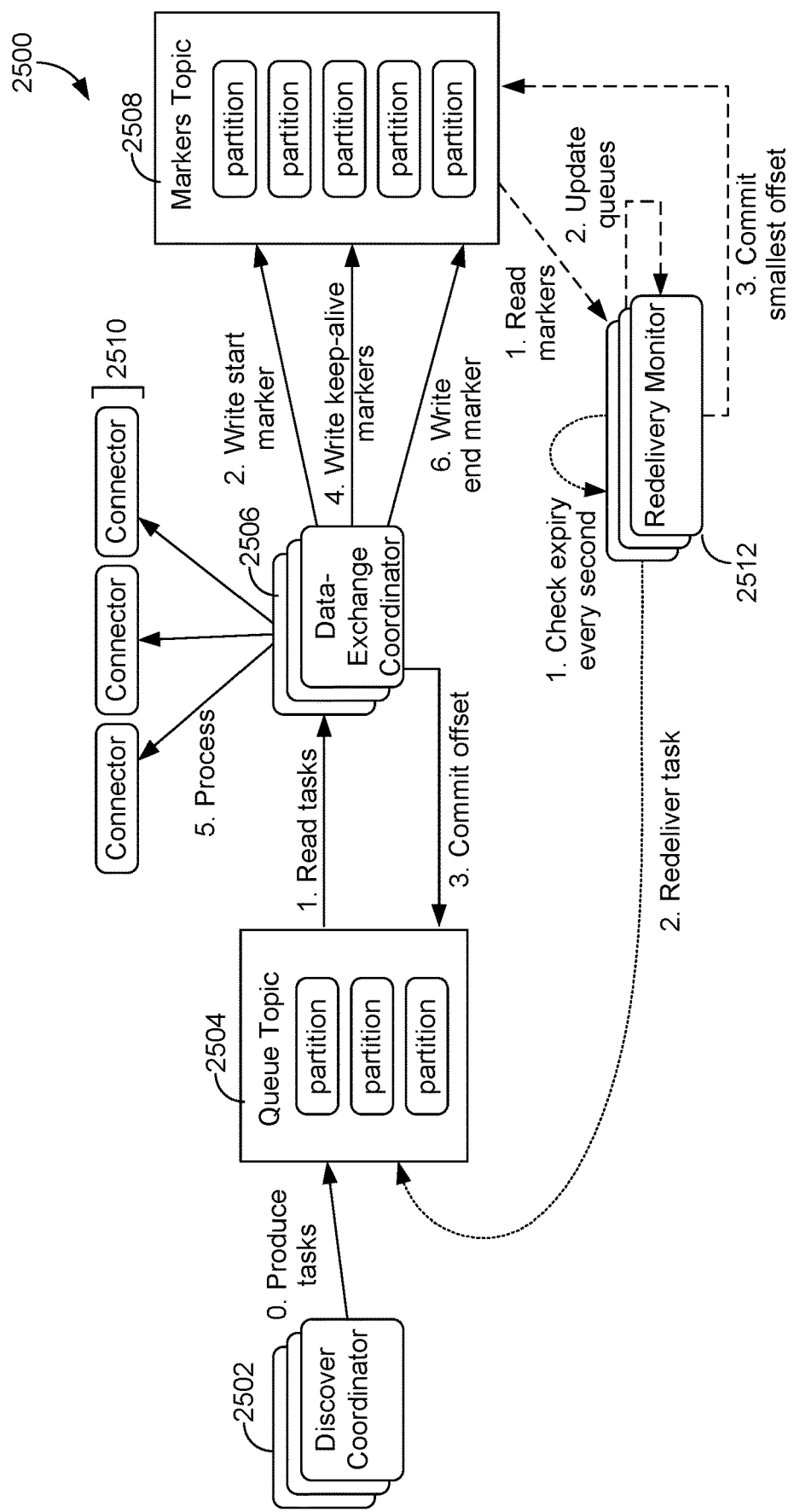
FIG. 25 depicts an example message queueing service implemented in connection with a data-exchange service, in accordance with embodiments of the present invention.

As described, the message queueing service 2300 can be employed in various implementations, including a data-exchange service. Turning now to FIG. 25, a message queueing service is implemented in connection with a data-exchange service, such as a LSDC service. As such, with reference to FIG. 25, the messages are referred to as tasks and various components are described in relation to the data-exchange service 1902 of FIG. 19.

As illustrated, task queuing service 2500 includes a queue topic 2504, a markers topic 2508, and redelivery monitors 2512. The queue topic 2504 can obtain tasks to be processed from a set of discover coordinators 2502. Any number of discover coordinators 2502 may be employed to provide tasks. In some cases, one coordinator may correspond with one particular data collection request. As described, a discover coordinator 2502 can generate tasks and/or communicate such tasks to the queue topic 2504. The tasks can include a request identifier, a task payload, a TTL, and/or the like. The request identifier can be used for, among other things, consuming the tasks (e.g., via a data-exchange coordinator 1928). For example, a task may include an identifier of a data collection request initiating the task or a job that produced the task to allow for efficient filtering of tasks by the data-exchange coordinator 2506.

The queue topic 2504 can include any number of partitions. The tasks can be provided to any of the partitions of the queue topic. Multiple partitions in a topic can enable data-exchange coordinators 2506 to read from the queue topic in parallel.

The tasks produced by the discover coordinator(s) 2502 can be multiplexed to the queue topic 2504. In some cases, the tasks can be multiplexed to the queue topic 2504 via a set of logical queues. For instance, each logical queue may correspond with a request or job, such as a data collection request described in association with the data-exchange service of FIG. 19. In this regard, each task generated in association with a particular data collection request (e.g., via a discover coordinator) can be obtained at a particular logical queue. As any number of logical queues may exist, any number of logical queues can be multiplexed to queue topic 2320. Accordingly, all tasks for all data collection requests are collected in the queue topic 2504, for example, via multiple logical queues. Advantageously, by multiplexing multiple logical queues to a single queue topic, multiple queue topics do not need to be created and/or deleted.

The tasks produced via the discover coordinator(s) 2502 can be written or distributed to any partition of the queue topic 2504. In particular, tasks can be spread across partitions, irrespective of a particular corresponding request or logical queue. In other words, a task is not dedicated to a particular partition (e.g., based on its association with a logical queue or request), but instead, can be provided to random partitions. In some cases, tasks can be distributed in a random, uniform manner.

As the tasks are spread across partitions of the queue topic 2504, multiple data-exchange coordinators 2506 can consume the tasks from the various partitions. As described, any number of data-exchange coordinators 2506 may be used to consume tasks in the queue topic 2504. In some embodiments, a data-exchange coordinator 2506 may be associated with a particular request such that it initiates processing of tasks corresponding to the particular request. For instance, a data-exchange coordinator 2506 may read tasks from each partition and filter to process tasks associated with a data collection request(s) of interest. As a specific example, a particular data-exchange coordinator 2506 can read a task and, if a task corresponds with a data collection request it is a member of (e.g., via an identifier), the data-exchange coordinator 2506 can initiate processing of the task. Otherwise, tasks corresponding with other requests can be filtered out so that the data-exchange coordinator 2506 does not initiate processing of such messages. When a data-exchange coordinator is deployed, it can subscribe to the queue topic 2504 to consume tasks from the queue topic.

In operation, the data-exchange coordinator 2506 initially reads a task. In cases that the processing of the task is to be initiated by the data-exchange coordinator 2506, a start marker can be written to the markers topic 2508. A start marker indicates the start of the task processing such that monitoring the task for redelivery can begin. In addition to indicating the marker is a start marker (type of marker), a start marker may include any number or type of fields or attributes, such as, for example, a partition indicator (e.g., ordinal of the partition in the queue topic that contains the task); an offset (e.g., offset in the partition where the task is located); a redelivery deadline (e.g., number of milliseconds to wait between when a marker is seen by the redelivery monitor and when the associated task is to be redelivered); a key (e.g., a key, for example, of a Kafka Consumer Record, that contains the task); a value; and/or the like.

The data-exchange coordinator 2506 can also commit the task offset such that the data-exchange coordinator 2506 can proceed with reading another task. For example, a consumer offset can be committed to the queue topic 2504.

In addition to writing start markers, the data-exchange coordinator 2506 can write keep-alive markers to the markers topic. For example, upon committing an offset to the queue topic 2504, a keep-alive marker can be written to the markers topic. In embodiments, for each task consumed by the data-exchange coordinator 2506, keep-alive markers can be written or provided to the markers topic 2508. In some cases, keep-alive markers can be periodically produced via a background thread initiated by the data-exchange coordinator 2506. Keep-alive markers may include any number and type of fields or attributes. In some cases, the keep-alive marker may generally include the same types of fields as those included in a start marker, with the exception of a key and value field.

In reading a task, the data-exchange coordinator 2506 can initiate processing of the task. For example, the data-exchange coordinator 2506 may call a connector to initiate data collection via a connector to process a task. As described in association with FIG. 19, a data-exchange coordinator may perform load balancing of task execution between connectors.

Upon completion of a task processing, an end marker can be produced and provided to the markers topic 2508 to denote that task processing has finished. End markers may include any number and type of fields or attributes. In some cases, an end marker may generally include the same types of fields as those included in a start marker, with the exception of a key field, value field, and redelivery deadline field, for example, to conserve storage. A keep-alive thread generated to produce (e.g., periodically) keep-alive messages can be canceled or terminated.

The various markers can be written to partitions of the markers topic 2508. In some embodiments, markers associated with a particular request are all written, in sequential order, to a particular partition. In this way, each partition corresponds to a particular request(s) such that markers associated with a particular request(s) are not spread across partitions of a markers topic. To write markers associated with a particular request to a particular partition, a key for each marker can be set to the request ID, or request identifier. Further, the markers can be written in order of occurrence, such that a start marker precedes a keep-alive marker, which precedes an end marker.

In some implementations, as with the queue topic, a set of logical queues can be multiplexed to the markers topic 2508. As such, the markers topic 2508 can contain markers indicating processing state for all tasks being processed. In this way, multiple logical queues can be multiplexed on a pair of topics (e.g., queue topic and markers topic).

As described, back-pressure may be used to facilitate efficiency of the task queueing service. Back pressure refers to a limit on a number of messages that are consumed. As such, back pressure can be incorporated into functionality of consumers. In embodiments, the number of tasks consumed via the data-exchange coordinators 2506 is substantially proportional to the number of connectors managed by the data-exchange coordinators 2506. Utilizing back pressure can limit the number of tasks being processed and associated marker production.

In one particular implementation in connection with Apache Kafka®, a consumer property (e.g., max.poll.records) can be used to limit the number of tasks returned by a poll request. Additional consumer properties (e.g., max.poll.interval.ms and connections.max.idle.ms) can be used to allow for long delays between poll requests. The consumer can poll for records, append records onto a bounded buffer (or channel), and commit consumer offset. Tasks may be removed from the bounded buffer. The capacity of the bounded buffer (or channel) may, in embodiments, be proportional to the number of connectors managed by the coordinator (e.g., data-exchange coordinator 2506). In another implementation, a reactive stream implementation may be used to ensure there is back-pressure.

Turning to the redelivery monitor 2512, the redelivery monitor 2512 is generally configured to manage redelivery of tasks. As described, the redelivery monitor 2512 facilitates management of redelivering messages in the event a task is aborted due to an error (e.g., crash) occurring in a collect phase (e.g., data-exchange coordinator 2506 or connector 2510 crashes) while the task is being processed. In instances in which a task is aborted, the redelivery monitor 2512 can initiate re-queueing of the task for execution. Any number of redelivery monitors 2512 may be used facilitate task redelivery. For example, a redelivery monitor may correspond with a particular number of partitions (e.g., 1, 2, 3, etc.), such that a redelivery monitor tracks markers for the correlated partitions. Multiple redelivery monitors 2512 may be deployed to share consumption of the partitions in the markers topic 2508 in order to scale redelivery.

When a redelivery monitor 2512 subscribes to the markers topic 2508, the redelivery monitor can be assigned a set of partitions from which to consume markers. For each partition to which it is assigned, the redelivery monitor 2512 can generate and/or maintain various in-memory data structures. Such data structures may include, for example, a markers-in-progress mapping, a redelivery priority queue, an offset priority queue, and a redelivery timer. The markers-in-progress mapping generally tracks tasks that are currently in progress. The markers-in-progress mapping may include a mapping of task identity (e.g., partition, offset in the queue topic) with marker data (e.g., key, value). The redelivery priority queue may contain tasks that are ordered by redelivery deadline. The redelivery priority queue is generally used to determine when tasks should be redelivered to the queue topic 2504. The redelivery priority queue may include a task identifier and corresponding redelivery deadline (e.g., marker timestamp+a configurable expiry time (redelivery deadline or refreshed redelivery deadline)). The offset priority queue is generally used to track the redelivery monitor consumer offset in the partition. The offset priority queue may include a task identifier and marker offset, ordered by the marker offset. A redelivery timer refers to a periodic routine to determine whether any tasks in the redelivery priority queue should be redelivered.

Generally, the redelivery monitor 2512 performs both consumption of markers and task redelivery. In performing marker consumption, the redelivery monitor 2512 consumes, or reads, markers from the markers topic. As discussed, each task may correspond with a sequence of markers in a partition of the markers topic 2508. The redelivery monitor 2512 can consume markers and perform various functions depending on the progress state associated with the marker. In this regard, the redelivery monitor 2512 may update data structures or queues (e.g., in memory) depending on the type of marker. As data structures may be maintained in association with each partition, the partition corresponding with the marker may be initially identified to update the appropriate data structure.

For a start marker, the redelivery monitor 2512 may update the markers-in-progress mapping, redelivery priority queue, and offset priority queue data structures. By way of example only, in the markers-in-progress data structure, a mapping can be created to store the task redelivery data for the task. For instance, partition and offset in the queue topic can be mapped to marker data (e.g., key and value) such that the new task currently in progress can be tracked. As another example, in the redelivery priority queue, a marker entry, including partition, offset, and redelivery deadline, may be inserted into the queue. For the offset priority queue, a marker entry, including partition, offset, and marker offset, may be inserted into the queue.

In accordance with reading a keep-alive marker, the redelivery monitor 2512 may update the redelivery priority queue. By way of example, a marker entry's priority within the queue may be adjusted according to an updated or extended redelivery deadline. In this regard, the redelivery monitor 2512 may determine an updated or extended redelivery deadline based on reception of the keep-alive marker. The redelivery deadline may be updated to a refreshed redelivery deadline based on the refresh time (e.g., add the refresh time to the prior redelivery deadline).

As discussed, the keep-alive marker can be used to extend or update the redelivery deadline. To do so, the redelivery deadline can be extended by a refresh time. A refresh time may refer to an amount of time (time duration) or a particular time to which to extend a redelivery deadline. In this regard, a refresh time may be added to a redelivery deadline to extend or delay the redelivery of a message. In some cases, a refresh time (e.g., one hour) may be added to an initial redelivery deadline. For example, assume an initial redelivery deadline is 24 hours. Further assume a keep-alive marker is obtained. In such a case, the redelivery deadline may be extended to 25 hours from the time of obtaining the start marker. As such, if an end marker is not obtained within 25 hours from obtaining the start marker, the message can be redelivered. In other cases, a refresh time (e.g., one hour) may be added to a current redelivery deadline. For example, assume an initial redelivery deadline is 24 hours and two hours have passed since the redelivery deadline, leaving 22 hours until the redelivery deadline expires. Further assume a keep-alive marker is obtained. In this case, the redelivery deadline may be extended to 23 hours from the current time. As such, if an end marker is not obtained within 23 hours from the current time, the message can be redelivered.

In accordance with reading an end marker, the redelivery monitor 2512 may update the markers-in-progress mapping, redelivery priority queue, and offset priority queue data structures. By way of example only, in the markers-in-progress data structure, the mapping created to store the task redelivery data for the task can be removed. As another example, in the redelivery priority queue, the marker entry can be removed from the queue. For the offset priority queue, the marker entry can be removed from the queue.

Upon updating appropriate data structures and/or queues, the redelivery monitor 2512 can commit a smallest offset. In particular, in embodiments, the redelivery monitor 2512 can determine a smallest start marker offset of tasks that are in progress by querying the offset priority queue. The smallest offset can then be committed via the markers topic 2508.

In the event the redelivery monitor 2512 needs to rebuild its data structure for tracking in-progress tasks (e.g., when recovering from a crash), the committed smallest offset can be used. By committing the offset of the smallest start marker in the queue during marker topic consumption, the redelivery monitor 2512 can rebuild the state of the priority queue from the log at the time it crashed. In operation, the redelivery monitor 2512 can determine the end offsets in the partitions that it is responsible for (e.g., by calling consumer.endoffsets). Redelivery can then be performed as the redelivery monitor rebuilds its data structure while it consumes messages between its last committed offset and the end offset.

As can be appreciated, when the collect phase is complete, the corresponding data-exchange coordinator(s) may shutdown. In some cases, outstanding markers associated with the current data collection request execution may still be present in association with the redelivery monitor. In such cases, the redelivery monitor may redeliver the task(s) to the queue for execution, which may be consumed by a subsequent execution.

4.2 Efficient Message Queueing Methods

Figure 26:
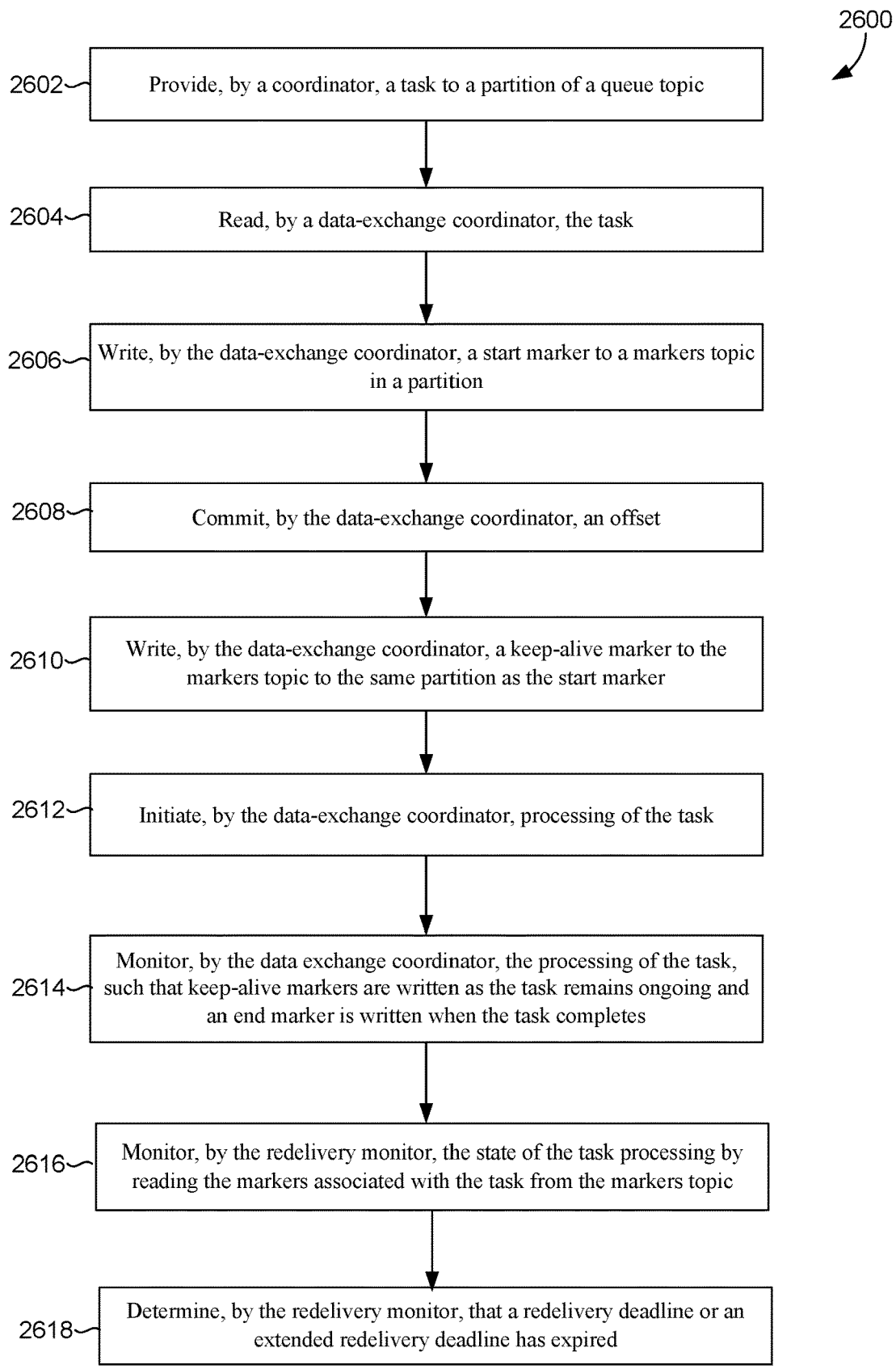
FIG. 26 illustrates a method for providing efficient message queueing services, in accordance with embodiments of the present invention.
Figure 27:
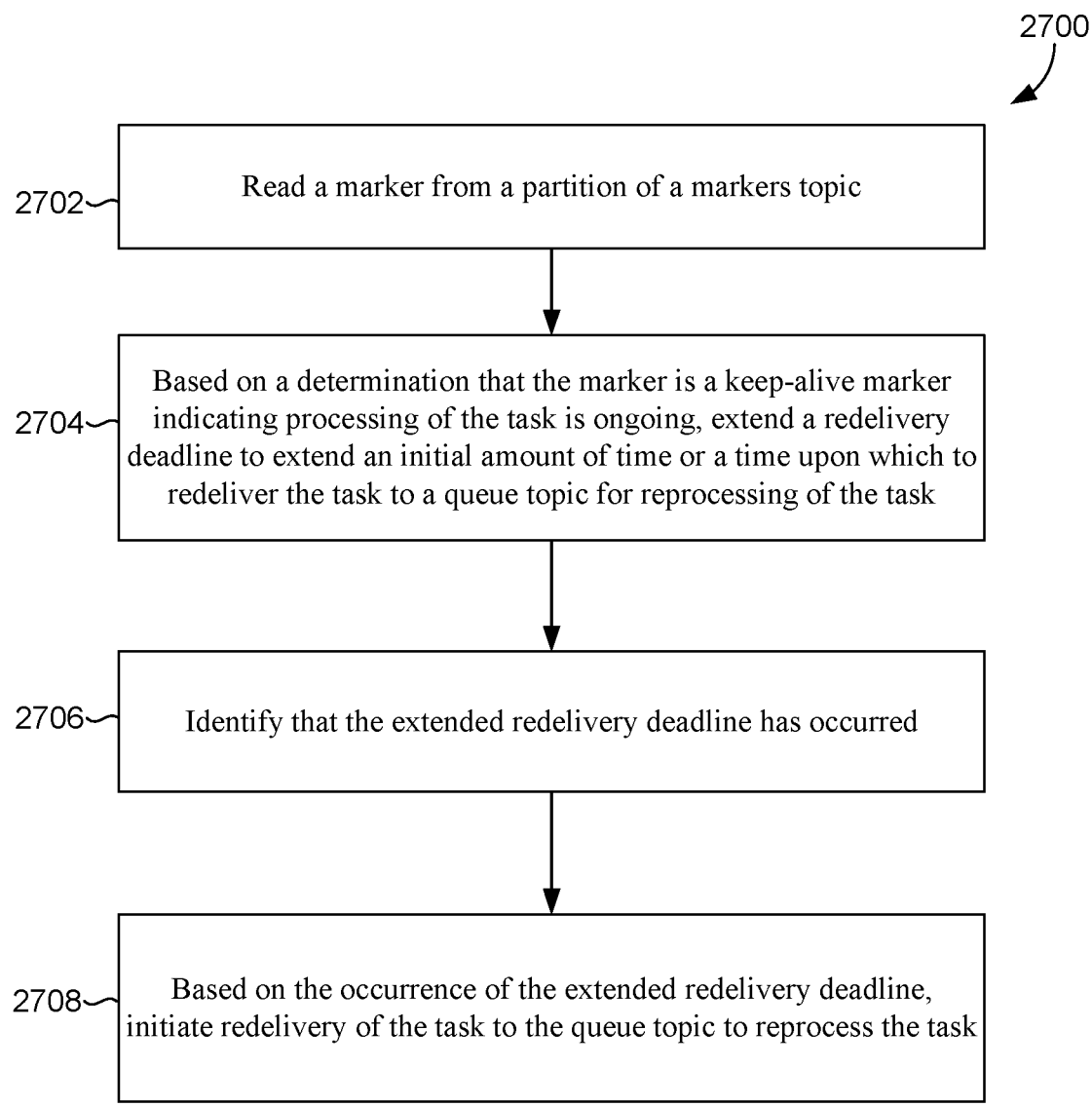
FIG. 27 illustrates a method for providing efficient message queuing services using a redelivery monitor, in accordance with embodiments of the present invention.
Figure 28:
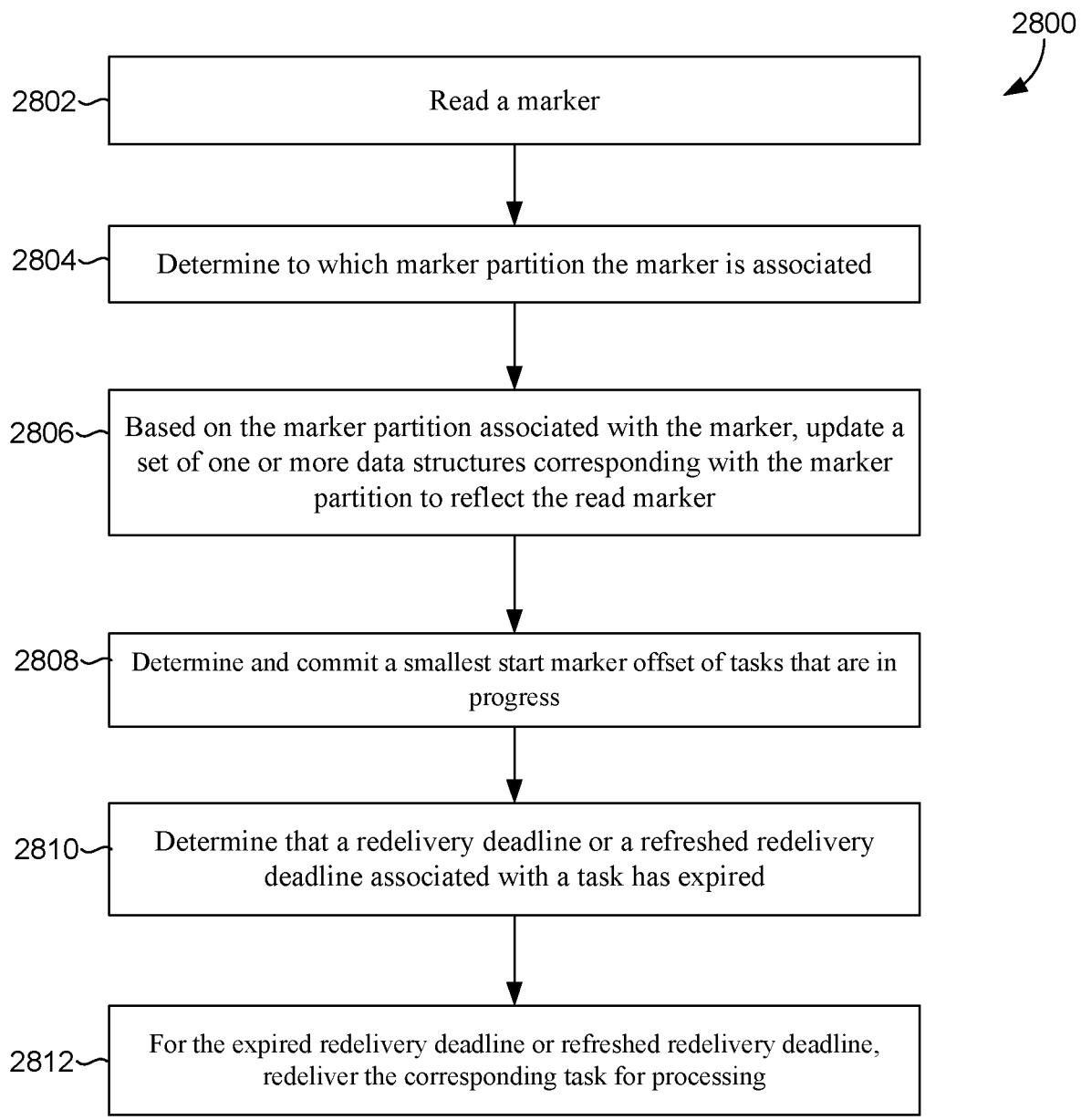
FIG. 28 illustrates another method for providing efficient message queuing services using a redelivery monitor, in accordance with embodiments of the present invention.

FIGS. 26-28 illustrates method of facilitating efficient message queueing services, in accordance with embodiments of the present invention. As can be appreciated, additional or alternative steps or blocks may also be included in different embodiments. Methods 2600, 2700, and 2800 may be performed, for example, at an efficient message queuing system, such as described in FIGS. 23 and 25. The methods and ordering of steps are not intended to be limited herein.

Turning initially to FIG. 26, FIG. 26 provides a method for facilitating efficient message queuing services, in accordance with embodiments of the present invention. At block 2602, a coordinator, such as a discover coordinator, provides a task to a partition of a queue topic. At block 2604, the task is read by a data-exchange coordinator. The data-exchange coordinator writes a start marker to a markers topic in a partition, as shown at block 2606. At block 2608, the data-exchange coordinator commits an offset. At block 2610, a keep-alive marker is written to the markers topic to the same partition as the start marker. At block 2612, the data-exchange coordinator initiates processing of the task, for example, via a connector. At block 2614, the data exchange coordinator monitors the processing of the task, such that keep-alive markers are written (e.g., on a periodic basis) as the task remains ongoing and an end marker is written when the task completes. At block 2616, the redelivery monitor monitors the state of the task processing by reading the markers associated with the task from the markers topic. As described herein, when keep-alive markers are read, the redelivery deadline can be extended to allow for additional time before redelivering a task for reprocessing. At block 2618, the redelivery monitor determines that a redelivery deadline or an extended redelivery deadline has expired. Based on the expiration of the redelivery deadline or the extended redelivery deadline, the redelivery monitor redelivers the task to the queue topic for reprocessing of the task.

With reference to FIG. 27, FIG. 27 illustrates a method 2700 for providing efficient message queuing services using a redelivery monitor, in accordance with embodiments of the present invention. Aspects of method 2700 can be performed via a redelivery monitor, such as redelivery monitor 2340 of FIG. 23 or redelivery monitor 2512 of FIG. 25. Initially, at block 2702, a marker is read from a partition of a markers topic. Generally, the marker indicates a process state for a task processed via a component (e.g., a connector). In embodiments, the marker may be a start marker, a keep-alive marker, or an end marker. At block 2704, based on a determination that the marker is a keep-alive marker indicating processing of the task is ongoing, a redelivery deadline is extended to extend an initial amount of time or a time upon which to redeliver the task to a queue topic for reprocessing of the task. At block 2706, the delivery monitor identifies that the extended redelivery deadline has occurred, or expired. Based on the occurrence of the extended redelivery deadline, as shown at block 2708, redelivery of the task to the queue topic is initiated to reprocess of the task.

FIG. 28 provides another method 2800 for providing efficient message queuing services using a redelivery monitor, in accordance with embodiments of the present invention. Aspects of method 2800 can be performed via a redelivery monitor, such as redelivery monitor 2340 of FIG. 23 or redelivery monitor 2512 of FIG. 25. Initially, at block 2802, a marker is read. The marker generally indicates a process state for a task processed via a component (e.g., connector) and may be a start marker, a keep-alive marker, or an end marker. At block 2804, a determination is made as to which marker partition the marker is associated. Based on the marker partition associated with the marker, a set of one or more data structures corresponding with the marker partition are updated to reflect the read marker. This is shown at block 2806. For example, when a start marker is read, various data structures can be updated to reflect the start of a task, such as marker entries in a redelivery priority queue and/or offset priority queue. When a keep-alive marker is read, a marker entry's priority in the redelivery priority queue can be updated to reflect a refreshed or extended redelivery deadline. When an end marker is read, marker entries can be removed from the redelivery priority queue and/or offset priority queue. At block 2808, a smallest start marker offset of tasks that are in progress can be determined and committed.

At block 2810, a determination is made that a redelivery deadline or a refreshed redelivery deadline associated with a task has expired. In some embodiments, such a determination can be performed periodically via a redelivery timer thread that checks associated redelivery priority queue for tasks having expired redelivery deadlines, or refreshed redelivery deadlines. For the expired redelivery deadline or refreshed redelivery deadline, as indicated at block 2812, the corresponding task is redelivered for processing.

5.0 Illustrative Hardware System

The systems and methods described above may be implemented in a number of ways. One such implementation includes computer devices having various electronic components. For example, components of the system in FIG. 25 may, individually or collectively, be implemented with devices having one or more Application Specific Integrated Circuits (ASICs) adapted to perform some or all of the applicable functions in hardware. Alternatively, the functions may be performed by one or more other processing units (or cores), on one or more integrated circuits or processors in programmed computers. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific computer processors.

An example operating environment in which embodiments of the present invention may be implemented is described below in order to provide a general context for various aspects of the present invention. Referring to FIG. 29, an illustrative operating environment for implementing embodiments of the present invention is shown and designated generally as computing device 2900. Computing device 2900 is but one example of a suitable operating environment and is not intended to suggest any limitation as to the scope of use or functionality of the invention. Neither should the computing device 2900 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialized computing devices, etc. The invention may also be practiced in distributed computing environments where tasks are performed by remote-processing devices that are linked through a communications network.

With reference to FIG. 29, computing device 2900 includes a bus 2910 that directly or indirectly couples the following devices: memory 2912, one or more processors 2914, one or more presentation components 2916, input/output (I/O) ports 2918, I/O components 2920, and an illustrative power supply 2922. Bus 2910 represents what may be one or more busses (such as, for example, an address bus, data bus, or combination thereof). Although depicted in FIG. 29, for the sake of clarity, as delineated boxes that depict groups of devices without overlap between these groups of devices, in reality, this delineation is not so clear cut and a device may well fall within multiple ones of these depicted boxes. For example, one may consider a display to be one of the one or more presentation components 2916 while also being one of the I/O components 2920. As another example, processors have memory integrated therewith in the form of cache; however, there is no overlap depicted between the one or more processors 2914 and the memory 2912. A person of skill in the art will readily recognize that such is the nature of the art, and it is reiterated that the diagram of FIG. 29 merely depicts an illustrative computing device that can be used in connection with one or more embodiments of the present invention. It should also be noticed that distinction is not made between such categories as "workstation," "server," "laptop," "handheld device," etc., as all such devices are contemplated to be within the scope of computing device 2900 of FIG. 29 and any other reference to "computing device," unless the context clearly indicates otherwise.

Computing device 2900 typically includes a variety of computer-readable media. Computer-readable media can be any available media that can be accessed by computing device 2900 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 2300. Computer storage media does not comprise signals per se, such as, for example, a carrier wave. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 2912 includes computer storage media in the form of volatile and/or nonvolatile memory. The memory may be removable, non-removable, or a combination thereof. Typical hardware devices may include, for example, solid-state memory, hard drives, optical-disc drives, etc. Computing device 2900 includes one or more processors 2914 that read data from various entities such as memory 2912 or I/O components 2920. Presentation component(s) 2916 present data indications to a user or other device. Illustrative presentation components include a display device, speaker, printing component, vibrating component, etc.

I/O ports 2918 allow computing device 2900 to be logically coupled to other devices including I/O components 2920, some of which may be built in. Illustrative components include a keyboard, mouse, microphone, joystick, game pad, satellite dish, scanner, printer, wireless device, etc. The I/O components 2920 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described elsewhere herein) associated with a display of the computing device 2900. The computing device 2900 may be equipped with depth cameras, such as stereoscopic camera systems, infrared camera systems, RGB camera systems, touchscreen technology, and combinations of these, for gesture detection and recognition. Additionally, the computing device 2900 may be equipped with accelerometers or gyroscopes that enable detection of motion.

As can be understood, implementations of the present disclosure provide for various approaches to relating data. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method for performing data processing in a streaming manner, the computer-implemented method comprising:
   receiving a first set of tasks at a first logical queue of a plurality of logical queues, each task of the first set of tasks including an identifier indicating a first data collection request associated with the first set of tasks;
   receiving a second set of tasks at a second logical queue of the plurality of logical queues, each task of the second set of tasks including an identifier indicating a second data collection request associated with the second set of tasks; and
   obtaining, at a queue topic containing tasks to be processed, the first set of tasks associated with the first data collection request from the first logical queue and the second set of tasks associated with the second data collection request from the second logical queue, wherein each of the tasks of the first set of tasks and the second set of tasks are distributed to any partition of a plurality of partitions of the queue topic.

2. The method of claim 1, wherein each partition of the plurality of partitions holds a set of tasks associated with multiple data collection requests, wherein each of the tasks of the first set of tasks and the second set of tasks are assigned to one of the partitions in accordance with a random, uniform distribution.

3. The method of claim 1, wherein each of the tasks of the first set of tasks and the second set of tasks are distributed to any partition in a random manner.

4. The method of claim 1, wherein tasks contained within various partitions of the plurality of partitions are read in parallel.

5. The method of claim 1, wherein the plurality of partitions of the queue topic enable tasks within the plurality of partitions to be read from the queue topic in parallel.

6. The method of claim 1, wherein the first logical queue receives the first set of tasks associated with the first data collection request from a producer.

7. The method of claim 1, wherein all tasks for all data collection requests are obtained at the queue topic via the plurality of logical queues.

8. The method of claim 1, wherein tasks of the first set of tasks are distributed across partitions of the plurality of partitions of the queue topic and tasks of the second set of tasks are distributed across partitions of the plurality of partitions.

9. The method of claim 1, wherein a first partition of the plurality of partitions includes a task from the first set of tasks and a task from the second set of tasks.

10. The method of claim 1, wherein a consumer reads tasks from each partition of the plurality of partitions and filters the read tasks to process the read tasks that correspond to a data collection request of interest.

11. The method of claim 1, wherein a consumer reads tasks from each partition of the plurality of partitions and filters the read tasks to process the read tasks that correspond to a data collection request of interest and drop the read tasks that do not correspond to the data collection request of interest.

12. The method of claim 1 further comprising multiplexing a set of logical queues to the queue topic to communicate messages associated with multiple data collection requests to the queue topic.

13. The method of claim 1 further comprising:
reading, via a consumer, a task from the queue topic;
initiating processing of the read task;
monitoring the task processing; and
writing markers indicating a processing state of the task to a markers topic.

14. The method of claim 1, wherein the first set of tasks and the second set of tasks are consumed via a message queuing service that performs data processing in the streaming manner, the message queuing service including the first logical queue, the second logical queue, and the queue topic.

15. A computing system comprising:
a processor; and
computer storage memory having computer-executable instructions stored thereon which, when executed by the processor, configure the computing system to:
receive a first set of tasks at a first logical queue of a plurality of logical queues, each task of the first set of tasks including an identifier indicating a first data collection request associated with the first set of tasks;
receive a second set of tasks at a second logical queue of the plurality of logical queues, each task of the second set of tasks including an identifier indicating a second data collection request associated with the second set of tasks; and
obtain, at a queue topic containing tasks to be processed, the first set of tasks associated with the first data collection request from the first logical queue and the second set of tasks associated with the second data collection request from the second logical queue, wherein each of the tasks of the first set of tasks and the second set of tasks are distributed to any one partition of a plurality of partitions of the queue topic.

16. One or more computer storage media having computer-executable instructions embodied thereon that, when executed by one or more processors, cause the one or more processors to perform a method, the method comprising:
receiving a first set of tasks at a first logical queue of a plurality of logical queues, each task of the first set of tasks including an identifier indicating a first data collection request associated with the first set of tasks;
receiving a second set of tasks at a second logical queue of the plurality of logical queues, each task of the second set of tasks including an identifier indicating a second data collection request associated with the second set of tasks; and
obtaining, at a queue topic containing tasks to be processed, the first set of tasks associated with the first data collection request from the first logical queue and the second set of tasks associated with the second data collection request from the second logical queue, wherein each of the tasks of the first set of tasks and the second set of tasks are distributed to any one partition of a plurality of partitions of the queue topic.

17. The one or more computer storage media of claim 16, wherein all tasks for all data collection requests are obtained at the queue topic via the plurality of logical queues.

18. The one or more computer storage media of claim 16, wherein tasks of the first set of tasks are distributed across partitions of the plurality of partitions of the queue topic and tasks of the second set of tasks are distributed across partitions of the plurality of partitions.

19. The one or more computer storage media of claim 16, wherein a first partition of the plurality of partitions includes a task from the first set of tasks and a task from the second set of tasks.

20. The one or more computer storage media of claim 16, wherein a consumer reads tasks from each partition of the plurality of partitions and filters the read tasks to process the read tasks that correspond to a data collection request of interest.

\* \* \* \* \*